US006530065B1

United States Patent
McDonald et al.

(10) Patent No.: US 6,530,065 B1
(45) Date of Patent: Mar. 4, 2003

(54) CLIENT-SERVER SIMULATOR, SUCH AS AN ELECTRICAL CIRCUIT SIMULATOR PROVIDED BY A WEB SERVER OVER THE INTERNET

(75) Inventors: Duncan R. McDonald, Mountain View, CA (US); Matthew Herndon, San Carlos, CA (US)

(73) Assignee: Transim Technology Corporation, Portland, OR (US)

( * ) Notice: Subject to any disclaimer, the term of this patent is extended or adjusted under 35 U.S.C. 154(b) by 2 days.

(21) Appl. No.: 09/811,371

(22) Filed: Mar. 14, 2001

Related U.S. Application Data

(60) Provisional application No. 60/189,627, filed on Mar. 14, 2000.

(51) Int. Cl.[7] .............................................. G06F 17/50
(52) U.S. Cl. ...................................................... 716/4
(58) Field of Search ........................ 716/4, 12; 703/14

(56) References Cited

U.S. PATENT DOCUMENTS

| | | | |
|---|---|---|---|
| 4,918,643 A | | 4/1990 | Wong |
| 6,108,494 A | * | 8/2000 | Eisenhofer et al. ............ 703/14 |
| 6,292,766 B1 | * | 9/2001 | Mattos et al. ................. 345/964 |
| 6,304,893 B1 | * | 10/2001 | Gish ............................ 707/10 |
| 6,321,364 B1 | * | 11/2001 | Hirata ........................... 716/1 |
| 6,339,836 B1 | * | 1/2002 | Eisenhofer et al. ............. 716/5 |
| 6,345,381 B1 | * | 2/2002 | Leight et al. ................. 703/16 |
| 6,349,301 B1 | * | 2/2002 | Mitchell et al. ............. 707/101 |
| 6,367,065 B1 | * | 4/2002 | Leight et al. .................. 716/18 |
| 6,370,687 B1 | * | 4/2002 | Shimura ...................... 709/203 |

OTHER PUBLICATIONS

Chen, James "WebSpice—Berkeley Spice3 Comes to the Internet," EECS244 Course Projects, Fall 1996, Professors Richard Newton and Jan Rabaey, Abstract only.

* cited by examiner

*Primary Examiner*—Don Wong
*Assistant Examiner*—Minh D A
(74) *Attorney, Agent, or Firm*—Perkins Coie LLP

(57) ABSTRACT

A computer-implemented method simulates a system having multiple interconnected components in a network that couples at least one client computer to a server computer. The method includes: receiving simulation data over the network from the server computer, wherein the simulation data represents one or more characteristics of information that would be present in a particular system having two or more interconnecting components during the operation of the particular system. At the client computer, the method includes generating a first simulation display based on the simulation data for operation of the particular system, and receiving user input at the client computer. Also disclosed are methods for changing component values in a system, compressing waveforms, locally displaying signals from a probe point in a system depiction, processes performed at a server, data structures for displaying user interface screen for providing such information, and a method for circuit creation and use feedback.

30 Claims, 43 Drawing Sheets

Switching Regulators

*Please pick a component.:*

| Product | Max. Load | Output Voltage |
|---|---|---|
| LM2671 High Efficiency SIMPLE SWITCHER | 0.5A | 3.3 5 0 12 ADJ |
| LM2674 High Efficiency SIMPLE SWITCHER | 0.5A | 3.3 5 0 12 ADJ |
| LM2594 SIMPLE SWITCHER Regulator | 0.5A | 3.3 5 0 12 ADJ |
| LM2597 SIMPLE SWITCHER Regulator | 0.5A | 3.3 5 0 12 ADJ |
| LM2672 High Efficiency SIMPLE SWITCHER | 1A | 3.3 5 0 12 ADJ |
| LM2675 High Efficiency SIMPLE SWITCHER | 1A | 3.3 5 0 12 ADJ |
| LM2595 SIMPLE SWITCHER | 1A | 3.3 5 0 12 ADJ |
| LM2598 SIMPLE SWITCHER | 1A | 3.3 5 0 12 ADJ |
| LM2651 SIMPLE SWITCHER Regulator | 1.5A | 3.3 5 0 12 ADJ |
| LM2653 SIMPLE SWITCHER Regulator | 1.5A | 1.8 2.5 3.3 ADJ |
| LM2670 High Efficiency SIMPLE | 3A | 3.3 5 0 12 ADJ | http://www.transim.com/cgi-bin/init_webench.cgi?Device=LM2671&Flavor=ADJ

*Fig. 2A*

DB table example

| ## Device | Flavor | Cgi-display | Layout file | Template file | Cgi-create | Simulator | codebase |
|---|---|---|---|---|---|---|---|
| LM2678 | 5V | Print_html.cgi | Lm267x.layout | 267x.tpl | Deck.prl | Simplis | /webench/switching_regulator/lm267x |
| LM2678 | 12V | Print_html.cgi | Lm267x.layout | 267x.tpl | Deck.prl | Simplis | /webench/switching_regulator/lm267x |
| LM2678 | 3.3V | Print_html.cgi | Lm267x.layout | 267x.tpl | Deck.prl | Simplis | /webench/switching_regulator/lm267x |
| LM2678 | ADJ | Print_html.cgi | Lm267x.layout | 267x.tpl | Deck.prl | Simplis | /webench/switching_regulator/lm267x |
| LM2675 | 5V | Print_html.cgi | Lm2673.layout | 267x.tpl | Deck.prl | Simplis | /webench/switching_regulator/lm267x |
| LM2671 | ADJ | Print_html.cgi | Lm2671.layout | 267x.tpl | Deck.prl | Simplis | /webench/switching_regulator/lm267x |
| LM2585 | 5V | Print_lm2585.cgi | Lm258x.layout | 258x.tpl | Deck.prl | Simplis | /webench/switching_regulator/lm258x |
| LP2966 | 5V | Print_lp296x.cgi | Lp296x.layout | Lp2966 | SpDeck.prl | SPICE | //webench/switching_regulator/lp296x |

*Fig. 2B*

The WebSIM Control Panel may not be currently visible. This situation can occur, for example, if WebSIM Control Panel is behind the circuit schematic or some other window. To make WebSIM Control Panel visible or to bring analysis control panel up front you will need to to click the "Control Panel" button above the circuit schematization.

You can change a schematic component value by clicking it on the schematic. Changable components are colored in orange. When you click on a component, a dialog box will pop up, then you can enter the desired values. After changing component values, you need to bring up the Websim control panel in order to run the simulation.

From the control panel you can change the analysis type from Transfer Function to others like Loop Gain Measurement, Efficiency or Total Harmonic Distortion. You can launch the simulation by clicking the "GO" button and if you want to view a simulation log window, click the "detail" button.

The simulation result can be automatic popup for some analysis, and you are also able to view other waveform results by clicking on the green probes on the schematic. When the Waveform Viewer is up, you can zoom in a particular area by drag your mouse on it. You can also set the makers to view result between two point by using the set marker buttons.

*Fig. 3B*

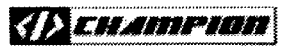

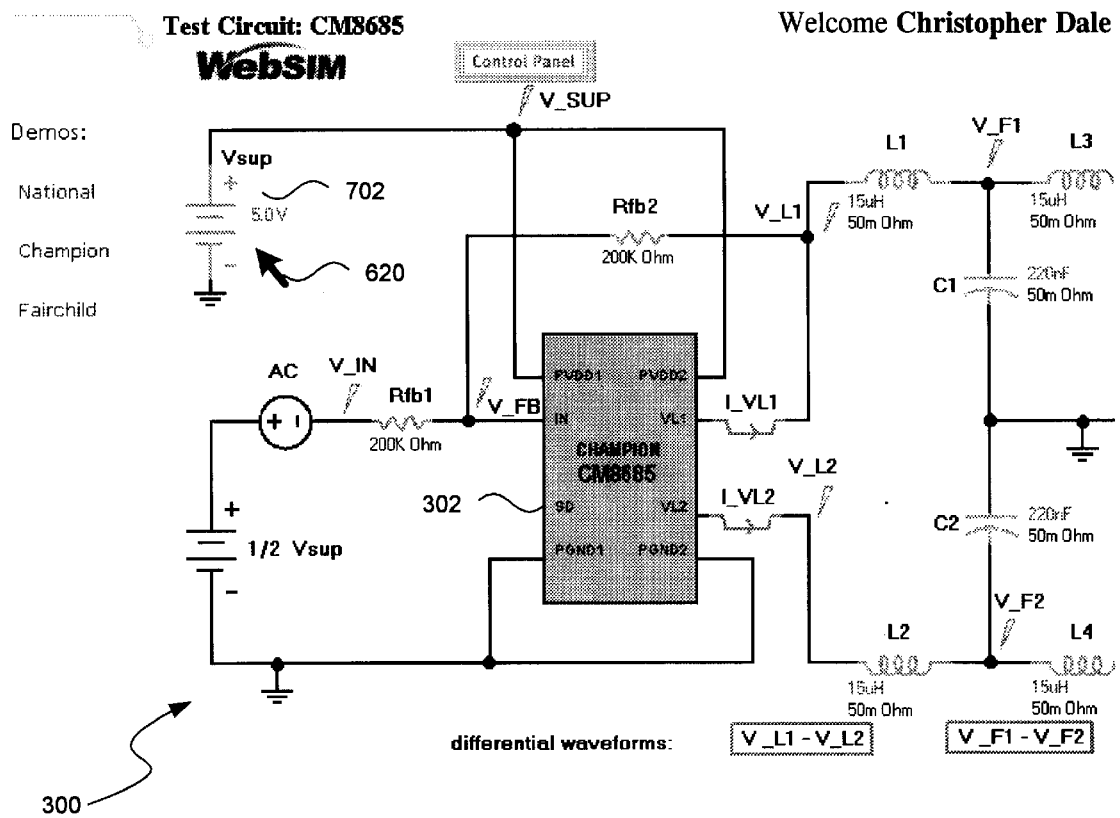

User Instructions:

The WebSIM Control Panel may not be currently visible. This situation can occur, for example, if WebSIM Control Panel is behind the circuit WebSIM Control Panel visible or to bring analysis control panel up front you will need to click the "Control Panel" button above the circuit You can change a schematic component value by clicking it on the schematic. Changable components are colored in orange. When you clic you can enter the desired values. After changing component values, you need to bring up the Websim control panel in order to run the simul From the control panel you can change the analysis type from Transfer Function to others like Loop Gain Measurement, Efficiency or Total H by clicking the "GO" button and if you want to view a simulation log window, click the "detail" button.

The simulation result can be automatic popup for some analysis, and you are also able to view other waveform results by clicking on the gree Viewer is up, you can zoom in a particular area by drag your mouse on it. You can also set the markers to view result between two point by us

*Fig. 7A*

National Semiconductor MR WEBENCH™

Welcome to your Power Webench™!

"Tools for the power design engineer"

START HERE to design a power supply. ⟵ 1404

How to Use Webench

Just four easy steps to design a power supply! Just click on the items below for help on that step.

▶ 1 Choose a Part choose a specific part or input your system specifications to find those devices that fit.

▶ 2 Create a Design a design will be created for you including any necessary passive components and important calculated operating values.

▶ 3 Analyze a Design use WebSim™, the online power simulator, to validate your design electrically, and WebTHERM™, the online thermal simulator to visualize the thermal behavior of your design.

▶ 4 Build It! buy a part, a kit of parts, or an evaluation board.

See Our Disclaimer

Features

WebSIM™ is a browser-based simulator which allows you to probe points in the power supply circuit and examine the wave forms. You can change component values and look at the results in order to fine tune the design. Access Websim using Webench.

My Designs
1402

You are not signed-on. You may ▶ 1 Choose a Part without sign-on but you will need to sign-on here to complete your design and analysis.

My WebSIM™ Simulations

My WebTHERM™ Simulations

My BuildIt Orders

Other Power Webench Tools

Switchers Made Simple™ is downloadable software that enables you to develop a complete power supply design on your local PC. This covers Simple Switcher devices and includes discrete component and manufacturer selection.

- SMS 6.1 (for LM267x and LM259x buck regulators, and LM258x and LM2577 boost & flyback regulators) Updated!

- SMS 3.3 (for LM257X)

Wireless Webench Tools

- Wireless Easy PLL Design Assistant

National Semiconductor MY WEBENCH

① Choose a Part  ② Sign-On  ③ Create a Design  ④ Analyze a Design  ⑤ Build It
• Design Requirements • Recommended Parts • MYDesigns

Your Design Specifications

| VinMin 8.0V | Output | #1 |
|---|---|---|
| VinMax 15.0V | Vout= | 3.3V |
| | Iout= | 1.0A |

Suggested Switching Regulators - Buck Topology

| Product Folder | Webench Tools | Max Curr. | Typ. Eff. | On/Off | Err. Pin | Other Features | Freq. kHz | Est. Price |
|---|---|---|---|---|---|---|---|---|
| LM2595-3.3 | Create Design / WebTHERM enabled / Build It - Custom Kit | 1.0A | 78% | Y | N | | 150 | $1.62 |
| LM2595-ADJ | Create Design / WebTHERM enabled / Build It - Custom Kit | 1.0A | 78% | Y | N | Adj. Vout | 150 | $1.62 |
| LM2596-3.3 | Create Design / WebTHERM enabled / Build It - Custom Kit | 3.0A | 73% | Y | N | | 150 | $1.81 |
| LM2596-ADJ | Create Design / WebTHERM enabled / Build It - Custom Kit | 3.0A | 73% | Y | N | Adj. Vout | 150 | $1.81 |
| LM2598-3.3 | Create Design / WebTHERM enabled / Build It - Custom Kit | 1.0A | 78% | Y | Y | SoftStart | 150 | $1.87 |
| LM2598-ADJ | Create Design / WebTHERM enabled / Build It - Custom Kit | 1.0A | 78% | Y | Y | SoftStart, Adj. Vout | 150 | $1.87 |
| LM2599-3.3 | Create Design / WebTHERM enabled / Build It - Custom Kit | 3.0A | 73% | Y | Y | SoftStart | 150 | $2.16 |
| LM2599-ADJ | Create Design / WebTHERM enabled / Build It - Custom Kit | 3.0A | 73% | Y | Y | SoftStart, Adj. Vout | 150 | $2.16 |
| LM2670-3.3 | Create Design / See CC note below | 3.0A | 86% | Y | N | Sync, SoftStart | 260 | $3.06 |
| LM2670-ADJ | Create Design / See CC note below | 3.0A | 88% | Y | N | Sync, SoftStart, Adj. Vout | 260 | $3.06 |
| LM2672-3.3 | Create Design | 1.0A | 86% | Y | N | Sync, SoftStart | 260 | $2.53 |
| LM2672-ADJ | Create Design | 1.0A | 90% | Y | N | Sync, SoftStart, Adj. Vout | 260 | $2.53 |
| LM2673-3.3 | Create Design / WebTHERM enabled / Build It - Custom Kit | 3.0A | 86% | N | N | SoftStart, Adj. Peak Current Limit | 260 | $3.06 |
| LM2673-ADJ | Create Design / WebTHERM enabled / Build It - Custom Kit | 3.0A | 88% | N | N | SoftStart, Adj. Peak Current Limit, Adj. Vout | 260 | $3.06 |
| LM2675-3.3 | Create Design | 1.0A | 86% | Y | N | | 260 | $2.25 |
| LM2675-ADJ | Create Design | 1.0A | 90% | Y | N | Adj. Vout | 260 | $2.25 |
| LM2676-3.3 | Create Design / WebTHERM enabled / Build It - Custom Kit | 3.0A | 86% | N | N | | 260 | $2.79 |

*Fig. 16A*

| | | | | | | | |
|---|---|---|---|---|---|---|---|
| LM2676-ADJ | Create Design WebTHERM™ enabled Build It - Custom Kit | 3.0A | 88% | N | N | Adj. Vout | 260 $2.79 |
| LM2678-3.3 | Create Design WebTHERM™ enabled Build It - Custom Kit | 5.0A | 82% | Y | Y | | 260 $3.49 |
| LM2678-ADJ | Create Design WebTHERM™ enabled Build It - Custom Kit | 5.0A | 84% | Y | Y | Adj. Vout | 260 $3.49 |
| LM2679-3.3 | Create Design WebTHERM™ enabled Build It - Custom Kit | 5.0A | 82% | Y | Y | SoftStart, Adj. Peak Current Limit | 260 $3.69 |
| LM2679-ADJ | Create Design WebTHERM™ enabled Build It - Custom Kit | 5.0A | 84% | Y | Y | SoftStart, Adj. Peak Current Limit, Adj. Vout | 260 $3.69 |
| LM2825-3.3 | Create Design See CC note below | 1.0A | 75% | Y | N | SoftStart | 150 $10.50 |
| LM2825-ADJ | Create Design See CC note below | 1.0A | 74% | Y | N | SoftStart, Adj. Vout | 150 $10.50 |
| LM2575-3.3 | Create Design See CC note below | 1.0A | 75% | Y | N | | 52 $0.98 |
| LM2575-ADJ | Create Design See CC note below | 1.0A | 75% | Y | N | Adj. Vout | 52 $0.98 |
| LM2575HV-3.3 | Create Design See CC note below | 1.0A | 75% | Y | N | | 52 $2.15 |
| LM2575HV-ADJ | Create Design See CC note below | 1.0A | 75% | Y | N | Adj. Vout | 52 $2.15 |
| LM2576-3.3 | Create Design See CC note below | 3.0A | 75% | Y | N | | 52 $1.36 |
| LM2576-ADJ | Create Design See CC note below | 3.0A | 75% | Y | N | Adj. Vout | 52 $1.36 |
| LM2576HV-3.3 | Create Design See CC note below | 3.0A | 75% | Y | N | | 52 $2.98 |
| LM2576HV-ADJ | Create Design See CC note below | 3.0A | 75% | Y | N | Adj. Vout | 52 $2.98 |

Suggested Switching Regulators - Flyback Topology

| Product Folder | Webench Tools | Max Curr. | Typ. Eff. | On/Off | Err. Pin | Other Features | Freq. kHz | Est. Price |
|---|---|---|---|---|---|---|---|---|
| LM2585-3.3 | Create Design | 3.0A | 80% | N | N | SoftStart | 100 | $3.17 |
| LM2585-ADJ | Create Design | 3.0A | 80% | N | N | SoftStart, Adj. Vout | 100 | $3.17 |
| LM2586-3.3 | Create Design | 3.0A | 80% | Y | N | Sync, SoftStart | 100 | $3.27 |
| LM2586-ADJ | Create Design | 3.0A | 80% | Y | N | Sync, SoftStart, Adj. Vout | 100 | $3.27 |
| LM2587-3.3 | Create Design | 5.0A | 80% | N | N | SoftStart | 100 | $4.17 |
| LM2587-ADJ | Create Design | 5.0A | 80% | N | N | SoftStart, Adj. Vout | 100 | $4.17 |
| LM2588-3.3 | Create Design | 5.0A | 80% | Y | N | Sync, SoftStart | 100 | $4.27 |
| LM2588-ADJ | Create Design | 5.0A | 80% | Y | N | Sync, SoftStart, Adj. Vout | 100 | $4.27 |
| LM2577-ADJ | Create Design | 3.0A | 80% | N | N | SoftStart, Adj. Vout | 52 | $3.12 |

Design Assistant Messages

*Fig. 16B*

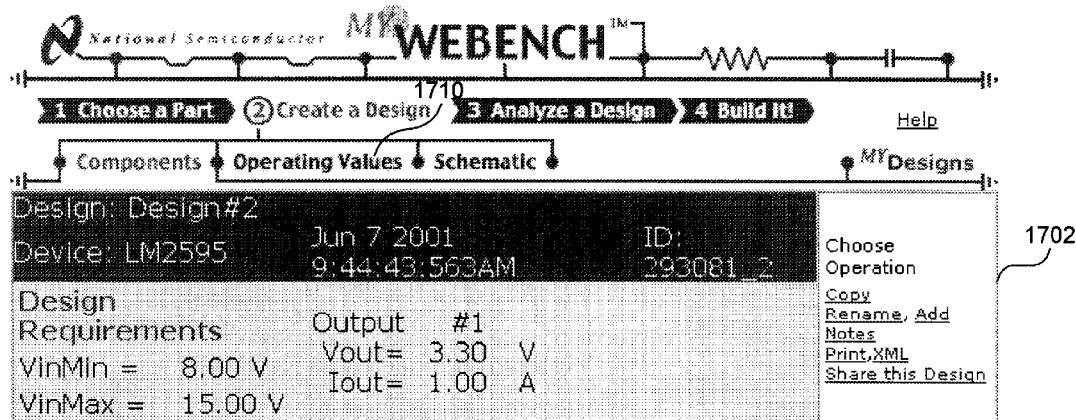
Fig. 17

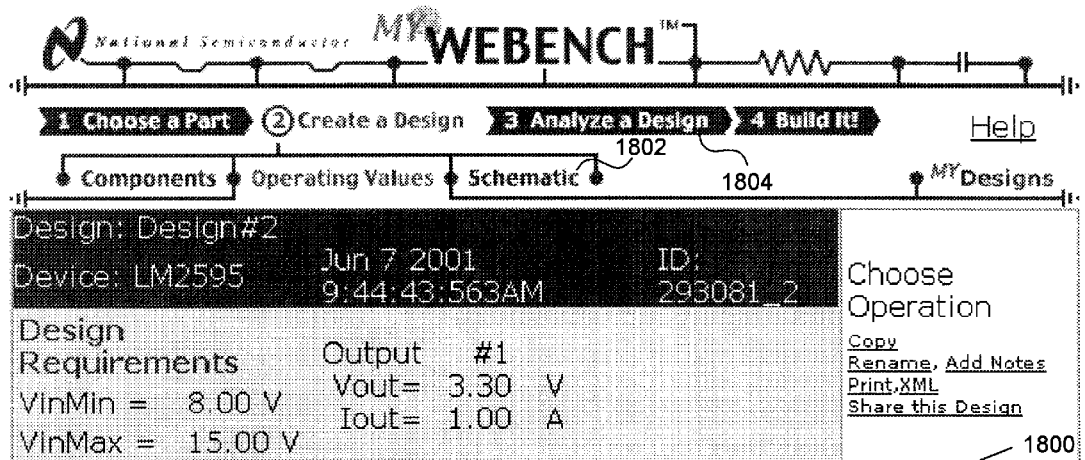

| Operating Values | | | |
|---|---|---|---|
| # | Description | Parameter | Value |
| 1 | Pulse Width Modulation (PWM) frequency | Frequency | 150 kHz |
| 2 | Continuous or Discontinuous Conduction mode, inductor current goes to zero in Discontinuous Conduction | Mode | Cont |
| 3 | Total Output Power | Pout | 3.3 W |

| Operating Point at Vin= 15.00 V, 1.00 A | | | |
|---|---|---|---|
| # | Description | Parameter | Value |
| 1 | Bode Plot Crossover Frequency, indication of bandwidth of supply | Cross Freq | 16.6 kHz |
| 2 | Steady State PWM Duty Cycle, range limits from 0 to 100 | Duty Cycle | 53.1 % |
| 3 | Steady State Efficiency | Efficiency | 74.5 % |
| 4 | IC Junction Temperature | IC Tj | 94.9 øC |
| 5 | IC Junction to Ambient Thermal Resistance | ICThetaJA | 34.9 øC/W |
| 6 | Bode Plot Phase Margin | Phase Marg | 25.2 Deg |
| 7 | Peak-to-peak ripple voltage | Vout p-p | 0.018 V |

*Fig. 18A*

| Current Analysis | | |
|---|---|---|
| # Description | Parameter | Value |
| 1 Input Capacitor RMS ripple current | Cin IRMS | 0.50 A |
| 2 Output Capacitor RMS ripple current | Cout IRMS | 0.052 A |
| 3 Peak Current in IC for Steady State Operating Point | IC Ipk | 1.1 A |
| 4 ICs Maximum rated peak current | IC Ipk Max | 1.3 A |
| 5 Average input current | Iin Avg | 0.55 A |
| 6 Inductor ripple current, peak-to-peak value | L Ipp | 0.18 A |

| Power Dissipation Analysis | | |
|---|---|---|
| # Description | Parameter | Value |
| 1 Input Capacitor Power Dissipation | Cin Pd | 0.075 W |
| 2 Output Capacitor Power Dissipation | Cout Pd | 0.268 mW |
| 3 Diode Power Dissipation | Diode Pd | 0.20 W |
| 4 IC Power Dissipation | IC Pd | 0.71 W |
| 5 Inductor Power Dissipation | L Pd | 0.10 W |

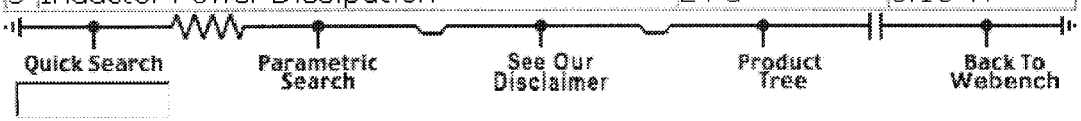

Quick Search   Parametric Search   See Our Disclaimer   Product Tree   Back To Webench About Languages . Website Guide . About "Cookies" . National is QS 9000 Certified
Site Terms & Conditions of Use . Copyright 2001 © National Semiconductor Corporation
Privacy/Security Statement . MY: Preferences . Feedback

*Fig. 18B*

1800

National Semiconductor MyWEBENCH

1 Choose a Part > 2 Create a Design > 3 Analyze a Design > (4) Build It!    Help

• Buy It! • Documentation •                                                                    • MyDesigns Design : 2              2004

Your design is supported by a Webench Custom Evaluation Kit. Ordering this kit from Pioneer-Standard provides you with everything you need to realize a prototype of your design quickly and at a very low price.    — 2000

If for some reason you decide not to order the Custom Evaluation Kit you can always order only the IC from us here.
                          2004                           2006

Custom Evaluation Kit

Bill of Materials    View Assembly Doc | Order this Kit from Pioneer-Standard >>

| Item | Manufacturer Part | Qty | Attributes | Component Name(s) | Pioneer Price | Pioneer Availability |
|---|---|---|---|---|---|---|
| 1 | Keystone 5015 | 5 | | TP1, TP2, TP3, TP4, TP5 | $0.20 | Out of Stock |
| 2 | National Semiconductor 551011367-031 | 1 | Surface Mount, etc | PC Board | $5.00 | > 10 In Stock |
| 3 | Vishay-Sprague 593D336X9025E2T | 2 | Cap = 33uF ESR = 0.2 Ohms | Cout | $0.83 | > 10 In Stock |
| 4 | Vishay-Sprague 593D475X0050D2T | 2 | Cap = 4.7uF ESR = 0.6 Ohms | Cin | $0.83 | > 10 In Stock |
| 5 | Vishay-Dale CRCW1206-000RT1 | 1 | Resistance = 0 Ohms | Rfb2 | $0.03 | > 10 In Stock |
| 6 | National Semiconductor LM2595S-3.3 | 1 | Package=S, Voltage option=3.3, Topology=Buck | IC | $2.17 | > 10 In Stock |
| 7 | General Semiconductor SL42-T\R | 1 | VFatIo = 0.42 V | D1 | $0.97 | > 10 In Stock |
| 8 | Coiltronics UP4B-680 | 1 | L = 68uH DCR = 0.103 Ohms | L1 | $1.80 | > 10 In Stock |
| 9 | Vishay-Vitramon VJ1206Y104KXAAT | 1 | | Cinx | $0.05 | > 10 In Stock |
| | | | | Total | $14.34 | |

2002

Bill of Materials   View Assembly Doc | Order this Kit from Pioneer-Standard >>
                          2004                           2006

Order the IC
- Order the LM2595S-3.3 in volume. — 2008
- Order a Free Sample — 2010

*Fig. 20*

CLIENT-SERVER SIMULATOR, SUCH AS AN ELECTRICAL CIRCUIT SIMULATOR PROVIDED BY A WEB SERVER OVER THE INTERNET

CROSS-REFERENCE TO RELATED APPLICATION

This application claims the benefit of U.S. Provisional Patent Application No. 60/189,627, filed Mar. 14, 2000, currently pending.

TECHNICAL FIELD

This disclosure relates to computer simulation tools.

BACKGROUND

A product designer, such as a designer of electrical component systems, typically must first consider which parts to use within a product being designed. Before selecting a part, the designer must hunt through specification sheets published by vendors that list parts which may fulfill the designer's needs in the product being designed. Manufacturers' data sheets typically list part information under a set of specific or limited range of conditions. To find out the relevant parameters for a set of conditions not listed, the designer must order sample parts or an evaluation board and perform time-consuming, detailed measurements. The designer may also need to talk with one or more vendors. Thereafter, the designer typically must order samples from one or more vendors or manufacturers and patiently wait to receive them. Thereafter, the designer must evaluate each part, which can be a lengthy process involving building circuits, and then testing and debugging the circuits. Often, the designer must also talk to application engineers and sales people with respect to the manufacturers and vendors to identify and select the best part for the product being designed.

In general, each step in the product design process is long, and the part selection process exacerbates this length of time. Manufacturers and vendors wish to disseminate information regarding new parts, which in the past typically involved publishing data sheets and books regarding each electrical device and its characteristics. Thereafter, manufacturers published and distributed computer readable media with electronically stored, edited or complete versions of the data sheets, such as a CD-ROM or magnetic disks. Currently, many manufacturers and vendors electronically publish such information over the Internet.

The Internet comprises a vast number of computers and computer networks interconnected through communication channels. The Internet is used for a variety of reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over hand-held, wireless devices, such as cell phones and portable computers (e.g. PDAs).

Despite the use of the Internet, manufacturers and vendors of electrical devices and components still have difficulty efficiently and effectively providing information regarding their products to designers, since manufacturers data sheets typically list part information under a set of specific or limited range of conditions. Furthermore, designers have difficulty identifying the best part for a product being designed. Even if a best part is identified, the designer must still create a working circuit for the product, with all selected components, test the circuit, create a design specification, and effectively work through the entire design process. Thus, while information regarding parts may be more easily obtained via the Internet, the product design process is still lengthy and complex.

BRIEF DESCRIPTION OF THE DRAWINGS

FIG. 2A is an example of a web page depicting a table of devices that may be simulated under embodiments of the invention.

FIG. 2B is a database table illustrating an example of data stored in a database with respect to five different electronic devices.

FIGS. 3A and 3B together are an example of a web page displaying a reference application circuit for a Champion CM8685 device.

FIGS. 7A and 7B are examples of the web page of FIG. 4 showing how a user may change component values in the circuit.

FIG. 14 is an example of a web page displaying options for creating on-line simulations, including the ability to design a power supply.

FIGS. 16A and 16B together are an example of a web page displaying suitable components produced by the manufacturer that satisfy the requirements provided by a user of the web page of FIG. 15.

FIG. 17 is an example of a web page illustrating suitable components for use in a power supply designed by the user by selecting a switching regulator displayed in FIG. 16A.

FIGS. 18A and 18B together show an example of a web page illustrating operating values for a power supply employing the components displayed in FIG. 17.

FIG. 20 is an example of a web page illustrating a bill of materials to permit the user to purchase the components of FIG. 17.

Figure 1A:
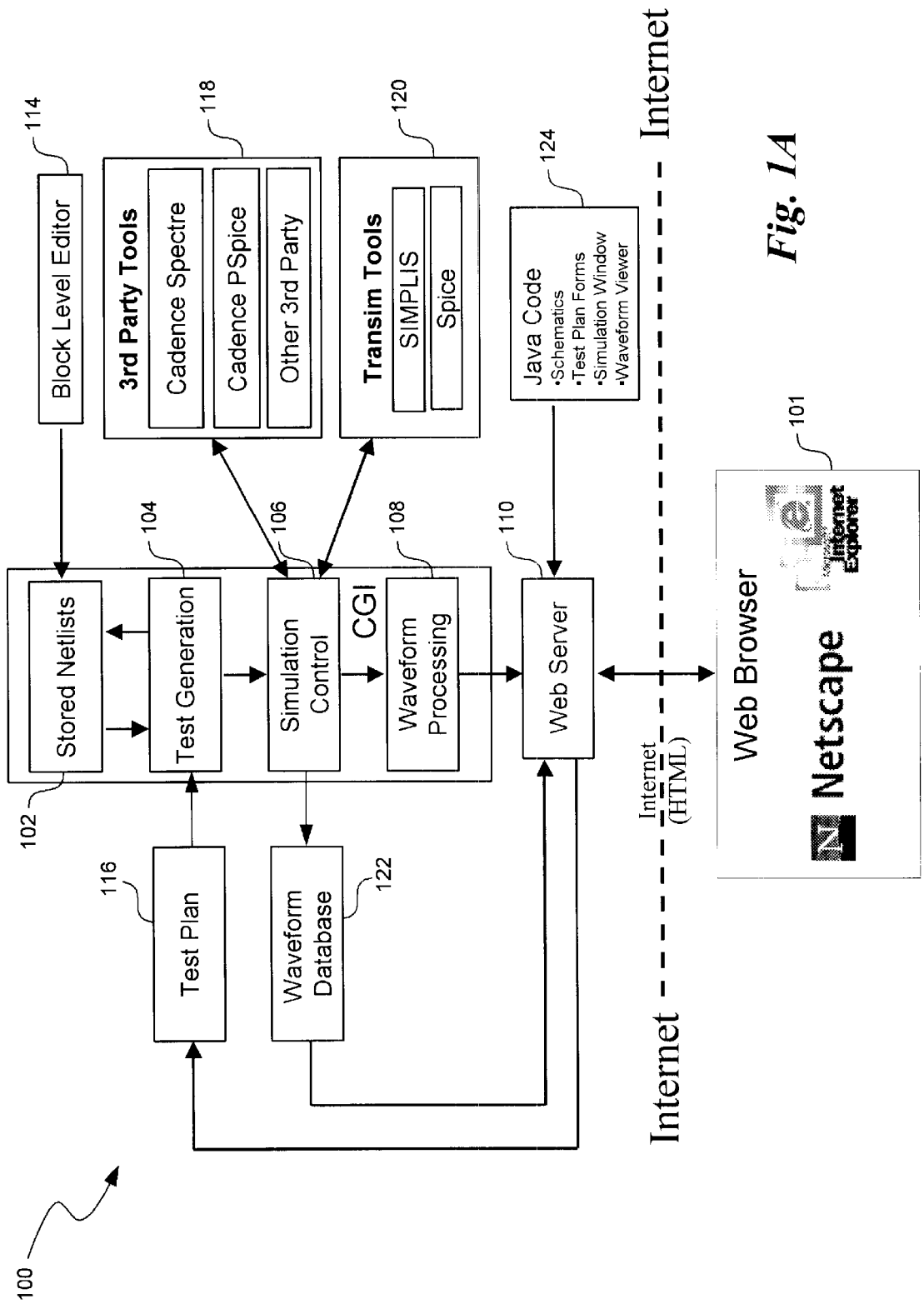
FIG. 1A is a block diagram illustrating an example of server-side software architecture under one embodiment of the invention.

In the drawings, identical reference numbers identify identical or substantially similar elements or acts. To easily identify the discussion of any particular element or act, the most significant digit or digits in a reference number refer to the Figure number in which that element is first introduced (e.g., element 1104 is first introduced and discussed with respect to FIG. 11).

A portion of this disclosure contains material to which a claim for copyright is made. The copyright owner has no objection to the facsimile reproduction by anyone of the patent document or the patent disclosure (including Figures), as it appears in the Patent and Trademark Office patent file or records, but reserves all other copyright rights whatsoever.

The headings provided herein are for convenience only and do not necessarily affect the scope or meaning of the claimed invention.

DETAILED DESCRIPTION

Described in detail below is a system and corresponding method for providing designs and simulations, such as for engineers designing products with electrical components. In one embodiment, an internet-based marketing and design service, generally referred to herein as "WEBSIM," allows manufacturers of analog and mixed signal semiconductor devices to provide online design centers that allow end users to quickly select, try and evaluate the manufacturer's products. WEBSIM integrates modeling technology, simulation capability, and an easy-to-use browser interface that allows designers or users to select products on a manufacturer's web site to evaluate and modify circuit values assumed in a circuit configuration, simulate assumptions or modifications, and immediately receive resulting waveforms online. The designer or user needs no special software or hardware other than a web browser. Furthermore, WEBSIM provides dynamic interactive data about semiconductor products more rapidly and at less cost than traditional marketing efforts.

As explained herein, aspects of the invention permit manufacturers to provide dynamic information on products to interested users, gather information about customers' requirements, maintain control of the device evaluation experience, create positive customer (and user) experience at manufacturers' web sites, support smaller customer accounts with cost savings and virtual tools, quickly generate worldwide impact via the Internet, and enjoy a single, easily maintained point of control of device data on the Internet.

As also described herein, aspects of the invention permit end users to reduce time spent in evaluating products or devices, quickly obtain technical information specific to their hypothetical questions or analyses, reduce time to market of a product under design, and avoid having to investigate inexpensive software and hardware to obtain values under sophisticated simulations.

The following description provides specific details for a thorough understanding of, and enabling description for, embodiments of the invention. However, one skilled in the art will understand that the invention may be practiced without these details. In other instances, well known structures and functions have not been shown or described in detail to avoid unnecessarily obscuring the description of the embodiments of the invention.

Representative System

Referring to FIG. 1A, an example of software architecture employed by a server for providing simulation tools is shown as a system 100. The server may be within a corporation's Internet or available via the Internet from a third party. Users gain access to simulation tools through a browser 101, executing the simulation on the server instead of on their client computers. Having the simulation tools reside in one location instead of on multiple workstations or PCs has considerable advantages. For example, it is economically feasible to place computing power and memory resources behind a focused simulation environment. Furthermore, the simulation tools can be constantly upgraded, ensuring that users or designers have the most advanced capabilities at all times. Designers will, by default, use the same set of simulation tools, allowing for a more structured organized approach to simulation within an organization.

Circuit descriptions for various devices are stored as netlists 102, which are built and tested in conjunction with device manufacturers. A "netlist" is a list of names of symbols or parts and their connection points that are logically connected in each net of a circuit. A netlist can be captured from properly prepared schematic drawing files of an electrical computer-assisted engineering (CAE) application. The manufacturers may check created simulations based on bench data to ensure that the simulations are accurate under a wide range of conditions. Each test can use a different netlist to best model the particular test condition. The stored netlists exchange data with a test generation block 104 that generates tests to be performed on a circuit. Once established, a simulation control block 106 controls waveform simulation based on the circuit, while a waveform processing block 108 generates relevant waveforms based on one or more user-selected values. The test generation block provides tools for displaying schematics defined by a netlist. The web server receives the waveforms processed by the waveform processing block and provides them over the Internet to the browser 101. The blocks 102, 104, 106 and 108 may be represented as CGI scripts in PERL, C++ or Java. "CGI" scripts, or "common gateway interface" scripts, refer to programs or scripts, usually executed on a web server, that perform actions when a user clicks on certain buttons or parts of a web page screen.

When generating the stored netlists, a developer may employ a block level editor or schematic editor 114 to create such netlists. Examples of schematic editors include Concept from Cadence Design Systems, and Rapid Circuit Development Tool ("RCDT") from Transim Technology Corporation, as well as others known to those skilled in the relevant art. RCDT is a Java-based development tool that allows an engineer or other developer to draw a circuit schematic that includes all necessary information for the system, such as the location of probe and component hot spots, component default values, and circuit sources and loads (as described herein). RCDT may then directly generate the circuit netlist, .tpl file, .layout file, and .GIF file. Without RCDT, a netlist may be created using Cadence Concept schematic editor (or other commercially available schematic drawing tool). Thereafter, the other files (.tpl, .layout, and .GIF) are manually created.

A test plan block 116 employs tools to refine the test generation procedures under the test generation block. In addition to information regarding a schematic and components within the schematic, the system requires information regarding which type of electrical test simulation to run for the system to correctly construct the simulation netlist, which is provided under block 116. Examples of various test plans include loop gain measurements, line transient responses, load transient responses, steady-state analyses, and other tests described herein or known to those skilled in the relevant art. A waveform database 122 stores waveforms generated under the simulation control block 106.

Various tools may be employed for generating simulations under the simulation control block. For example, third party tools may be employed, including SIMEC by Simplorer, PSPICE or Spector by Cadence, ADS by Agilent, or other third party tools as noted by block 118 in FIG. 1A. Alternatively or additionally, as represented by block 120, tools may be provided by a company hosting the server (shown as "Transim" in the Figures), such as the known PSPICE tools or "SIMPLIS." Basically, different simulators may be employed for different devices to be modeled. Any device that is switching in nature (e.g., simple switchers, switched capacitor converters, etc.) may use SIMPLIS, while linear circuits such as low dropout (LDO) regulators may use PSPICE. Further information regarding SIMPLIS is found in Appendix A. SIMPLIS is provided as part of a product Power Analyzer, provided by Transim Technology Corporation of Portland, Oreg. Further details may also be found in U.S. Pat. No. 4,918,643, entitled "Method and Apparatus for Substantially Improving the Throughput of Circuit Simulators, issued Apr. 17, 1990.

Under the server system 100, the server initiates a simulation. Using SIMPLIS (which may be forty times faster than PSPICE), waveform simulations are typically completed within two minutes under the simulation control block. Waveform data is then processed under the waveform processing block and downloaded to the user's web browser 101 to be displayed and further processed using a Java-based waveform viewer, described below. The waveform viewer operating on the client machine includes a zooming feature as well as common waveform math functions such as minimum ("min"), maximum ("max"), average and root mean squared ("RMS"). Users may move a cursor in the waveform browser to obtain more precise measurements as described herein.

Unless described otherwise herein, the blocks depicted in all Figures are described in detail in the above-noted and cross-referenced provisional patent application. Indeed, much of the detailed description provided herein is explicitly disclosed in the provisional patent application; most or all of the additional material of aspects of the invention will be recognized by those skilled in the relevant art as well known or inherent in the detailed description provided in this provisional patent application. Those skilled in the relevant art can implement aspects of the invention based on the detailed description provided in the provisional patent application.

Figure 1B:
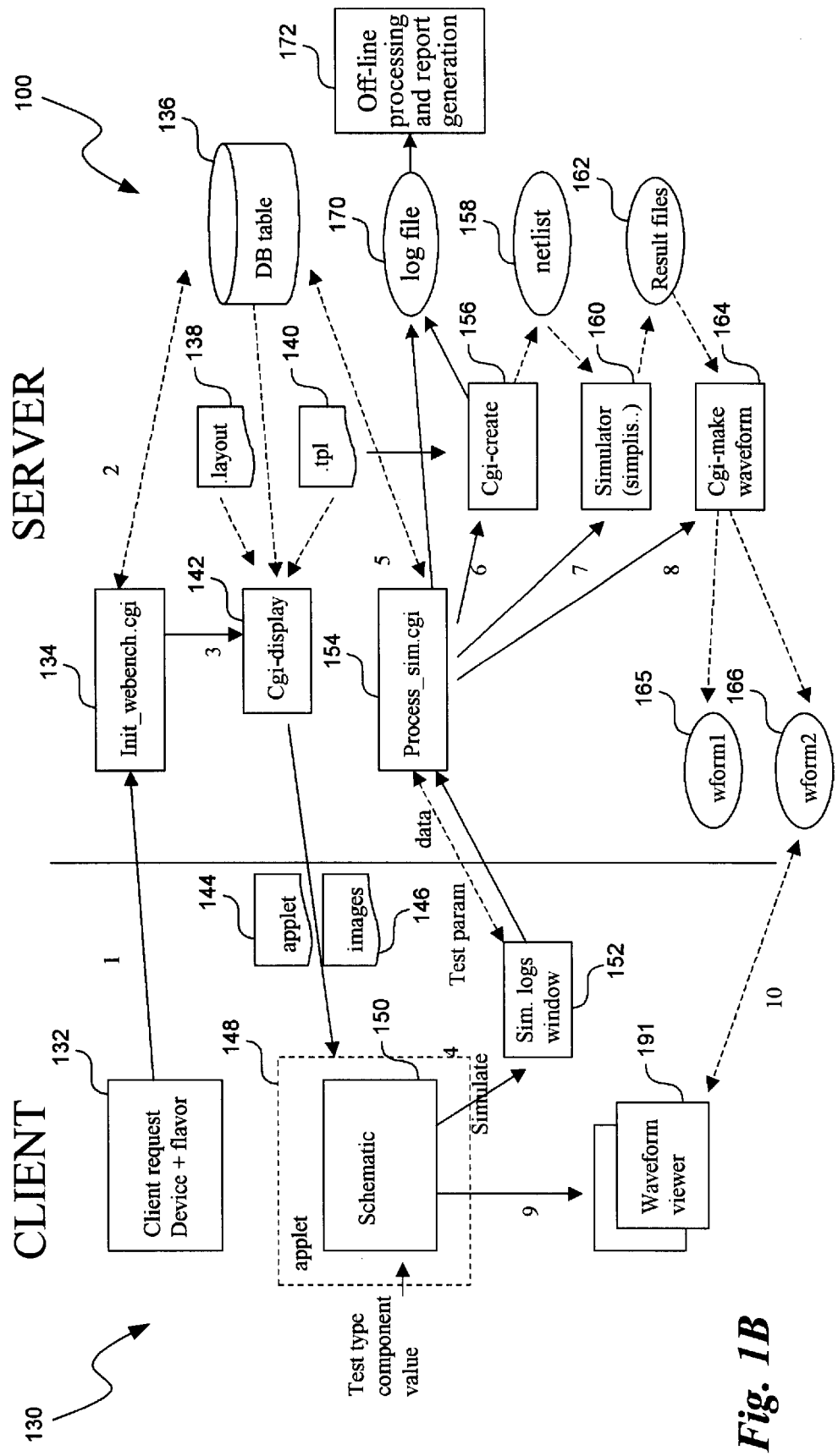
FIG. 1B is a flow diagram illustrating the flow of data and commands between client and server under the embodiment of FIG. 1A.

Referring to FIG. 1B, a detailed flow diagram shows the exchange of data and commands within the server system 100 and with a client computer 130. Initially, the client computer under block 132 requests a particular device and flavor to simulate. The "flavor" refers to a particular variety of a device. For example, a given device or part may be provided by a manufacturer in 3.3 volt, 5 volt and 12 volt versions. The client computer may also request a particular circuit property. In practice, as described below, the client computer may access one or more web pages to retrieve from a server, such as the server 100, a web page into which the user may input the desired device, flavor, and other parameters for a simulation. The client computer then transmits the completed form as an HTML CGI string. Alternatively, the client computer may retrieve a web page that lists devices and associated varieties of each device (flavors) with hypertext links associated with each variety. By pointing and clicking on one of the hypertext links, the client computer transmits the appropriate information to the server to initiate a simulation.

Referring to FIG. 2A, an example of a web page 200 is shown that includes a table 202 of switching regulators provided by a semiconductor manufacturer, National Semiconductor. As shown, the devices in the table include one or more output of voltages, such as 3.3, 5, 12 and "ADJ" (i.e., adjustable). The output voltage values correspond to flavors for each device and each has a hypertext link associated therewith. By positioning a pointer 204 on one of the hypertext links and clicking thereon, the client computer transmits appropriate data to the server for a simulation. Data transmitted is listed in a status bar 206 in the web page.

Referring back to FIG. 1B, in block 134, the server executes a code block "Init_webench.cgi" that searches a database table 136 for an appropriate netlist or other description of a circuit incorporating the device and flavor received from the client computer (e.g., "http://www.transim.com/cgi/bin/init_webench.cgi?Device=lm2671&Flavor=ADJ", or http://www.transim.com/cgi/bin/init_webench.cgi?Device=cm8685&Flavor=300&Circuit=4pole&web_id=champion"). Based on values provided by the CGI string, Init_webench looks up and retrieves an associated file in the database table 136. The associated file or files include a layout file 138, a template file 140 (".tlp file"), and the location of a schematic graphics interface file (".gif file"). The layout file includes information about each changeable component on the client side schematic display, such as the x and y coordinates of component symbols. The .tpl file is a netlist template that contains information on how to build a simulation netlist once all component values and tests to run are known. In general, the Init_webench code generates html and schematics and initiates a java applet, as described below.

An example of a table stored in the database table 136 is shown in FIG. 2B. As shown, each row of the table corresponds to a particular device and flavor. The device LM2678 has four flavors and thus occupies four rows of the table. Associated with each device and flavor is a Cgi_display, a layout file, a template file, a CGI-create file (described below), a simulator and a code base. Examples of .layout and .tpl files may be found in the above-referenced provisional patent application. In general, these files indicate positions of components within a displayable screen, buttons that a user may click on, values that a user may change for components, and the like, as is known by those skilled in the relevant art. Thus, a user may click on a given component to change its value by using the client browser, as described below. The .layout file, in other words, contains the on-screen pixel coordinates and sizes for the user-clickable hot spots used to select probe points and select components for editing, as described below with respect to suitable web pages or screen shots. The .tpl file is a netlist template that contains information on how to build a simulation netlist once all component values and tests to run are known to the system. A single .tpl file can support one or more integrated circuits to be simulated, including all of the variations and tests associated with the device or devices. A .tpl file is effectively a master netlist where all of the netlist components that are associated with editable schematic symbols that can be changed on the schematic are replaced with variable names. In addition, the .tpl file has groups of netlist statements that can be asserted ("turned on) or unasserted ("turned off"), depending on the device simulation and test requirements. Under this .tpl schema, several hundred unique netlists can potentially be derived from a single .tpl file, which increases efficiency of process and reduces maintenance costs.

Under the table of FIG. 2B, the column "simulator" indicates which simulator is to simulate the netlist ultimately constructed by block 156. The code base refers to the directory path that Init_webench.cgi searches to find the necessary files. The code base is similar to a database index, and may be replaced by an index under an alternative embodiment where a file-oriented structure is replaced with database records, as described herein.

In block 142, the server executes a code block "Cgi_display". Cgi_display is a server side display program that receives as input the layout file 138 and the .tpl file 140 from the database 136. The output of the Cgi_display block is HTML code that is processed by the client side applet to initialize the applet and display the schematic and the associated component values on the schematic. After Cgi_display executes, the applet is up and running. Further details regarding the applet are described below. The Init_webench.cgi, and Cgi_display code may be implemented in PERL script, C++ or Java.

In block 148, a client-side applet is initiated and a schematic displayed by the client computer (shown as block 150). The user may select or set component values, select a test, and start a simulation via the applet. After a user selects the type of test to perform and particular component values, the user clicks on a "simulate" button within the applets user interface or Control Panel that may cause the applet to display a simulation log window to display HTML messaging (block 152). The applet creates a tcp/ip socket to the server 100 for messaging and communication.

Figure 1C:
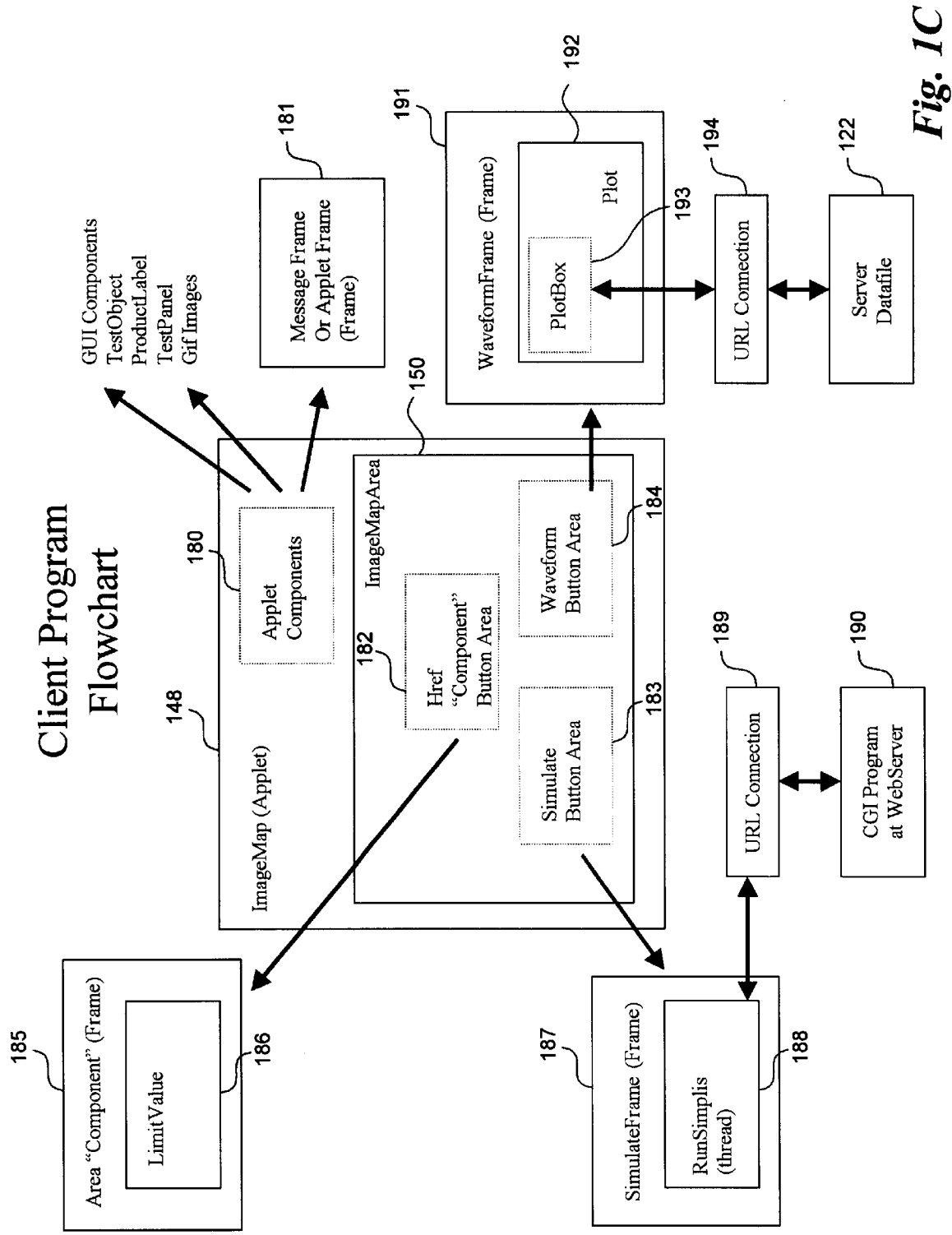
FIG. 1C is a block diagram of an applet employed under the flow of FIG. 1B.

Referring to FIG. 1C, an example of the applet 148 with its components and flow, is shown. The applet 148 may be implemented as a Java applet, and has the following three main functions: to control the display and modification of a circuit schematic displayed to the user, to control the display and modification of the control panel that permits the user to modify components and select a simulation, and to control the display and modification of the waveform viewer (including manipulating markers and performing marker calculations). The applet includes an image map or display description that instructs the client 130 how to display the circuit schematic within a predefined image map area, and user interface controls, such as buttons. The applet includes several components 180, including graphical user interface ("GUI") components, .gif images, TestObject, ProductLabel and TestPanel.

The TestObject, ProductLabel and TestPanel objects are GUI components that allow the schematic and control panel display to be dynamically modified based on which test is selected. In other words, these three objects are control panel objects that form part of the client-side Java applet. The TestObject object corresponds to the name of the test selected from a pull-down menu (described below), and the test parameters from fill-in forms or fields located in the control panel (also described below). The TestPanel object is a graphical object in the control panel graphical user interface that contains the pull-down menus and fill-in forms or fields associated with the TestObject object. The ProductLabel object defines the schematic display properties of different versions of an integrated circuit displayed in a displayed reference application circuit, e.g., the device name, device part number, device pin names, device pin numbers, etc. A message frame or applet frame 181 defines a frame for enclosing messages or information to be displayed to a user, including error messages. The applet GUI components include one or more hypertext references ("HREF") for user interface aspects within the displayed schematic 150, including a "component" button area 182, a simulate button area 183 and a waveform button area 184 (each based on defined screen areas). When a user clicks on the button area, the applet causes a component frame 185 to be displayed, which includes a LimitValue 186 that defines values or parameters a user may select or adjust with respect to a given component. Clicking on the simulate button area causes the applet to display a SimulateFrame (or Control Panel) 187 that displays to the user a control panel which permits the user to select a type of circuit analysis to be performed, starting and stopping parameters (such as frequencies) and optional design tips. Additionally, the applet begins an execution thread RunSimplis 188 that establishes a URL connection 189 with the server 100 to execute a CGI program 190 (e.g., Process_sim.cgi, described below).

Clicking on the waveform button area 184 causes the applet to display a waveform frame 191 that includes within the frame a predefined plot area 192 into which a waveform is displayed. A plot PlotBox routine 192 establishes a URL connection 194 with the server to retrieve a previously created and stored waveform (stored in the waveform database 122). The URL connection contains a path identifying the appropriate waveform file in the waveform database. The server 100 then generates a waveform and/or retrieves from the waveform database 122 a waveform plot to display in the plot area.

Referring back to FIG. 1B, in block 154 the server 100 receives the request for a simulation and invokes a "Process_sim.cgi" code block that, in turn, invokes two sub-processes to create a valid simulation netlist, invoke a simulator and process the simulator output. This occurs when the user clicks a "Go" button described below or "simulate" button described above. The first sub-process, "Cgi_create" (block 156), retrieves HTML parameters associated with the schematic, such as component parameters and type of test, and provides the parameters to, or creates, a .tlp file for generating a valid simulation netlist 158 (also referred to as a "deck"). The Process_sim.cgi code also initiates the simulator (block 160) to which the netlist is provided, and the simulator generates result files 162, based on the component parameters, test type, etc. and the netlist. The simulatator. may be commercially available simulators, such as PSPICE or SIMPLIS.

Alternatively, the client-side applet can communicate the schematic, test and component parameters using XML instead of HTML. XML has the advantage of passing information via a data object where the data object is described in a Data Type Definition file. The XML objects can be processed for use by the Process_sim.cgi code by a commercially available XML parser. New data object attributes such as a new component type then only require an update to the Data Type Definition file and not a modification to the Process_sim.cgi code. XML, therefore, makes the applet/server communication process more extensible and maintainable.

While there is not an exact mapping between FIG. 1A and FIG. 1B, the test generation, simulation control and test plan blocks 104, 106 and 116 of FIG. 1A are basically performed by the Process sin.cgi and CGI-create blocks 1B. In general, FIG. 1A provides a conceptual description of data flow under the system, while FIG. 1B provides a detailed depiction of the system. The second sub-process, "Cgi-makewaveform" (block 164), processes the resulting simulation output files 162 for display by the client applet, converts them into binary code, and compresses them for sufficient transmission to the applet, as described below. Two waveforms 165 and 166 are shown in FIG. 1B as generated by Cgi-makewaveform block which may correspond to two waveform plots displayed by the client computer, as described below.

The user may click on a probe or button displayed in the schematic 150. In response thereto, the applet instructs the client computer to display the waveform viewer frame 191. The waveform viewer frame 191 establishes the URL connection 194 with the server to request the waveform files 165 and 166 in the frame. The waveform data is downloaded to the client computer for local manipulation by the user and displayed by the client computer. The user may repeat the selection of test types and component values in the applet 148 to repeat blocks 152, 154, etc. when the user wishes to change component values or types of tests to run, or even to select new components.

The Process_sim.cgi code under block 154 may also create a log file 170. The log file indicates the component, test type, selected values, etc. selected by the user, and may identify the user by name, account number, ID, URL, etc. Under block 172, the server may perform offline processing and report generation to generate marketing information for use by the manufacturer or others, as described herein.

Under one embodiment, a reference application circuit is initially established for each device a manufacturer wishes to permit users to simulate (although several devices may use the same circuit). The manufacturer's design and application engineers may work together to create the reference application circuit, where the circuit fulfills the majority of the applications for which the device is employed by users. Thus, the circuit simulates a good representation of an ultimate circuit in which the device may be employed by users, although the system described herein allows users to modify the circuit to more closely simulate their actual application.

The server and client side code effectively construct the client computer display information and turn the displayed information into a simulation. The .tpl file provides instructions on how to build a simulation deck or netlist, while the .layout file provides the GUI information that gives the layout for components, values, connections, and controls displayed on the screen. The client applet tells the client computer how to display the information, where the layout file says what to display. The client applet communicates externally with the server using HTML. While separate .tpl and layout files are shown, an alternative embodiment employs a single database structure, thus eliminating the need for two separate files to generate a simulation.

Suitable Screen Displays of Web Pages

Referring to FIGS. 3A through 26, representative computer displays or web pages will now be described. The web pages may be implemented in XML (Extensible Markup Language), HTML (HyperText Markup Language) or other display description scripts that provide information to a client computer. The web pages provide facilities to receive input data, such as a form with fields to be filled in, pull-down menus or entries allowing one or more of several options to be selected, buttons, sliders, hypertext links or other known user interface tools for receiving user input in a web page. Of course, while one or more ways of displaying information to users in pages are shown and described herein, those skilled in the relevant art will recognize that various other alternatives may be employed. The terms "screen," "web page" and "page" are generally used interchangeably herein. While XML and HTML are described, various other methods of creating displayable data may be employed, such as the Wireless Access Protocol ("WAP").

The web pages are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 3A:
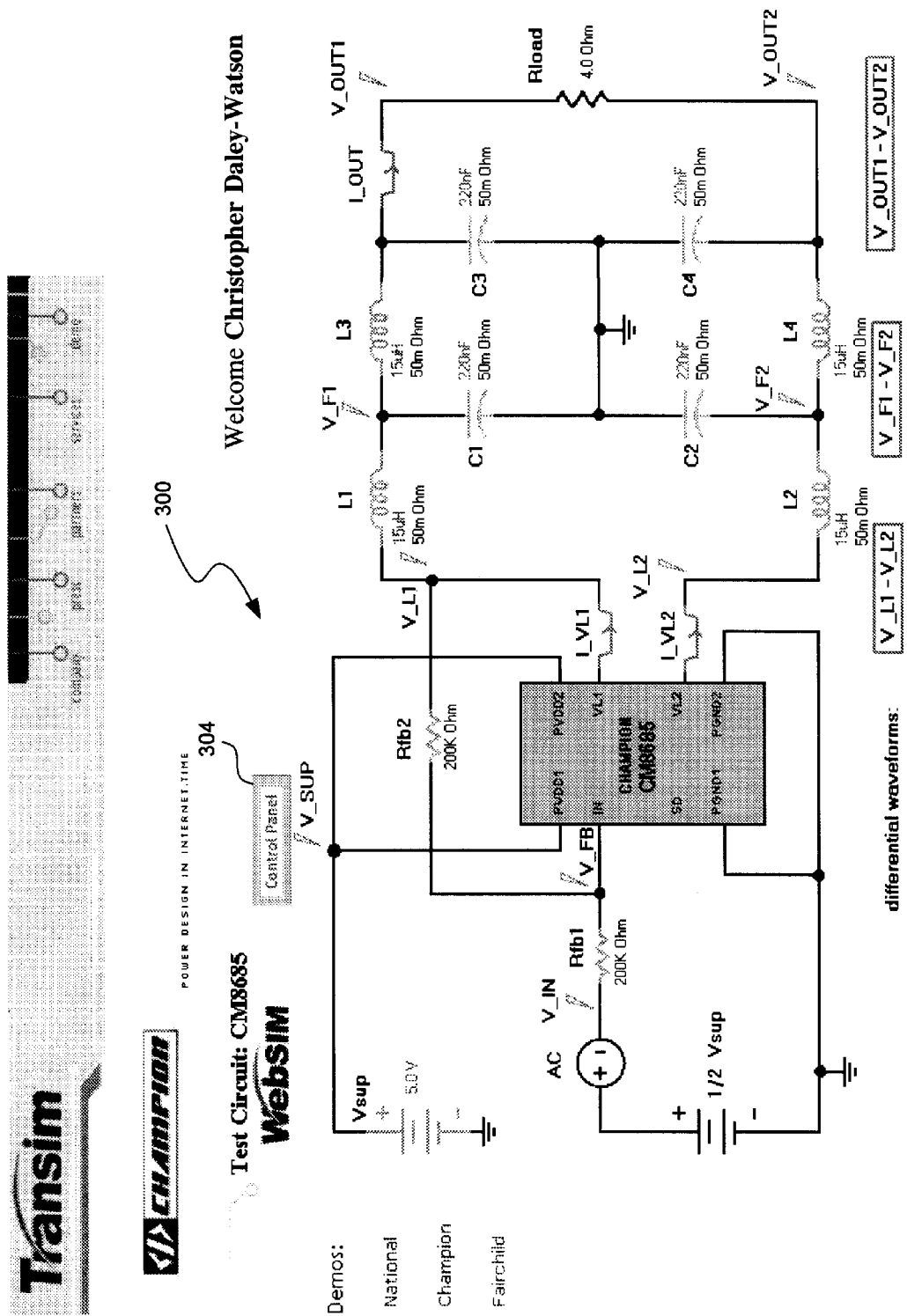

Referring to FIGS. 3A and 3B, an example of a web page is shown depicting a reference application circuit 300 for a device 302, model no. CM8685, manufactured by Champion. The reference application circuit shows a variety of electrical components with corresponding values depicted. A variety of nodes are highlighted with a downward pointing arrowhead (such as V_F1, Vsup, etc.). Once a simulation is generated, the user may click on nodes or probes indicated in the schematic to display waveforms, as described herein. Some or all of the values for components displayed in the schematic 300 may be altered by a user by clicking on such components. Components whose values may be changed may be indicated or displayed with a particular color (e.g, orange) which is distinct from other colors displayed in the schematic. When clicking on a component, a dialog box opens that allows the user to enter desired values (described below). After changing component values, the user clicks a Go button 402 to initiate a new simulation.

Figure 4:
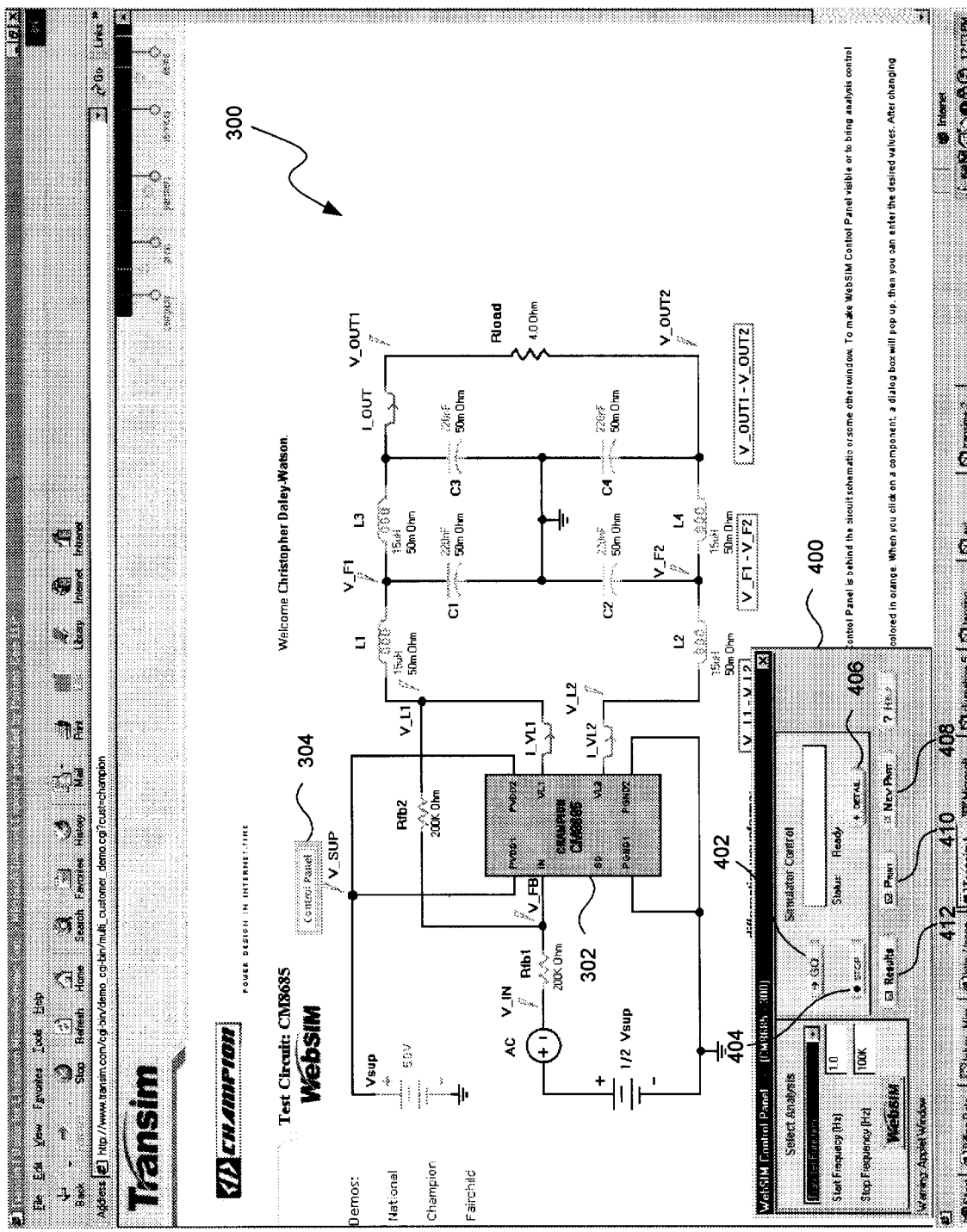
FIG. 4 is an example of the web page of FIGS. 3A and 3B, showing a control panel window.

Clicking on a Control Panel button 304 causes the client computer to display a control panel frame or window 400 as shown in FIG. 4. As shown in the control panel frame, the user may select several waveform analyses (with "Transfer Function" currently selected) and associated parameters (start and stop frequencies of 1.0 and 100 k selected). Other analysis types include Loop Gain Measurement, Efficiency or Total Harmonic Distortion. Clicking a "Go" button 402 initiates a simulation while a "Stop" button 404 stops the simulation. A "Detail" button 406 causes the client computer to display a log in a simulation log window (not shown). A "New Part" button 408 allows the user to change from the CM8685 device to a new device to test. A "Print" button 410 allows the user to print the circuit or resulting waveform and a "Results" button 412 allows the user to display a waveform frame if it has been closed or minimized on the screen.

Figure 5A:
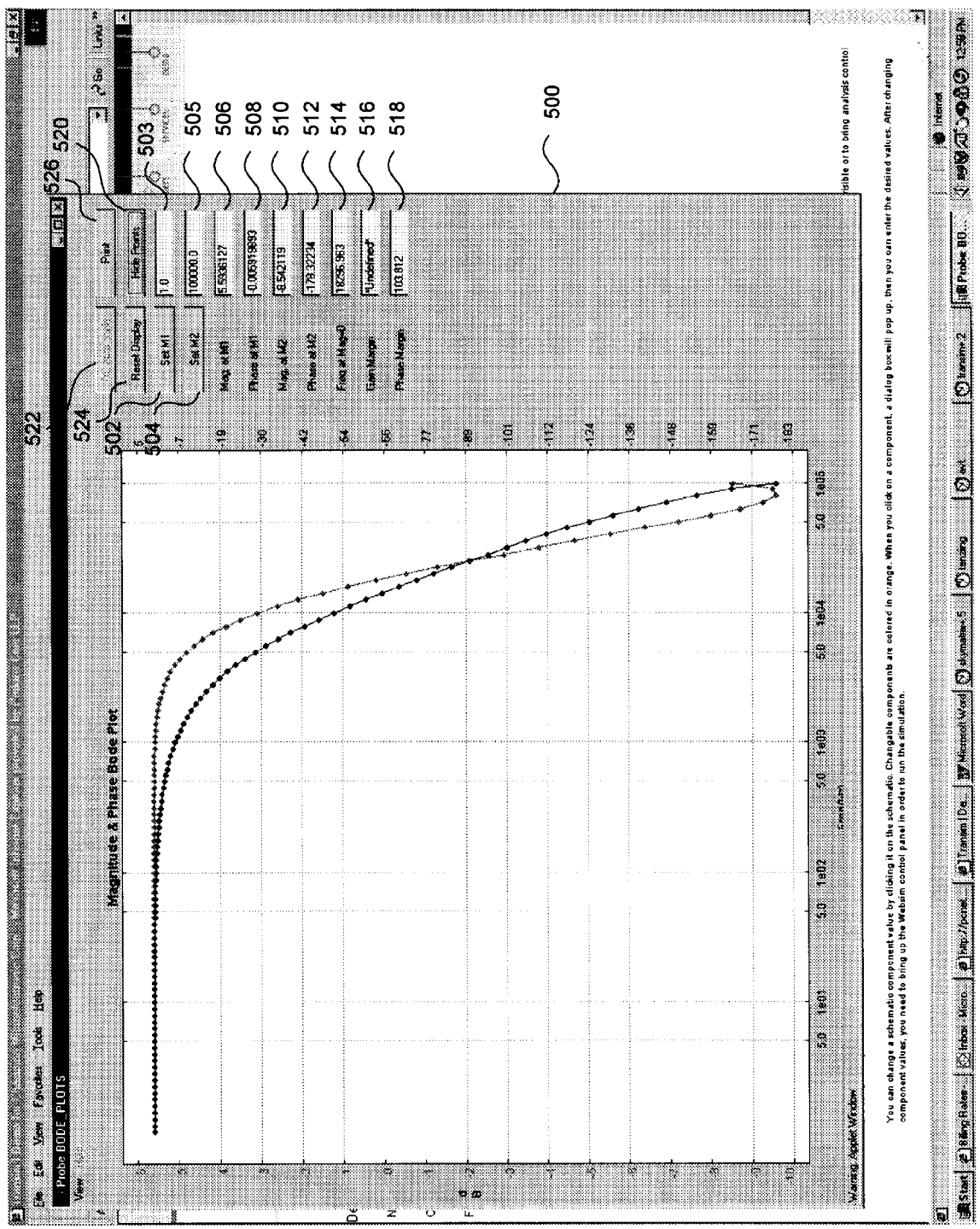
FIG. 5A is an example of a transfer function plot of magnitude versus frequency and phase versus frequency for the frequencies selected under the window of FIG. 4.
Figure 5B:
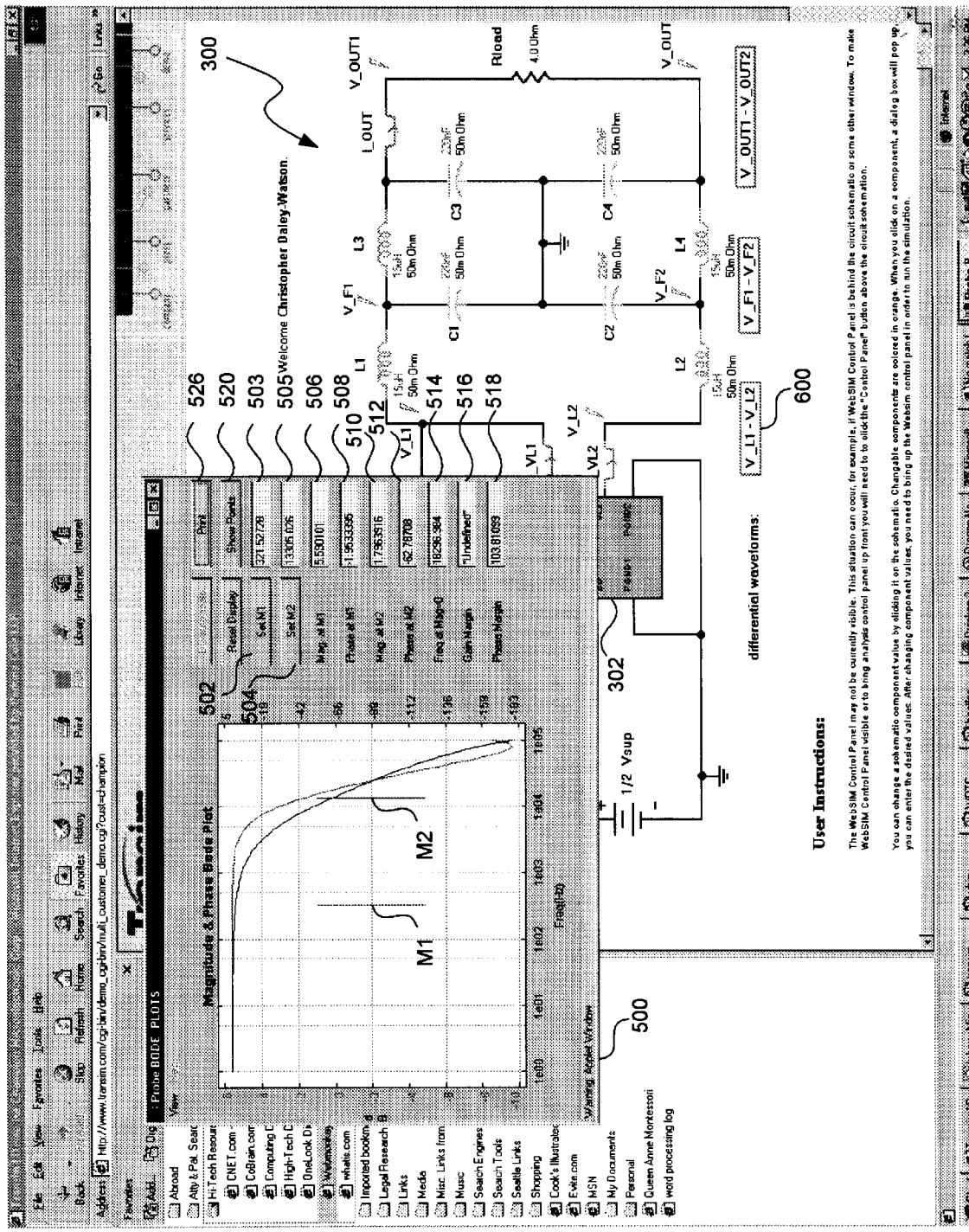
FIG. 5B is an example of the magnitude and phase plot of FIG. 5A, shown with the plotted points hid.

Referring to FIG. 5A, an example of a display waveform frame 500 displaying a magnitude and phase Bode plot is shown, which the client computer displays after clicking the Go button (or thereafter, the Results button 412). Magnitude and phase are displayed as two different color waveforms, such as red and blue lines, respectively. The user can select two markers in the waveform by clicking on a button "Set M1" 502 and a "Set M2" button 504 to set respective start and stop end points within the waveform, with values at their locations indicated in adjacent fields 503 and 505, respectively. As shown in FIG. 5B, marker M1 was set at 321.52728 hertz (field 503) while M2 was set at 13305.026 hertz (field 505). As a result, magnitude and phase at markers M1 and M2, as displayed in fields 506, 508, 510 and 512, change from the end points of the waveform as shown in FIG. 5A to the newly established points M1 and M2, with corresponding values as shown in FIG. 5B. Likewise, the client applet recomputes the frequency at magnitude 0, gain margin and phase margin from preset values displayed in fields 514, 516 and 518, respectively, to corresponding values in these fields, as shown in FIG. 5B. Clicking on a "Hide Points" button 520 causes the client applet to hide points for the waveforms, as also shown in FIG. 5B. By showing the points, the user can determine if there are any gaps in the data and determine whether a new simulation is required with different or narrowed variables to more accurately depict a particular portion of a waveform. For example, if gaps appear between the points, then the user may be required to change the start and stop frequencies in the control panel 400 to a narrower spread.

Note that setting markers M1 and M2 and recomputing magnitude, phase, frequency at magnitude equals 0, gain margin and phase margin is done locally at the client computer. As a result, users may interact quickly with the simulation tool described herein to change values and see resulting changes generated quickly. After initial selections are made to the schematic by the user and a simulation initiated, the simulation download may take a few minutes, but changes made to the simulation thereafter occur quickly since they are done locally by the client computer.

A DC Auto Scale button 522 allows the user to display certain waveforms with respect to ground. If clicked, the button then turns to a "AC Auto Scale" button that causes the client applet to fill the waveform within the frame. A Reset Display button 524 displays the waveform effectively between the DC Auto Scale and AC Auto Scale choices. A print button 526 allows the user to print out the waveform frame.

Figure 6A:
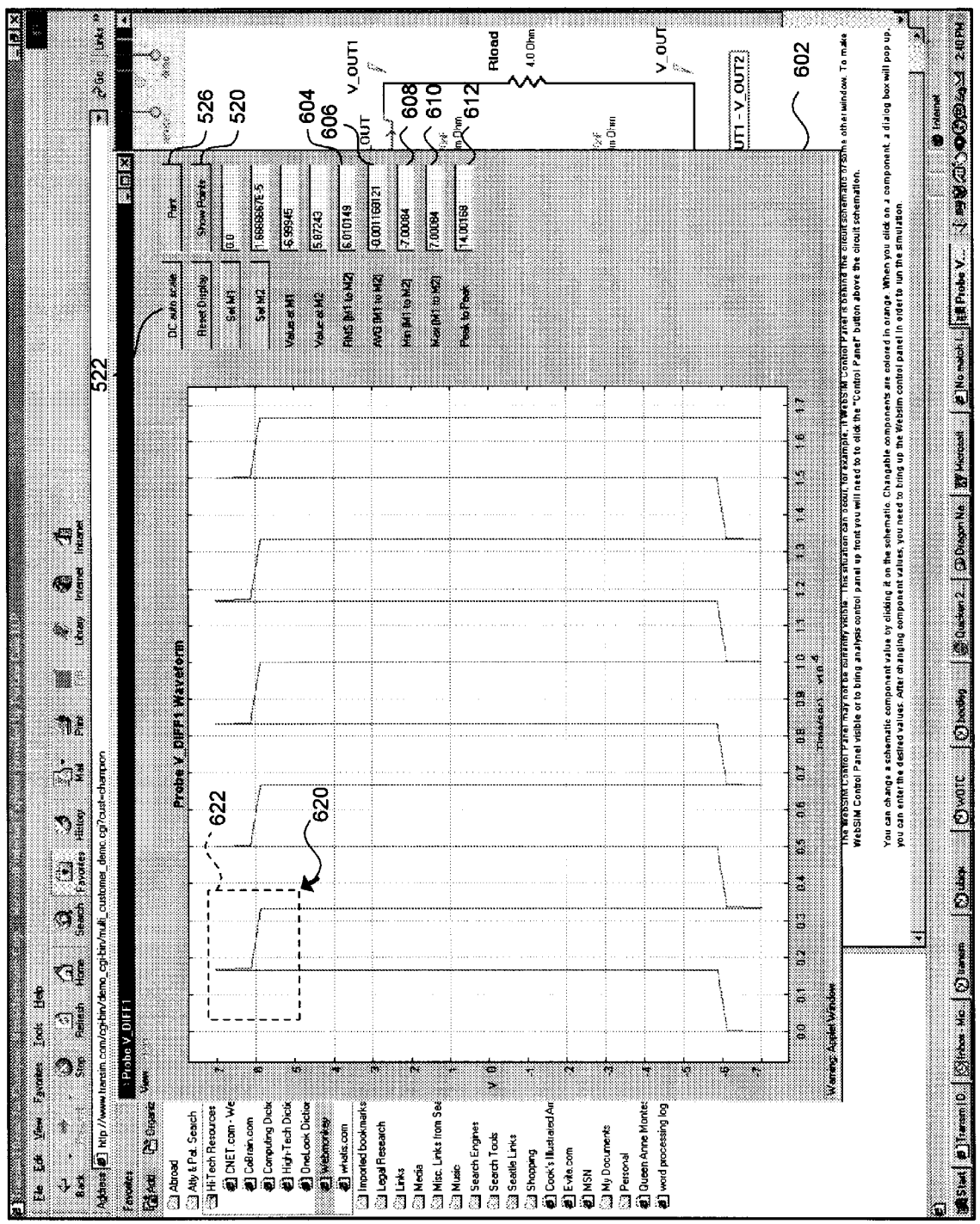
FIG. 6A is an example of a differential voltage versus time waveform for the circuit of FIG. 4.

By clicking on a differential waveform button, such as a V_L1–V_L2 button 600 (FIG. 5B), a new waveform may be display frame 602 in FIG. 6A. Again, the user may set values of end points or markers M1 and M2 to recompute relevant values, in this case, an RMS value 604, an average value 606, a minimum value 608 and a maximum value 610, all computed between M1 to M2. Additionally, a peak-to-peak value 612 is displayed with respect to the waveform depicted.

Figure 6B:
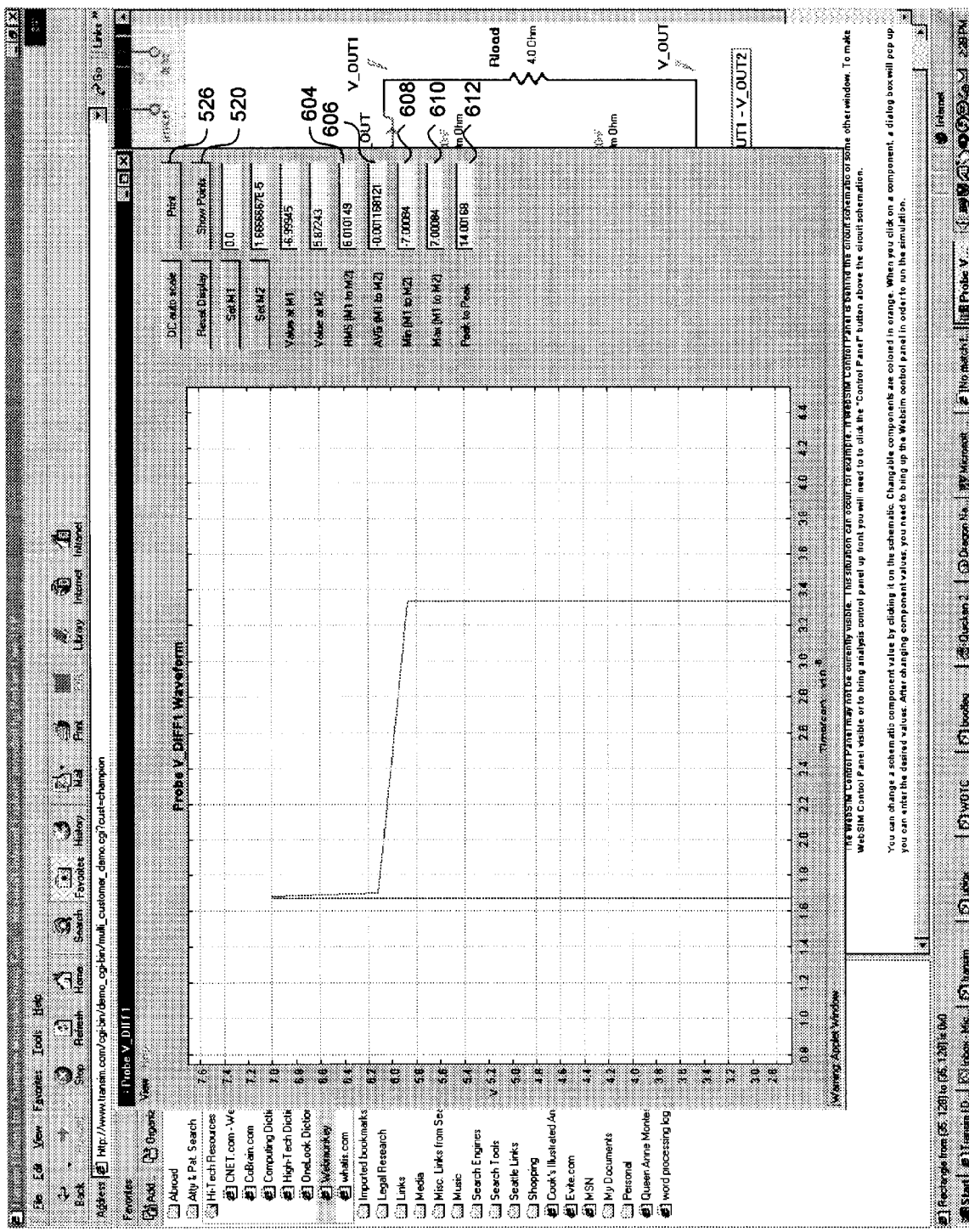
FIG. 6B is an example of a web page displaying an enlargement of the waveform shown in FIG. 6A.

The user can click on a portion of the depicted waveform with a cursor 620 and, while holding the mouse button down, draw a square 622 to zoom into a portion of the waveform, as shown in FIG. 6B. As shown in FIG. 6B, the RMS, average, min, max and peak-to-peak values are recomputed and displayed in fields 604 through 612, respectively.

Figure 7B:
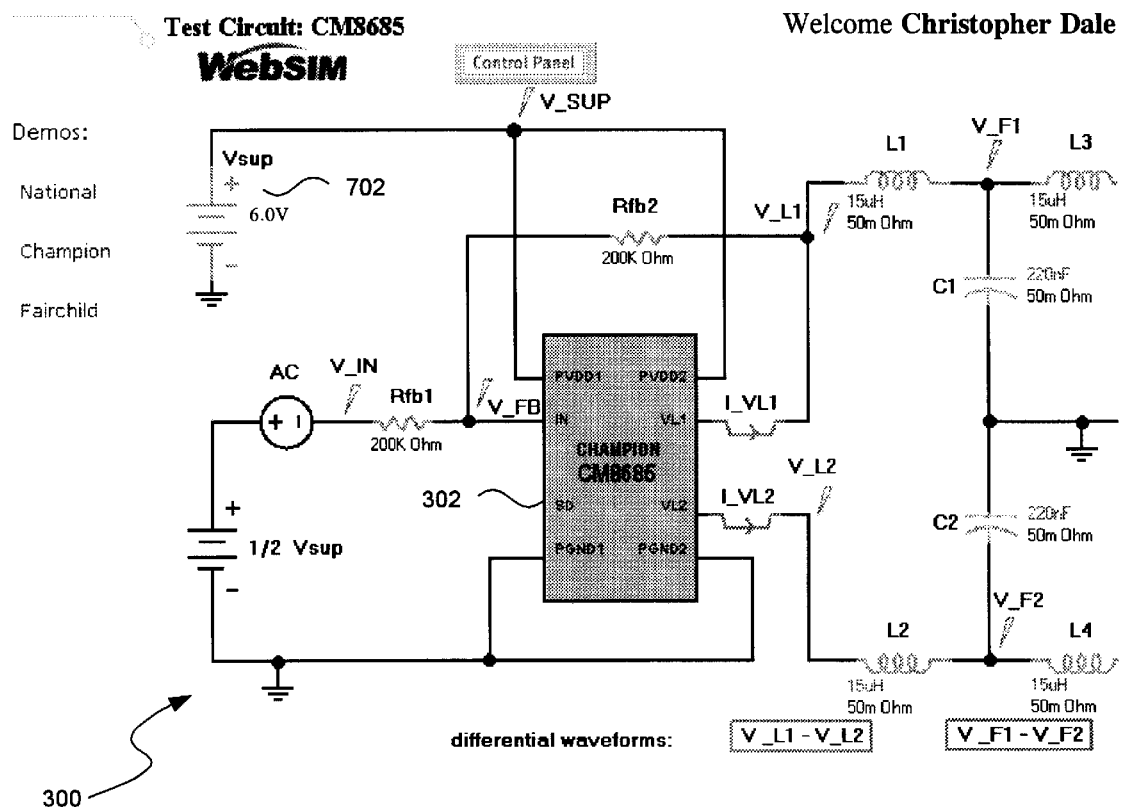

Referring to FIG. 7A, the user may move the cursor 620 over a component in the schematic 300, click on it, and change its value. For example, moving the cursor over a voltage supply Vsup 702, causes the voltage supply component to be highlighted in grey. Clicking thereon, a dialog box opens (not shown) that allows the user to adjust certain variables, such as voltage, changing the displayed voltage of, for example, 5.0 volts to 6 volts, as shown in FIG. 7B.

Figure 8A:
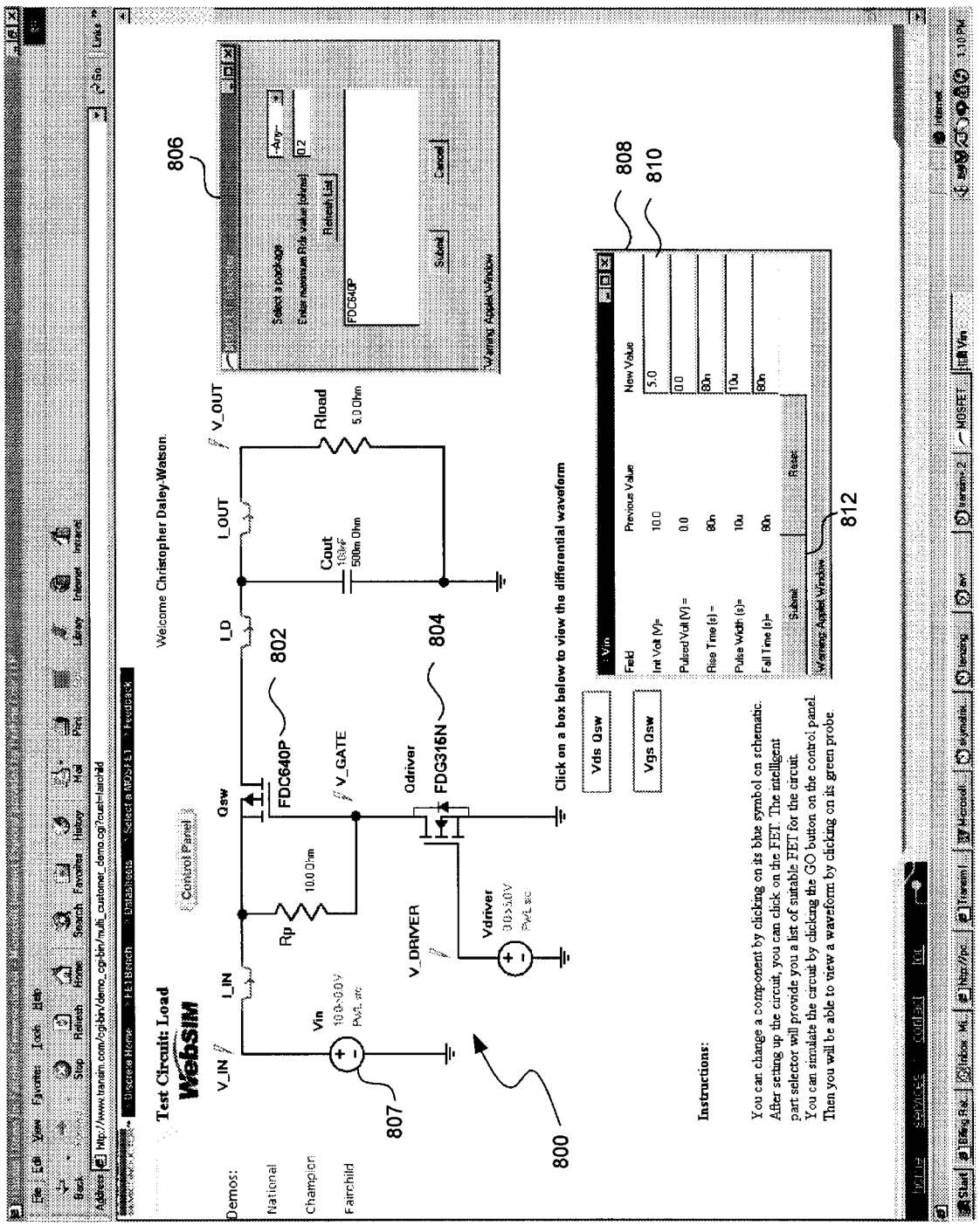
FIG. 8A is an example of a web page showing a reference application circuit having two MOSFET drivers, with a Voltage In window and MOSFET selector window open.
Figure 8B:
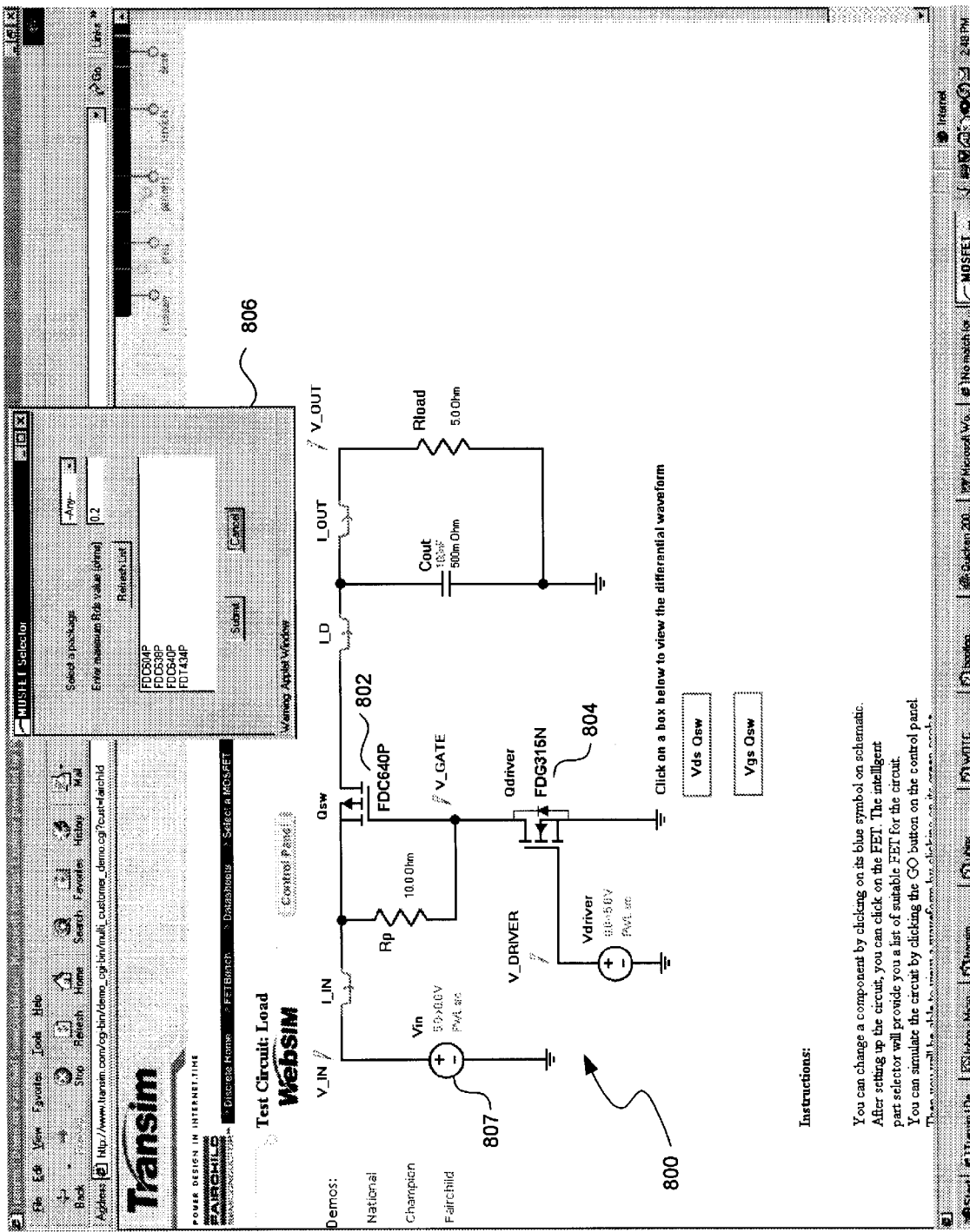
FIG. 8B is an example of a web page showing the circuit shown in FIG. 8A with the Voltage In value changed and a MOSFET selector window showing different choices as a result.

Referring to FIG. 8A, another reference application circuit 800 is shown with two FET (Field Effect Transistor) components 802 and 804. Clicking on one of the components, such as the FET 802, causes a selector frame 806 to be displayed. As shown in the frame 806, only one device produced by the manufacturer may be employed in the circuit 800. However, selecting and clicking on a component, such as the voltage in source Vin 807, the applet causes a component value frame 808 to open. As shown, various parameters for the input voltage source Vin may be changed, such as its initial voltage, pulse amplitude, rise time, pulse width and fall time. In this example, the initial voltage is changed from 10 volts (shown in the schematic) to 5 volts (shown in the field 810). By clicking a submit button 812 in the frame, the server provides to the client computer a new component selection frame 806 that now displays four components that may be selected by the user, as shown in FIG. 8B. Thus, as shown in FIG. 8A, with an initial voltage of 10 volts for the input voltage source Vin, only device model number FDC640P may be employed for FET 802. However, when the input voltage is changed to 5 volts, FET 802 may employ any of four devices listed in frame 806 of FIG. 8B.

Figure 9:
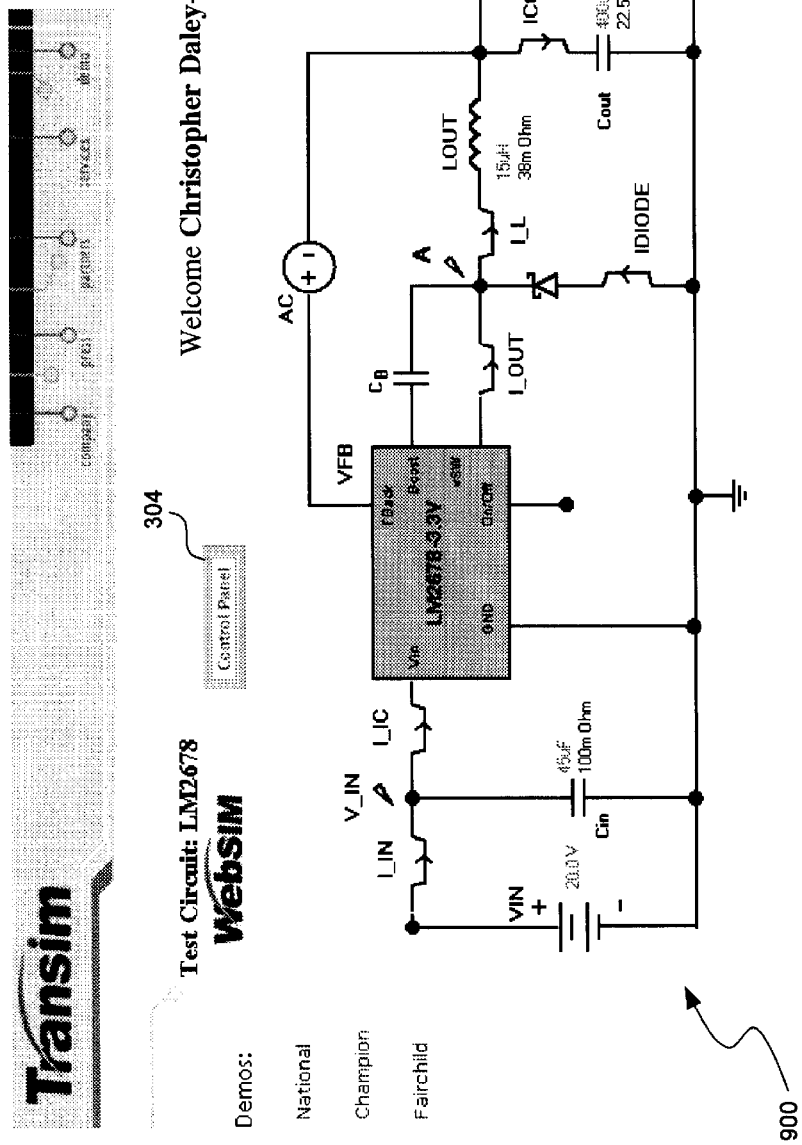
FIG. 9 is an example of a web page showing a reference application circuit with a National Semiconductor LM2678 device.
Figure 10:
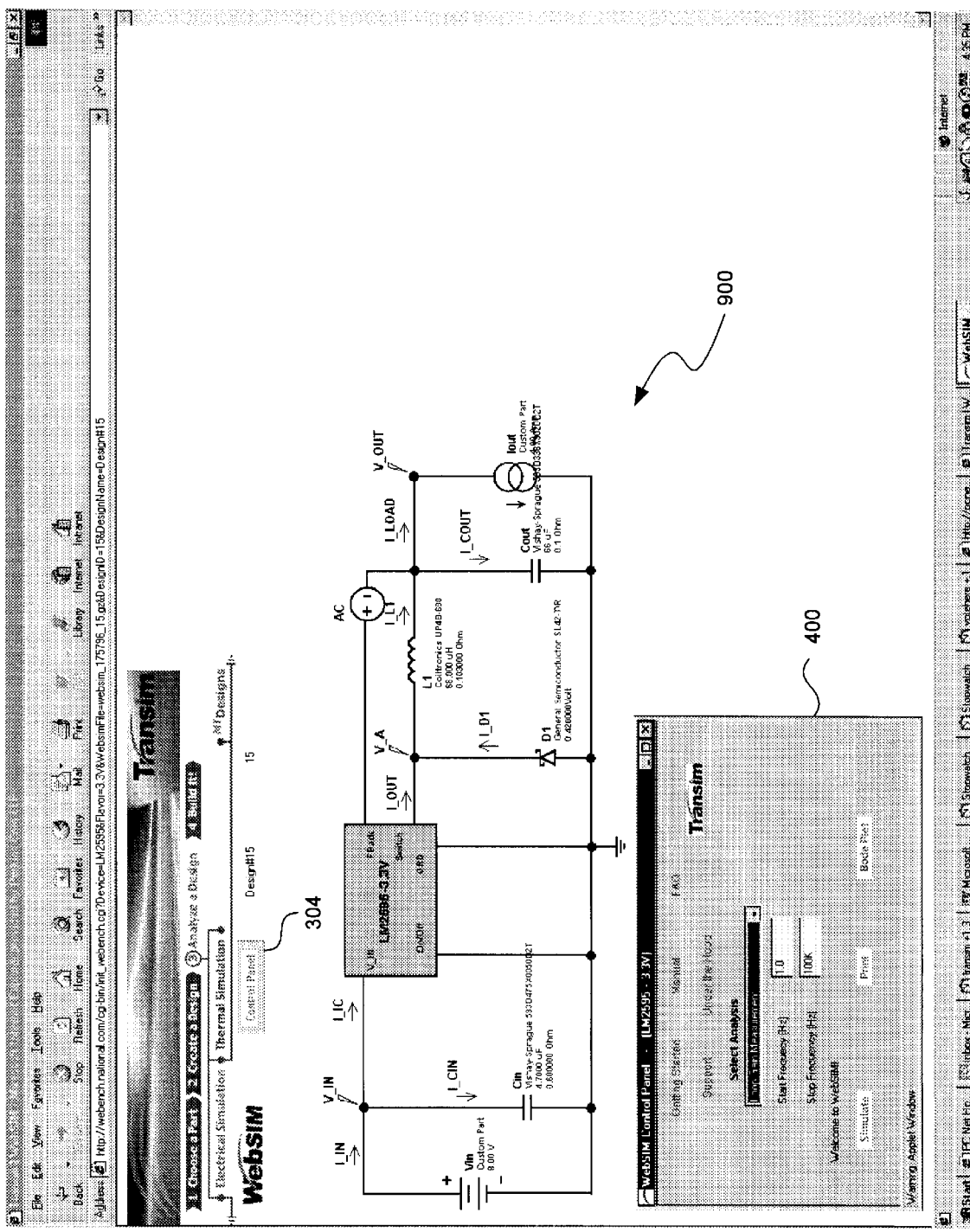
FIG. 10 is an example of the web page of FIG. 9 with a control panel window open.
Figure 11:
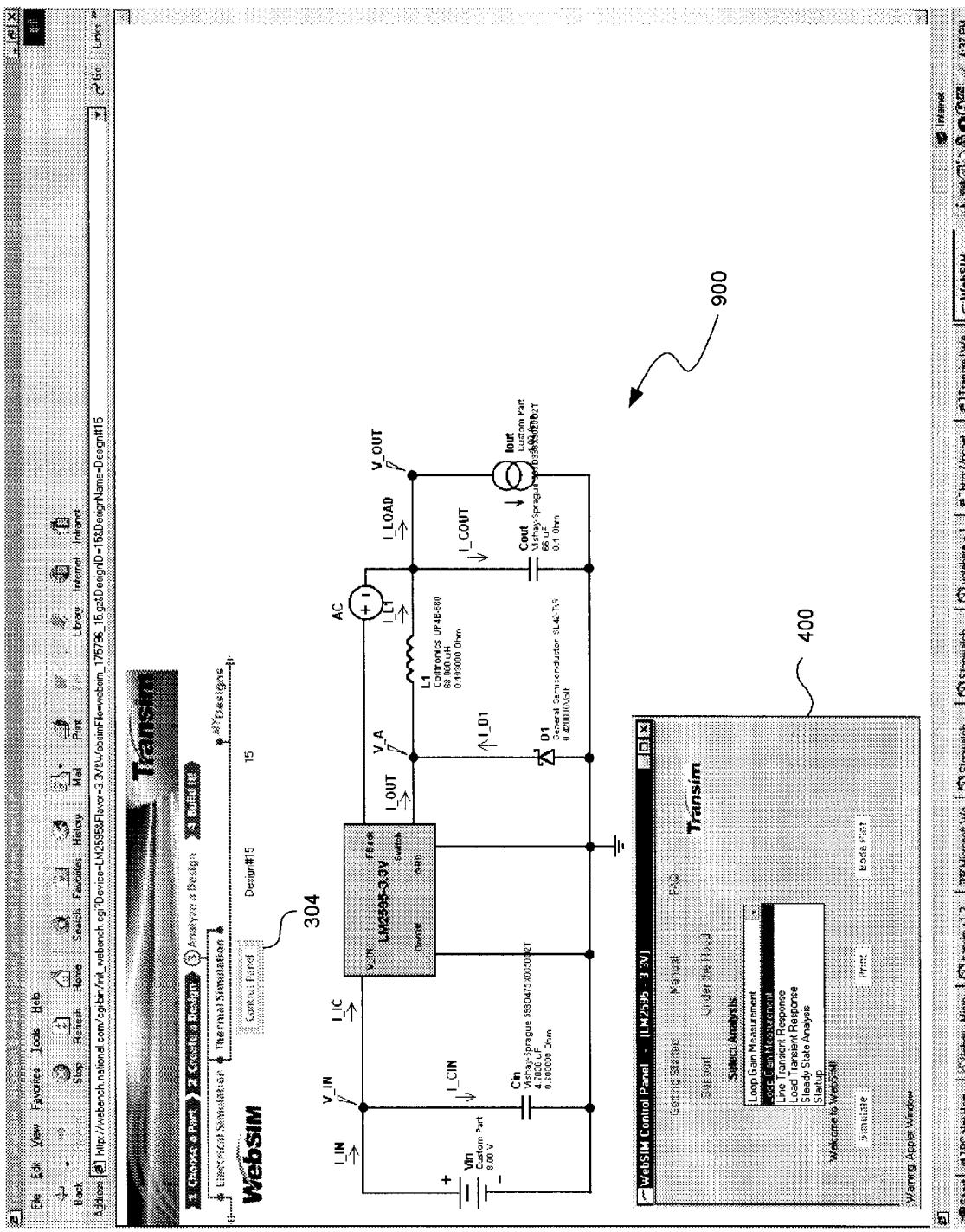
FIG. 11 is an example of the control panel window of FIG. 10 showing various analyses that can be performed.
Figure 12:
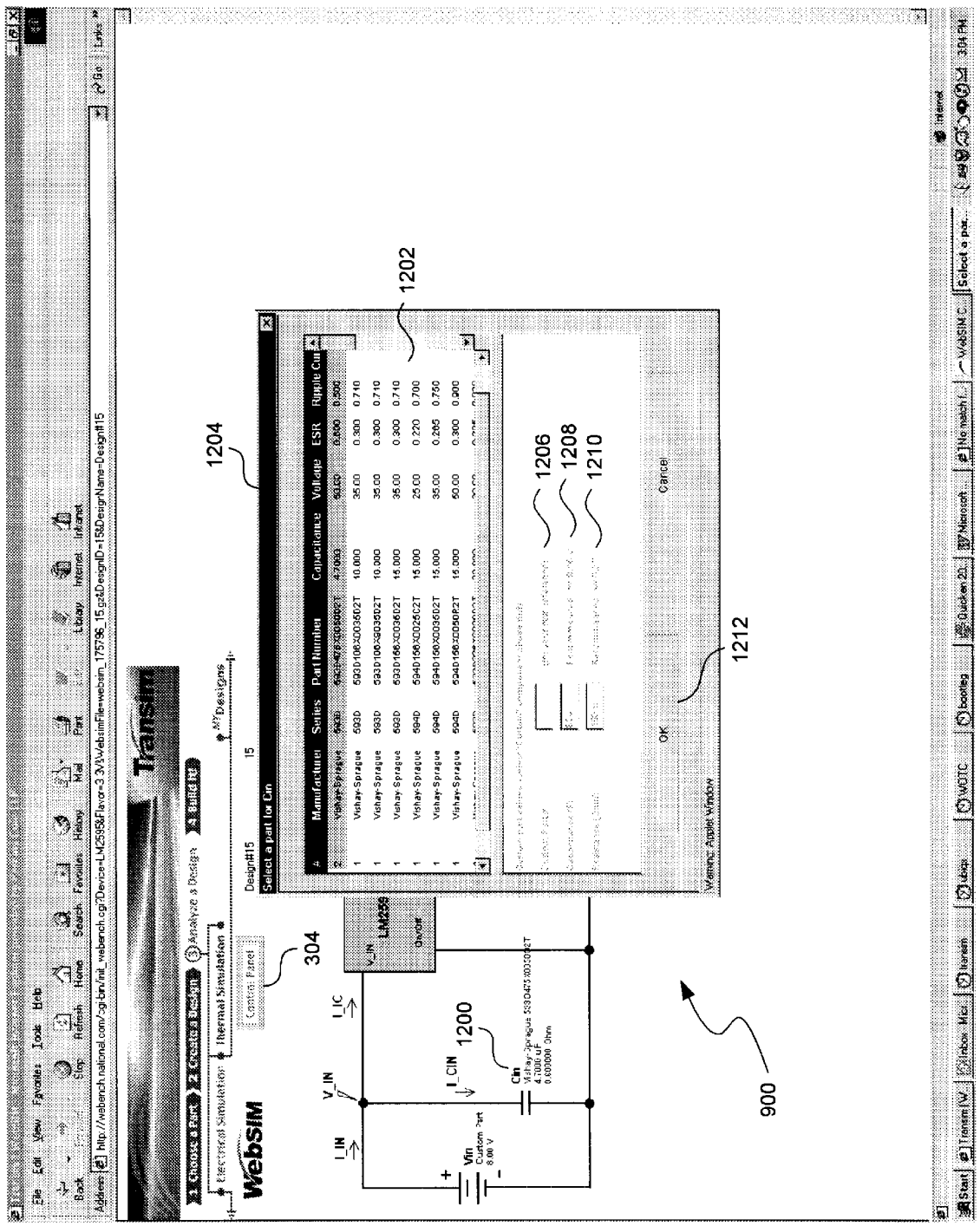
FIG. 12 is an example of the web page of FIG. 9 showing a part selection window open for a capacitor in the circuit shown in FIG. 9.

Referring to FIG. 9, another web page displaying another reference application circuit 900 is shown for a device LN2678 (3.3 volt version) manufactured by National Semiconductor. Clicking the control panel button 304 causes an alternative embodiment of the control panel frame 400 to be depicted, as shown in FIG. 10. While the control panel shows the Loop Gain Measurement analysis selected, FIG. 11 shows a dropdown menu of other analyses a user may select, including Line Transient Response, Load Transient Response, Steady State Simulation and Startup, all with respect to the reference application circuit 900. Of course, other referenced application circuits may permit the user to perform these and/or other analyses.

The schematic 900 shows various components depicted by standard schematic symbols, with corresponding values. However, the schematic also includes representative manufacturers and part numbers for some of these components. For example, a capacitor Cin 1200 is listed as not only having a capacitance value of 4.7000 $\mu$F with a resistance of 0.6 Ohm, but also a suggested manufacturer "Vishay-Sprague," model number 593D475X0050D2T. The user may click on components in the schematic to display a list of alternative parts that may be employed for that component. For example, clicking on the capacitor 1200 causes the applet to request from the server a list of alternative components that may be substituted for this capacitor, which is shown in a upper portion 1202 of a window 1204. The window may also include fields or options for the user to search for other similar components or request custom components. For example, a custom part number field 1206 allows the user to input a user selected reference number. Capacitance and resistance fields 1208 and 1210 allow the user to input capacitance and resistance values for a particular capacitor to be custom designed by a particular manufacturer. An OK button 1212 allows the user to submit such a request. Of course, fields for other custom designed parts will differ.

Figure 13:
FIG. 13 is an example of a manufacturer's web page illustrating an entrance point for accessing functionality provided by the embodiment of FIGS. 1, and 9 through 12.

Referring to FIG. 13, an example of a home page provided by a semiconductor device manufacturer ("National Semiconductor") 1300 is shown. The home page provides an entrance point for users to begin performing online simulations of electrical devices. Furthermore, as described below, the home page provides an entrance point to permit users to not only analyze a part, but also choose appropriate parts, create a design, and ultimately build an evaluation board containing the chosen part and other necessary components for a particular circuit being designed. The user may click on a "WEB BENCH" link 1302, which links to a "MY WEBBENCH" page 1400, as shown in FIG. 14. If the user has previously signed up with the manufacturer, or is otherwise authorized to access the circuit design and simulation tools, the page 1400 may display in a portion 1402 various circuits or designs previously created by the user. Otherwise, the user may click a "START HERE" link 1404, which links to a design requirements page 1500, as shown in FIG. 15.

Figure 15:
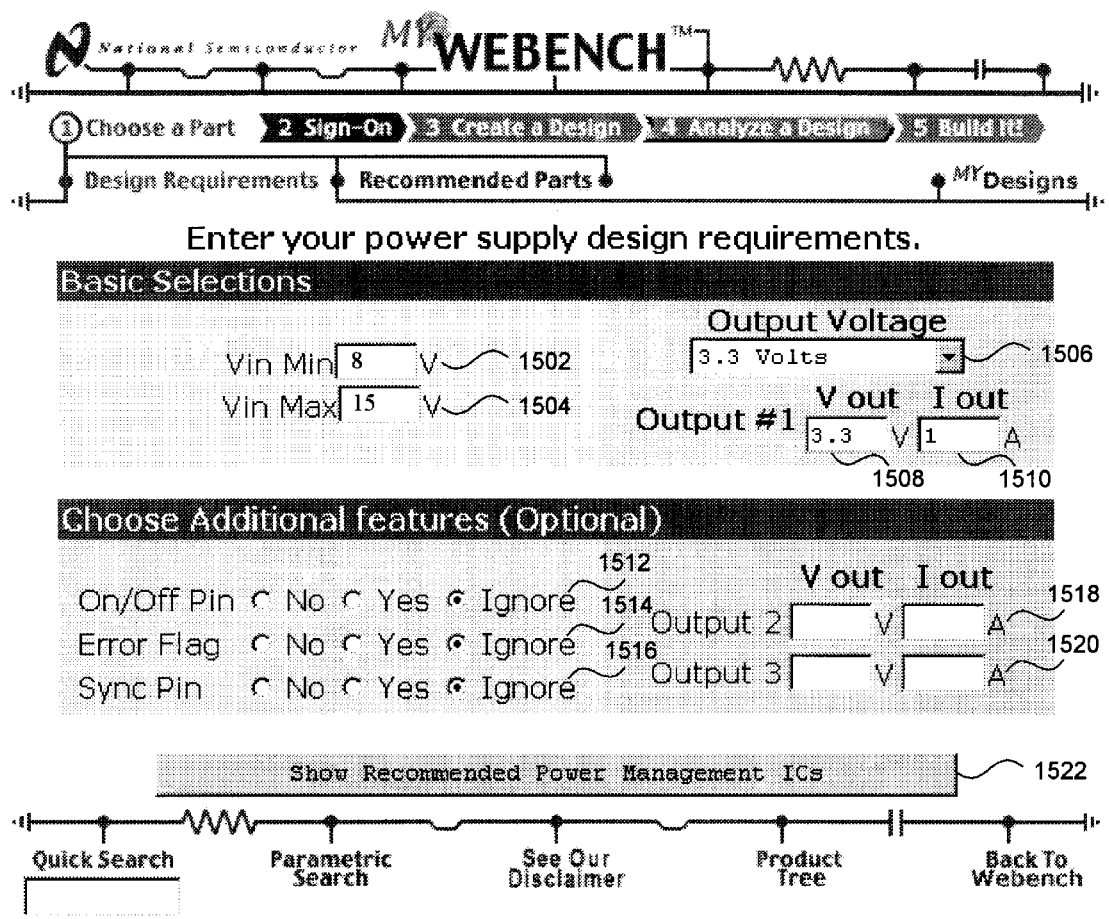
FIG. 15 is an example of a web page displaying input fields for designing a power supply.
Figure 19:
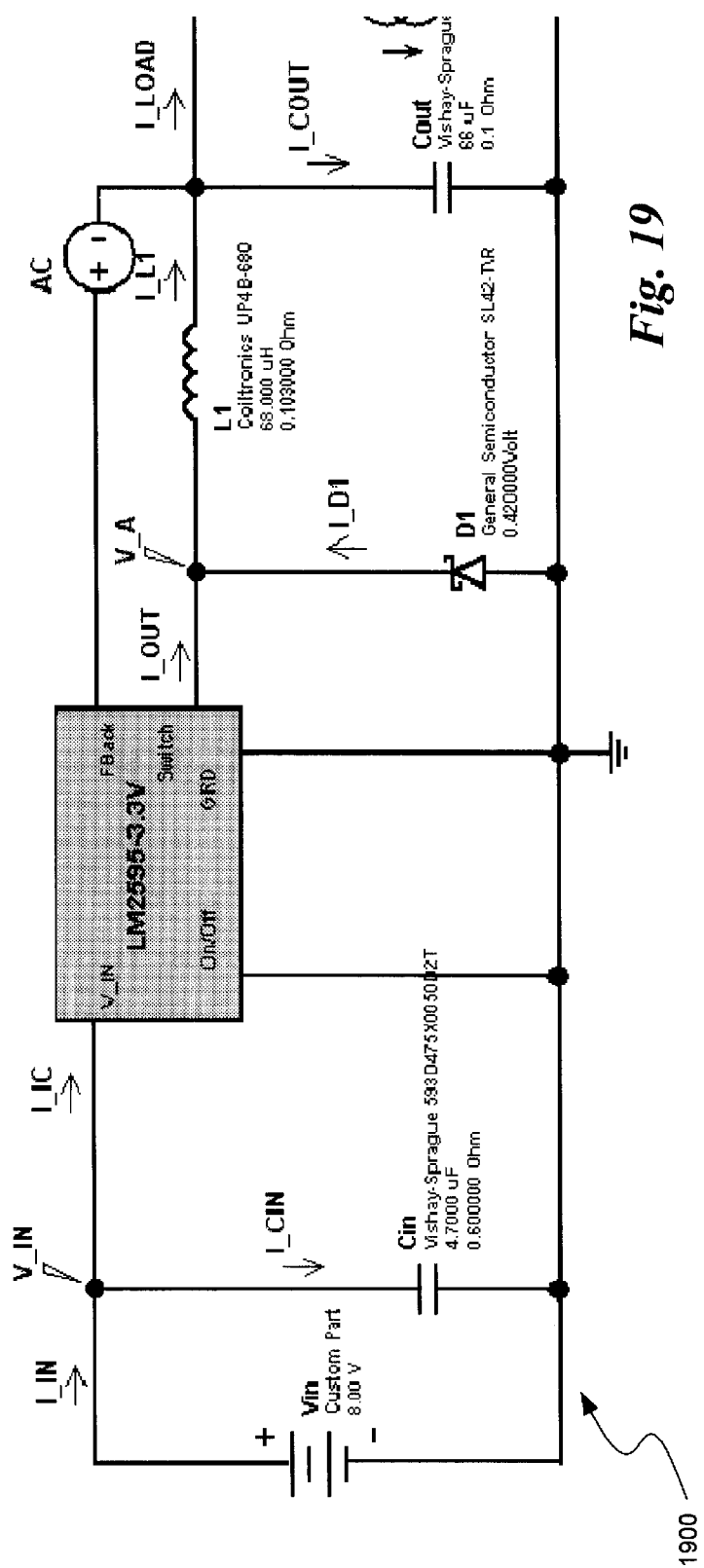
FIG. 19 is an example of a web page illustrating a circuit schematic employing the components of FIG. 17 that may be analyzed under embodiments of the invention.

Referring to FIG. 15, the user may, in this example, design a power supply by inputting basic selections. Basic selections include a voltage in minimum field 1502, a voltage maximum in field 1504, an output voltage selected from a dropdown menu 1506, an output voltage in a field 1508 and an output current in a field 1510. As shown in FIG. 15, minimum and maximum input voltages of 8 and 15 volts have been input, along with an output voltage of 3.3 volts and an output voltage and current of 3.3 volts and 1 amp, respectively. The user may also choose additional or optional features. Optional features may include, for example, selecting radio buttons 1512, 1514 or 1516 to indicate whether the user wishes the power supply to have an on/off pin, an error flag or a sync pin, respectively. Furthermore, the user may determine whether the power supply has additional output terminals by specifying output voltages and currents in fields 1518 or 1520. After selecting or inputting appropriate requirements in the page 1500, the user clicks a submit button 1522.

Referring to FIGS. 16A and 16B, examples of suitable switching regulator devices that satisfy the parameters input by the user to the page 1500 are shown. As shown, two different topologies may be employed for switching regulators: a buck topology and a flyback topology. The server receives the requirements and parameters input by the user to the page 1500, and compares such input data to a table of components and their associated parameters to identify which components may fulfill the user's requirements.

Each product or device listed in the page 1600 includes a link 1602 associated with the particular product number, whereby clicking on any of the links causes a page to be displayed providing further information regarding that particular device. Also displayed on the page with respect to each device is its maximum current, typical efficiency, whether it includes an on/off pin, an error pin, other features and its frequency. Furthermore, each listed product includes an estimated price to construct a switching regulator based on each topology. Clicking on a "Create Design" button 1604, such as the button associated with the product LM2595-3.3, causes the server to provide an example of a set of components that may be employed to create a buck topology switching regulator.

Referring to FIG. 17, an example of a set of components that may be employed to create a buck topology switching regulator using the LM2595-3.3 device is shown as a page 1700. An upper portion 1702 of the page lists the design requirements previously input by the user to the page 1500. A middle portion 1704 lists the various components necessary to create the buck topology switching regulator, including not only the LM2595-3.3 device, but also additional components including two capacitors, an inductor and a diode. Each component is listed by a part designation (e.g., Cin for the input capacitor), a representative manufacturer, a corresponding part number, and attributes or parameters with respect to that component. Furthermore, a "Thermally Modeled" column 1706 shows an example of a footprint or outline of the component, in actual size, to permit users to visualize how large a buck topology switching regulator employing the components listed in the portion 1704 will be. Users may select alternative parts by clicking a button 1708 associated with each component. Clicking on an Operating Values link 1710 above the top portion 1702 causes an Operating Values page to 1800 be displayed, such as that shown in FIGS. 18A and 18B.

As shown in FIGS. 18A and 18B, data regarding various operating values is shown, such as pulse width modulation frequency at 150 kHz. Additionally, operating points at a voltage equal to 15 volts, current analysis and power dissipation analysis are shown for the proposed design. Clicking a Schematic link 1802 causes a schematic page 1900 to be displayed, such as that shown in FIG. 19. The user may also click an Analyze a Design link 1804 to cause the schematic to be displayed. Thereafter, the user may perform the various simulations and circuit analyses described herein, such as those described above with respect to FIGS. 3A through 12.

Clicking a Build It! link 1902 causes a Buy It! page 2000 to be displayed, such as that shown in FIG. 20. As shown, the page 2000 lists as a bill of materials 2002 not only the components shown in FIG. 17, but also additional components necessary to create a prototype circuit board containing these components and others necessary for a buck topology switching regulator employing the LM2595-3.3 device. The bill of materials represents components provided by a supplier, in this example Pioneer-Standard. The bill of materials includes the price-per-part offered by the supplier Pioneer-Standard, and whether each part is in stock. The user may click on a documentation link 2004 to view documentation regarding the proposed design and parts, and may order a complete kit with all components listed in the bill of materials from the supplier by clicking a link or button 2006. Furthermore, a volume order link 2008 allows the user to buy the device in question (LM2595-3.3) in volume, or order a free sample of this device by clicking a link 2010.

In this embodiment, the server is coupled to receive data from the supplier's database regarding part availability. Thus, the system may provide real-time availability of parts from the supplier.

Many alternatives to the system and screens described above may be employed. For example, referring to FIG. 21, a web page 2100 is shown that is similar to the Design Requirements page 1500 shown in FIG. 15. In addition to the input fields of the page 1500, the page 2100 allows the user to input minimum and maximum voltage output values 2102 and 2104, and current output values 2106 and 2108, respectively. The user may select the number of outputs from a pull-down menu 2110 and select one of several options from an options pull-down menu 2112. The user may select an efficiency value from a pull-down menu 2114. Furthermore, the user may select a particular application from a pull-down menu 2116 (such as used in a cellular phone) and a topology from a pull-down menu 2118. The user may click on an information button 2120 to receive additional information regarding typologies provided from this pull-down menu. Back and forward buttons 2121 and 2122 allow the user to navigate to previous or subsequent pages.

After the user inputs certain design requirements, the server may refine the user's requirements by employing server based wizards, or routines. These wizards take user input to the page of FIG. 21 (or FIG. 15) and identify which components are capable of satisfying the user's needs as defined by the user input. The server may analyze a knowledge base for all devices meeting the user's requirements. The server may initially provide a circuit and waveforms based on default parameters, such as described above.

Figure 21:
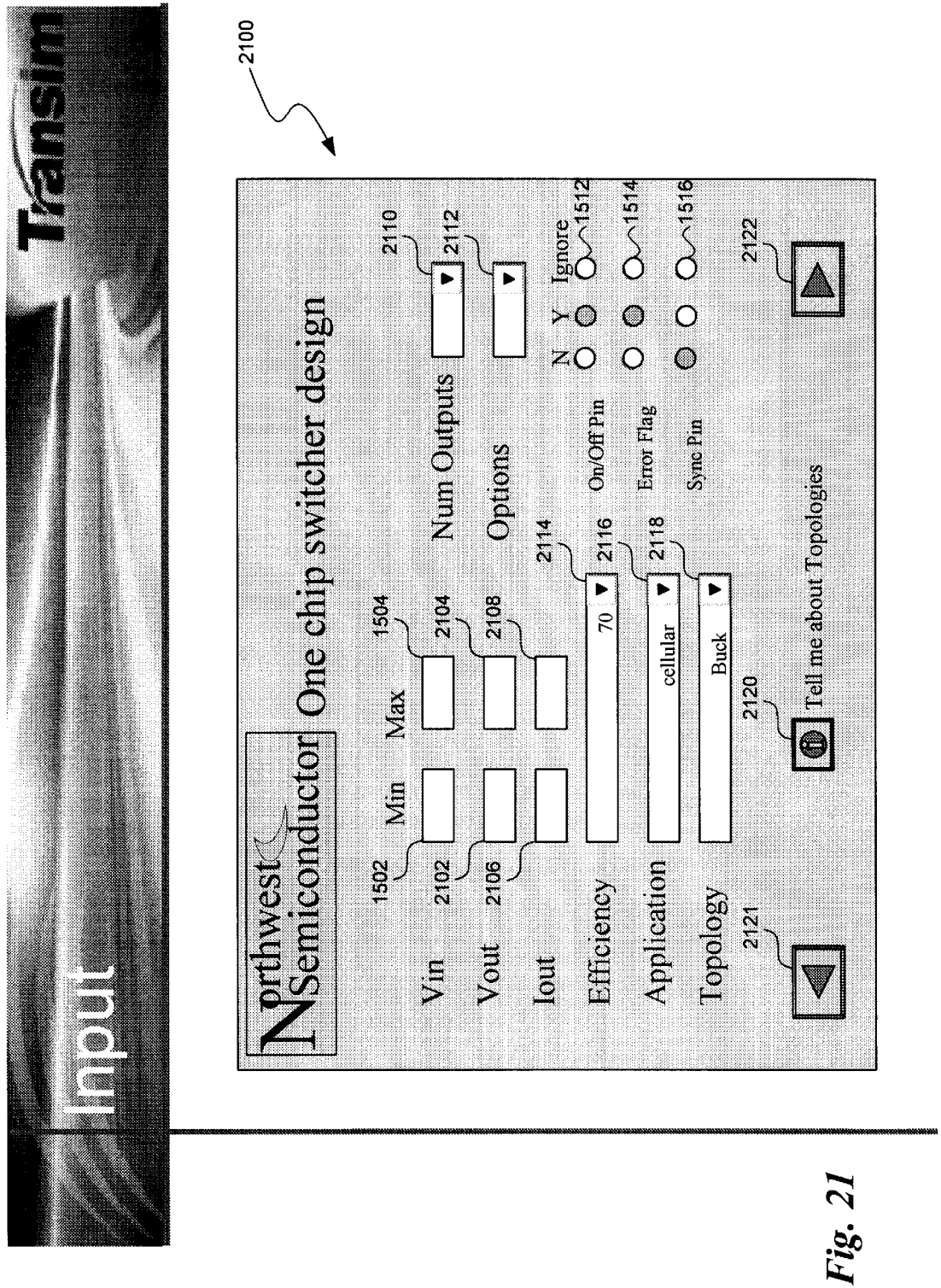
FIG. 21 is an example of an alternative web page to that of FIG. 15.
Figure 22:
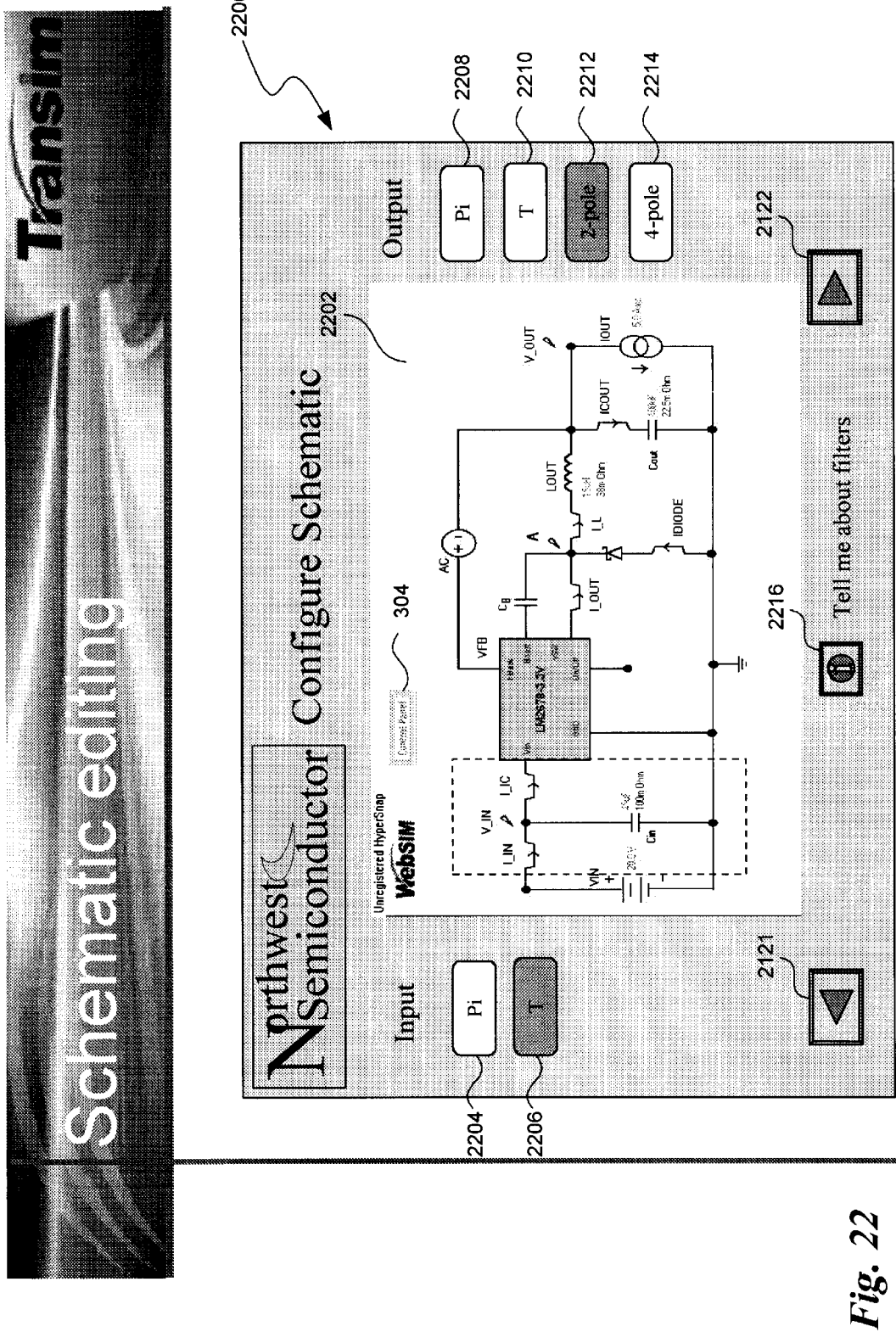
FIG. 22 is an example of an alternative web page to that of FIG. 19 for displaying and configuring a schematic for a circuit to be designed based on user input provided to the web page of FIG. 21.

For example, the user may select a buck typology voltage regulator for use in a cellular phone having a power efficiency of approximately 70 percent as shown in FIG. 21. After clicking the next button 2122, the user may see a Configure Schematic page 2200 as shown in FIG. 22. In this page, the user may configure the input layout for the circuit by clicking a Pi or T button 2204 or 2206 with the T button selected and appropriate T-type input typology shown in a dashed line box with respect to a depicted schematic 2202. Likewise, the user may select one of several output typologies, such as Pi, T, 2-pole and 4-pole, by selecting buttons 2208, 2210, 2212 and 2214, respectively, with 2-pole selected and depicted. An information button 2216 allows the user to obtain additional information regarding input and output filters associated with the various input and output topologies.

Figure 23:
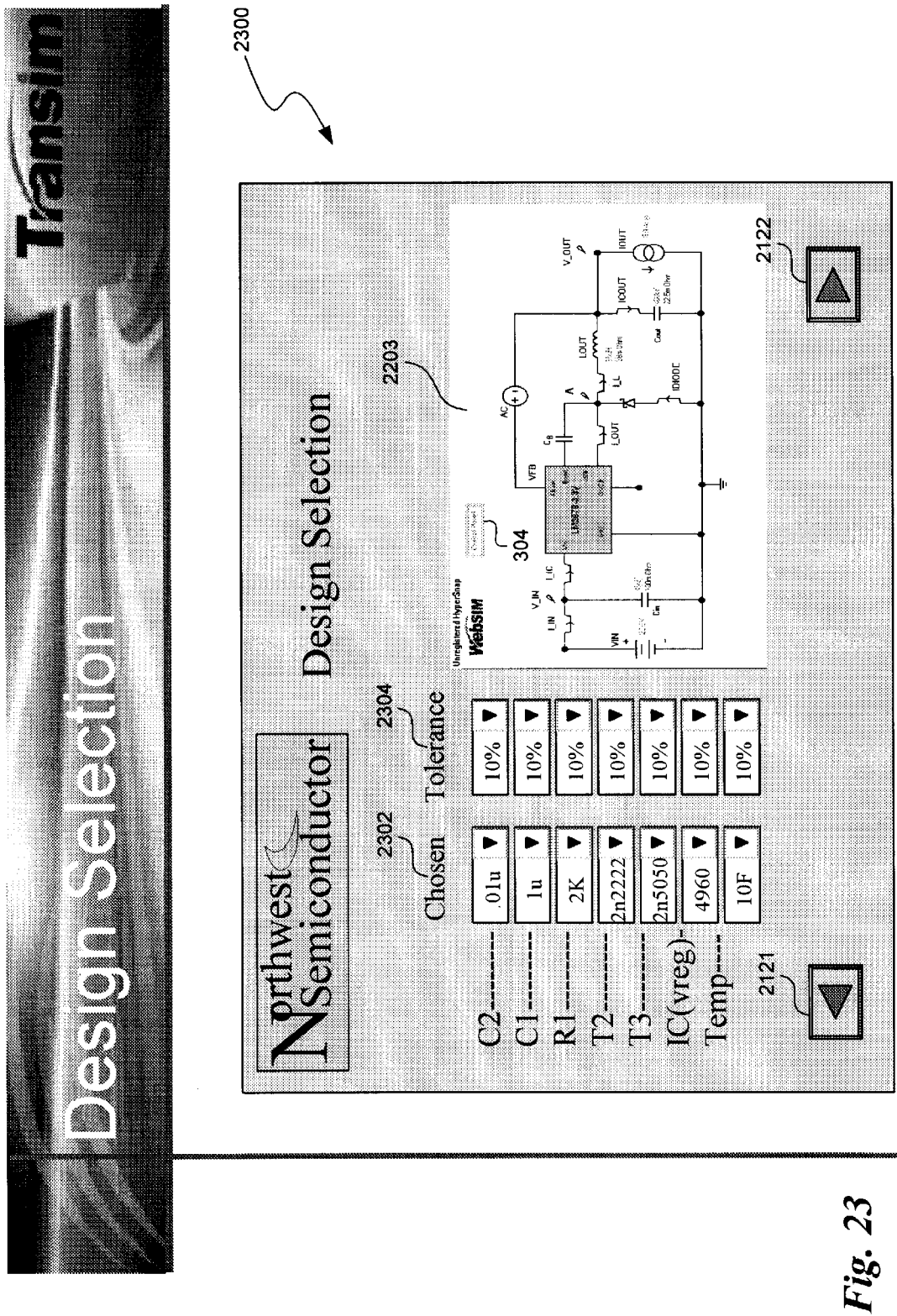
FIG. 23 is an example of a web page displaying component design selection options for a user.

Clicking the next button may cause the system, in this alternative embodiment, to display a Design Selection page 2300, as shown in FIG. 23. In this page, the user may select values for components depicted in the schematic 2203 from various pull-down menus 2302 associated with each component. Likewise, the user may select a tolerance for each component from associated pull-down menus 2304. Thereafter, the user may conduct a simulation for a selected design using the tools described herein.

Figure 24:
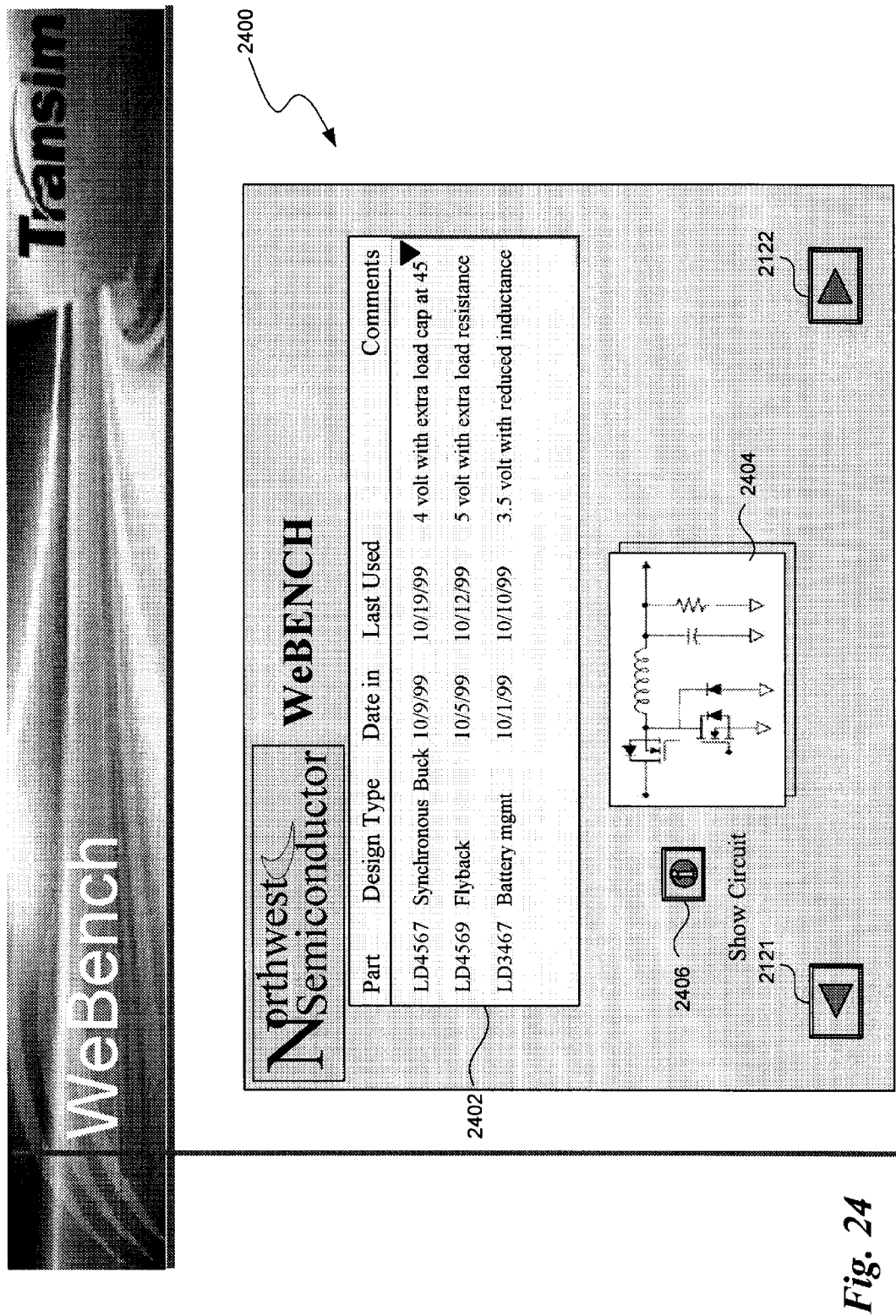
FIG. 24 is an example of a web page displaying a user's previously created circuit designs.

Referring to FIG. 24, a user design screen 2400 displays in a frame 2402 various circuit designs the user has previously simulated or implemented. Each design is listed initially by the particular part number involved, followed by the type of design, the date it was input to the system, the date it was last used, and additional comments provided by the user. Clicking any of the listed designs will cause a schematic or other information regarding that design to be displayed on the client computer. The user may display the circuit in a frame 2404 by selecting an information button 2406.

Figure 25:
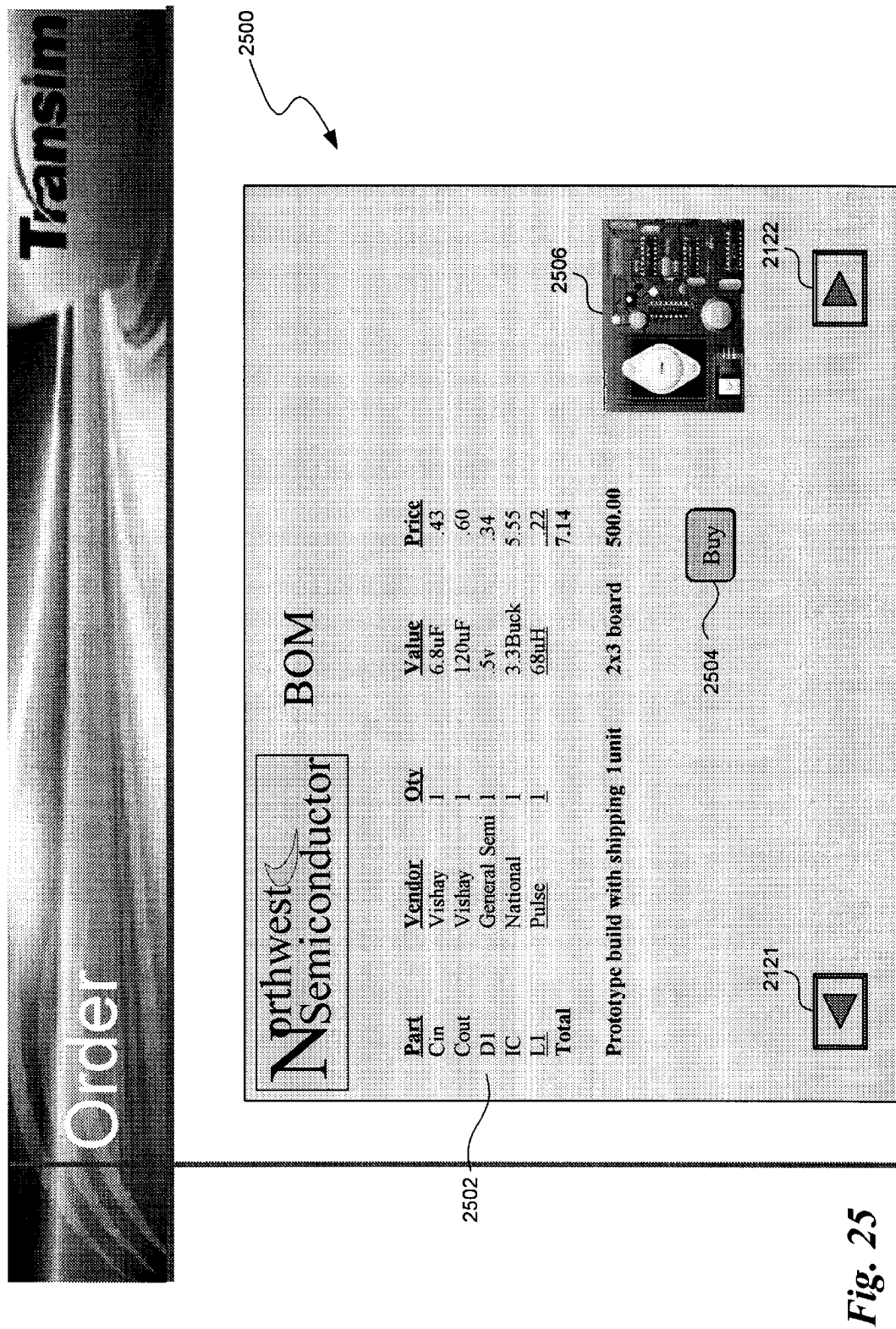
FIG. 25 is an alternative example of a web page to that shown in FIG. 20.

Referring to FIG. 25, a bill of materials web page 2500 is shown, which is an alternative to that shown in FIG. 20. Under user input to the web pages of FIGS. 22 and 23, the user may custom tune selections or default parameters and perform a simulation to develop meaningful evaluation results quickly. Thereafter, the user can order selected devices, such as through the web page of FIG. 25. As shown in a frame 2502, various parts selected by the user in page 2300 and the other pages are shown with suitable vendors, quantities, values and prices. The user may select a buy button 2504 to purchase the listed components in the bill of materials. A portion 2506 of the page displays an example of a prototype board built with the listed components.

Waveform File Creation

As noted above, waveform files are created by the server and downloaded to the client computer 130 so that the user can view and query the waveform data. Waveform file creation by the server involves effectively three steps: first, creating the waveform file from raw simulation results files; second, filtering the waveform file to reduce redundant points for display; and third, compressing the waveform file for transmission.

In the first step, the simulator (such as SIMPLIS), creates the results files 162 in a ".t2" format. The .t2 file is an ASCII text format file that has a header section and data body. An example of such a file is as follows:

point 2 versus point 3 with respect to the origin of the time versus voltage (or current) coordinate. From these angles, the routine determines whether redundant points are to be deleted.

```
$$$ 1 2065 17 simplis DATA FOR PLOTTING, Thu Mar 4 10:32:59 1999
INPUT FILE: xpdtx/spdeck2030
Transient Analysis
2065 DATA PTS
17 VARIABLES
0 TIME
1 V(8,0)
2 V(2,0)
3 V(20,0)
4 V(18,0)
5 V(12,0)
6 V(1,0)
7 V(11,0)
8 V(3,0)
9 V(16,0)
10 V(15,0)
11 V(6,0)
12 V(4,0)
13 I(VL_DIODE)
14 I(VI IN)
15 I(VL_DRAIN)
16 I(VL_OUT)
17 V(22,0)
0.000000000000000e+00 3.60000e+01 2.50067e+00 2.50712e+00 1.00002e-01
9.23331e-06
1.65000e+01 4.84096e+01 2.08871e+00 2.49900e+00 9.54184e-06 4.92235e+01
4.83638e+01
2.32477e+00 2.32489e+00 1.23108e-04 2.01516e+00 4.84096e+01
5.000056392446006e-08 3.60000e+01 2.50066e+00 2.50711e+00 1.00002e-01
9.23326e-06
1.65000e+01 4.84094e+01 2.08870e+00 2.29522e+00 9.52745e-06 4.92232e+01
4.83638e+01
2.32146e+00 2.32158e+00 1.23107e-04 2.01516e+00 4.84094e+01
1.000011278489201e-07 3.60000e+01 2.50066e+00 2.50710e+00 1.00002e-01
9.23320e-06
1.65000e+01 4.84091e+01 2.08870e+00 2.09173e+00 9.51372e-06 4.92229e+01
4.83639e+01
. . .
```

As shown, the header information indicates the various probe points, such as voltage at a schematic location (8,0), with a total of 17 such points indicated. The representative file above includes a total of 2,065 data points, although not all are shown. Given the file's format and the total number of data points to transfer from the server to the client computer for such a file, transmission time can be quite significant (depending upon the transmission link bandwidth). Each .t2 file may have many columns, where each column represents a probe point in a schematic and where the first column represents time. Each created waveform file represents one of the probe points in the schematic that a user may click on to view an associated waveform. To create waveform files in binary format for each column, the server may employ known binary separator files, such as bfile_sep.cgi. The total number of waveform files created from a .t2 file equals the total number of columns in the .t2 file minus one. To save 50 percent on the file size, the system may use float number format instead of double format for waveform data points.

Figure 26B:
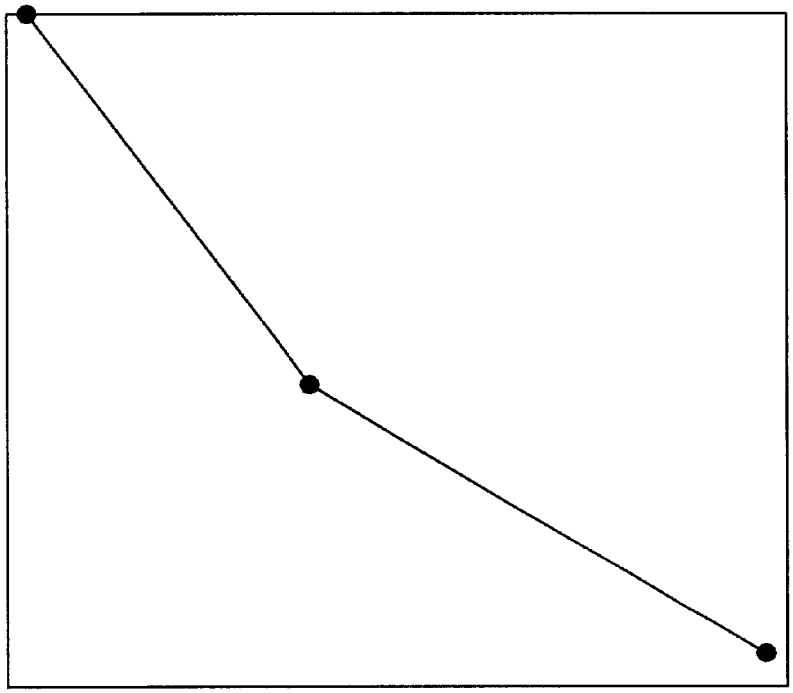
FIG. 26B is an example of the waveform portion of FIG. 26A after filtering.
Figure 26A:
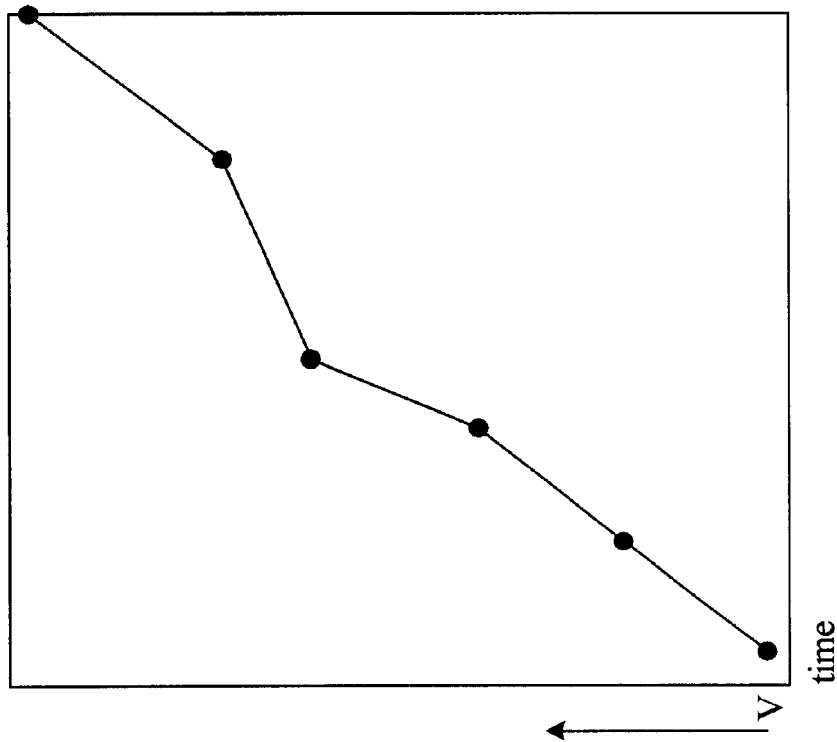
FIG. 26A is an example of a portion of a nonfiltered waveform before transmission from the server to the client.

In the second step, the waveform files are still large and may contain redundant data points. Therefore, the CGI-make waveform code 164 filters the waveform files to reduce redundant points. The program filters any points that are on the same straight line. In one embodiment, three points at a time are analyzed to calculate an angle of point 1 versus point 2 with respect to the origin and the angle of In general, if the first angle for the first and second points is slightly different or equal to the second angle for the second and third points, the second point is dropped and the angle is reconstructed for the next comparison from the first to the third point. For example, if the first angle is equal to 3.1 radians and the second angle is equal to 3.101 radians, the routine determines that they are almost equal (a delta of approximately 1E-4), and thus drops the second point. Alternatively, if the first angle is equal to 3.1 radians while the second angle is equal to 3.5 radians, the angles are sufficiently different so that the routine does not drop the second point. FIG. 26A shows an example of a portion of a nonfiltered waveform having six points. FIG. 26B shows an example of the same waveform as filtered, whereby three of the six points have been dropped using the above technique. Pseudocode representation of a subroutine for performing such a point filtering method is as follows:

Delta a small angle number that is the criteria to drop a point on the nearly straight line.
Delta is chosen depending on total number of data points of a waveform files. The more points a waveform
has, the bigger delta is.
For example: with waveform with less than 1000 data, points, delta = 1.0 E-6

```
                With waveform with less than 2500 data points, delta = 1.0
        E-5
                With waveform with more than 5000 data points, delta = 1.0
        E-3.
        Loop
              angle1 = atan2 ((point2.y - point1.y), (point2.x - point1.x));
              angle2 = atan2 ((point3.y - point2y), (point3.x - point2.x)),
              //Comment: atan2 is a trigonometry function with will return the
        polar    coordinate or angle
              //of the given value arguments
              If (Abs (angle2 - angle1) <= Delta) then //Abs function takes the
        absolute value of the arguments.
                 Drop point2.
                 Point2 = point3.
                 Read new points from the data files to point3;
              Else
                 Write point2
                 Point1 = point2;
                 Point2 = point3;
                 Read new points from the data files to point3;
              End
              Continue compare until the end of the waveform file;
        End Loop
```

The above subroutine works well for pulse, triangle and sawtooth waveforms. It reduces the size of a binary waveform file by about 30 to 40 percent, and in some cases, can reduce the size of the file up to 90 percent, such as in the form of a waveform without ripple. Of course, other point filtering techniques may be employed, such as curve matching (e.g., B-spline or client side table look up), as those skilled in the relevant art will appreciate.

In the third step, the CGI-make waveform subroutine 164 employs known data compression routines to further compress the filtered waveform file and convert it from ASCII to binary representation for efficient transmission. For example, the server may execute the known GZIP compression routine to compress the filtered waveform file another 25 to 40 percent. The compressed, filtered waveform is then transmitted to the client computer.

Suitable Computing System

Figure 27:
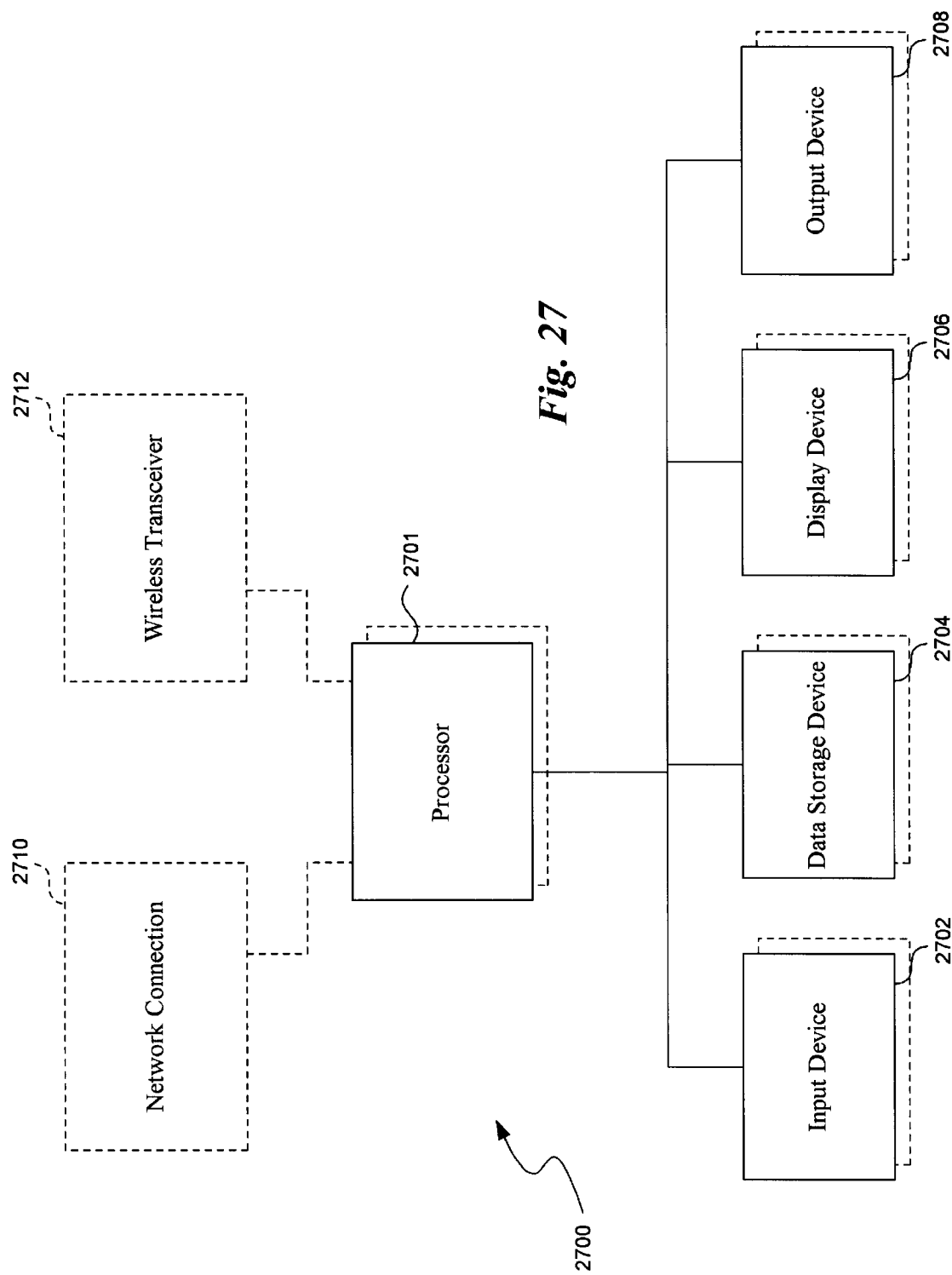
FIG. 27 is a block diagram of a suitable computer for employing aspects of the invention.

FIG. 27 and the following discussion provide a brief, general description of a suitable computing environment in which aspects of the invention can be implemented. Although not required, aspects and embodiments of the invention will be described in the general context of computer-executable instructions, such as routines executed by a general purpose computer (e.g., a server or personal computer). Those skilled in the relevant art will appreciate that aspects of the invention can be practiced with other computer system configurations, including. Internet appliances, hand-held devices, wearable computers, cellular or mobile phones, multi-processor systems, microprocessor-based or programmable consumer electronics, set-top boxes, network PCs, mini-computers, mainframe computers and the like. Aspects of the invention can be embodied in a special purpose computer or data processor that is specifically programmed, configured or constructed to perform one or more of the computer-executable instructions explained in detail below. Indeed, the term "computer," as used generally herein, refers to any of the above devices as well as to any data processor.

Aspects of the invention can also be practiced in distributed computing environments where tasks or modules are performed by remote processing devices and which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs stored as firmware in chips (e.g., EEPROM chips), as well as distributed electronically over the Internet or other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 27, one embodiment of the invention employs a computer 2700, such as a personal computer or workstation, having one or more processors 2701 coupled to one or more user input devices 2702 and data storage devices 2704. The computer is also coupled to at least one output device such as a display device 2706 and one or more optional additional output devices 2708 (e.g., printer, plotter, speakers, tactile or olfactory output devices, etc.). The computer may be coupled to external computers, such as via an optional network connection 2710, a wireless transceiver 2712 or both.

The input devices 2702 may include a keyboard and/or a pointing device such as a mouse. Other input devices such as a microphone, joystick, pen, game pad, scanner, digital camera, video camera and the like are possible. The data storage devices 2704 may include any type of computer-readable media that can store data accessible by the computer 2700, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 27).

Figure 28:
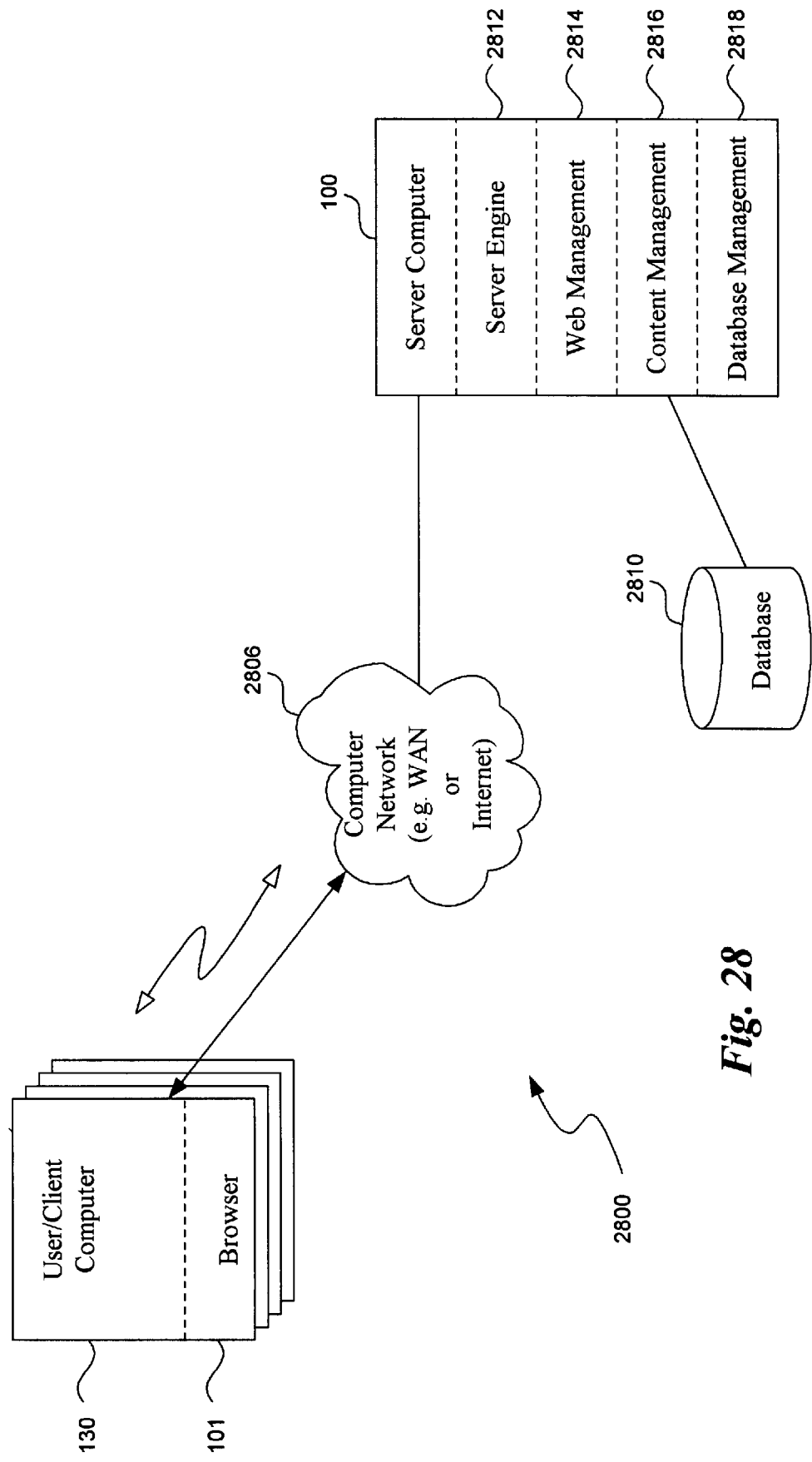
FIG. 28 is a block diagram illustrating a suitable system in which aspects of the invention may operate in a networked computer environment.

Aspects of the invention may be practiced in a variety of other computing environments. For example, referring to FIG. 28, a distributed computing environment with a web interface includes one or more user or client computers 130 in a system 2800 are shown, each of which includes a browser program module 101 that permits the computer to access and exchange data with the Internet 2806, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives), such as described above with respect to FIG. 27. User computers may include other program modules such as an operating system, one or more application programs (e.g., word processing or spread sheet applications), and the like. The user computers 130 include wireless computers, such as mobile phones, personal digital assistants (PDA's), palm-top computers, etc., which communicate with the Internet via a wireless link.

At least one server computer 100, coupled to the Internet or World Wide Web ("Web") 2806, performs much or all of the functions for receiving, routing and storing of electronic messages, such as web pages, waveforms and electronic images. While the Internet is shown, a private network, such as an intranet may likewise be used herein. A database 2810, coupled to the server computer, stores much of the web pages and content exchanged with or to the user computers.

The server computer, including the database, may employ security measures to inhibit malicious attacks on the system, and to preserve integrity of the messages and data stored therein (e.g., firewall systems, secure socket layers (SSL) password protection schemes, encryption, and the like).

The server computer includes a server engine 2812, a web page management component 2814, a content management component 2816 and a database management component 2818. The server engine performs basic processing and operating system level tasks. The web page management component handles creation and display or routing of web pages. Users may access the server computer by means of a URL associated therewith (e.g., http://www.transim.com). The content management component handles most of the functions in the embodiments described herein. The database management component includes storage and retrieval tasks with respect to the database, queries to the database, and storage of data such as the waveform data, netlists and other files.

Figure 29:
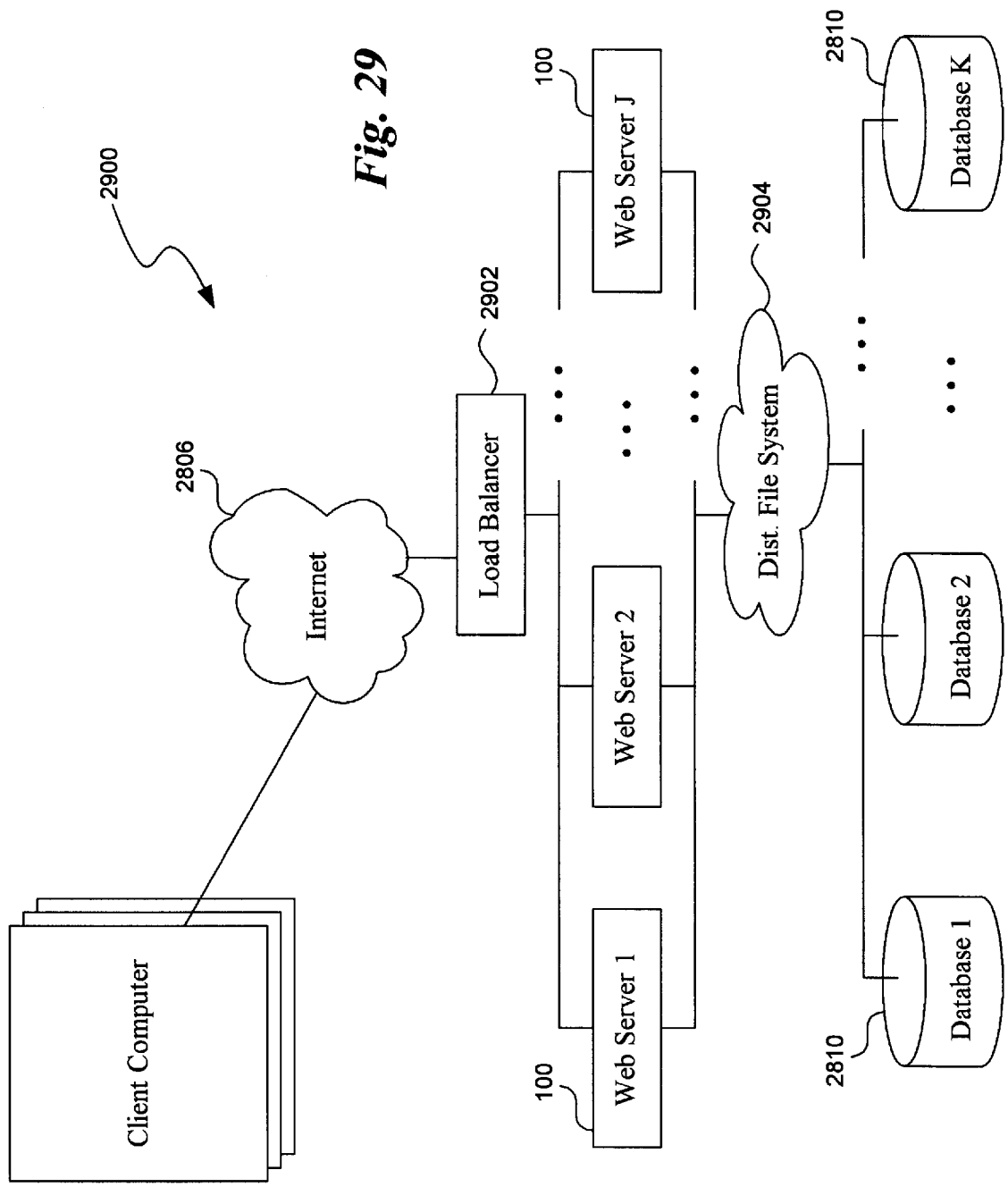
FIG. 29 is an example of an alternative system to that of FIG. 28.

Referring to FIG. 29, an alternative embodiment to the system 2800 is shown as a system 2900. The system 2900 is substantially similar to the system 2800, but includes more than one web server computer (shown as server computers 1, 2 , . . . J). A web load balancing system 2902 balances load on the several web server computers. Load balancing is a technique well-known in the art for distributing the processing load between two or more computers to thereby more efficiently process instructions and route data. Such a load balancer can distribute message traffic, particularly during peak traffic times.

A distributed file system 2904 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

Report Generation and Feedback

While the system described herein provides circuit simulation and design capabilities for users, the system also provides report generation and marketing feedback information to device manufacturers or suppliers. For example, the server stores in a log file 170 all simulation device types, netlists, modifications to netlists, simulation analysis tests and parameters associated with those tests. Each time a simulation is invoked by a registered user, all the above parameters are stored in the log file together with the user's registration identification number or other user identifying data. The log file may be time-stamped and assigned a unique identification number. The server may then process log files periodically (daily, weekly, monthly, etc.) to summarize simulation activity by total web site activity, individual user activity, device activity, simulation analysis type activity, etc. This allows the system to track user activity with extreme detail. Examples of a log file and summary report may be found in the above-referenced provisional application.

Figure 30:
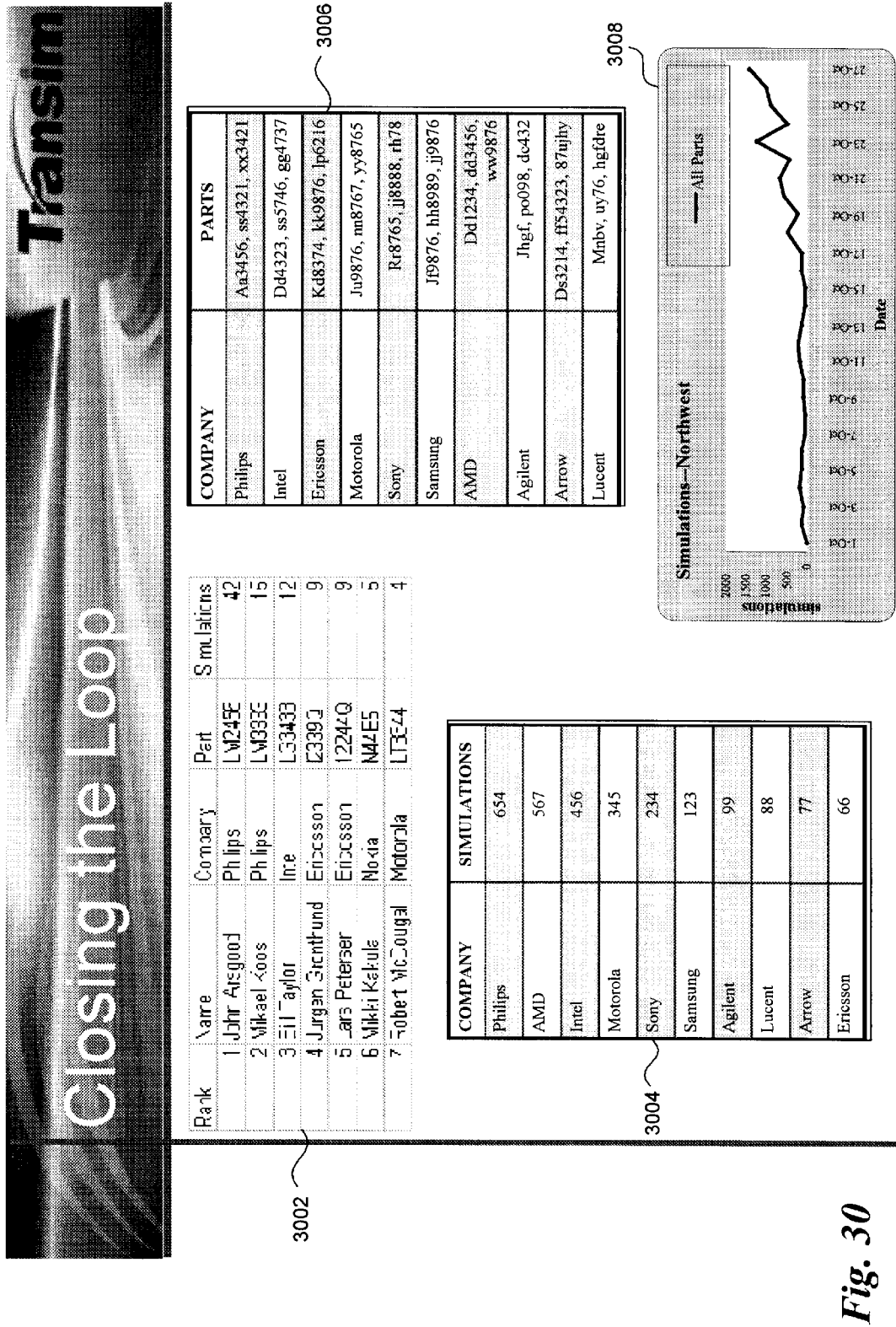
FIG. 30 is an example of a computer screen display depicting marketing feedback regarding use of the system.

Referring to FIG. 30, an example of a summary report that may be provided by the server is shown, where the server is operated by a third party service provider for various device manufacturers, or a supplier or retailer of devices provided by several manufacturers. The report of FIG. 30 may be displayed as a web page. A user usage table 3002 displays, in rank order by number of simulations, the name of system users who have requested device simulations, together with the manufacturer, part number and number of simulations for that part. A company per simulation table 3004 lists each device manufacturer and the number of simulations that have been requested for devices manufactured by that company. Likewise, a company per part table 3006 lists devices manufacturers and corresponding parts simulated by users. A number of simulations over time graph 3008 shows the number of simulations by all users for all parts over approximately a one-month period.

Of course, various other information may be provided, including total number of simulations per day, number of simulations performed based on type of browser (e.g., Internet Explorer versus Netscape Navigator), computer platforms and numbers of simulations (e.g., Windows 95, Windows 98, Windows NT, etc.), per user summaries for each particular user, and the like. The information may be provided in table format, pie chart format and any other graphical or text format a manufacturer, supplier or other user may require. Furthermore, the system may employ web-based surveys where users are provided with web page forms requesting their input on aspects of the system that they like, dislike and wish changed. The system may provide information regarding which devices are most popular, how many parts were analyzed per user, etc.

Those skilled in the relevant art will recognize that the system described herein provides numerous benefits. For example, the system provides interactive simulation of manufacturer's components over the Internet. Users can easily experiment with components online to evaluate them. In a matter of minutes, a user can determine if a part is suitable for a design, which may involve weeks of time spent on parts investigation. Faster design decisions enable the user to reach the marketplace sooner and allow the manufacturer to sell parts more quickly.

By offering instant online device evaluation, the system can significantly decrease manufacturers' sales costs while improving customer satisfaction. Users or customers can easily evaluate a component by themselves, thus requiring less assistance from applications engineers, particularly for more simple component investigations occurring early in a design process. Manufacturers can focus valuable application and sales resources where they make the most difference with users. Furthermore, manufacturers may offer current information to users quickly and in a format more effective than printed materials or CD-ROMs. Device evaluation over the Internet requires no production costs, no media costs, no shipping costs, and no costly delays in getting information to users.

Users need not purchase and employ expensive tools to use the online simulation features described herein. A user with a web browser and access to the Internet can employ aspects of the invention and thus quickly begin interactively investigating device performance. Aspects of the invention are simple to use and thus do not require training classes, manuals or experience with complex design tools. By providing a central location that hosts simulation, device data may be easily updated and controlled.

Figure 31:
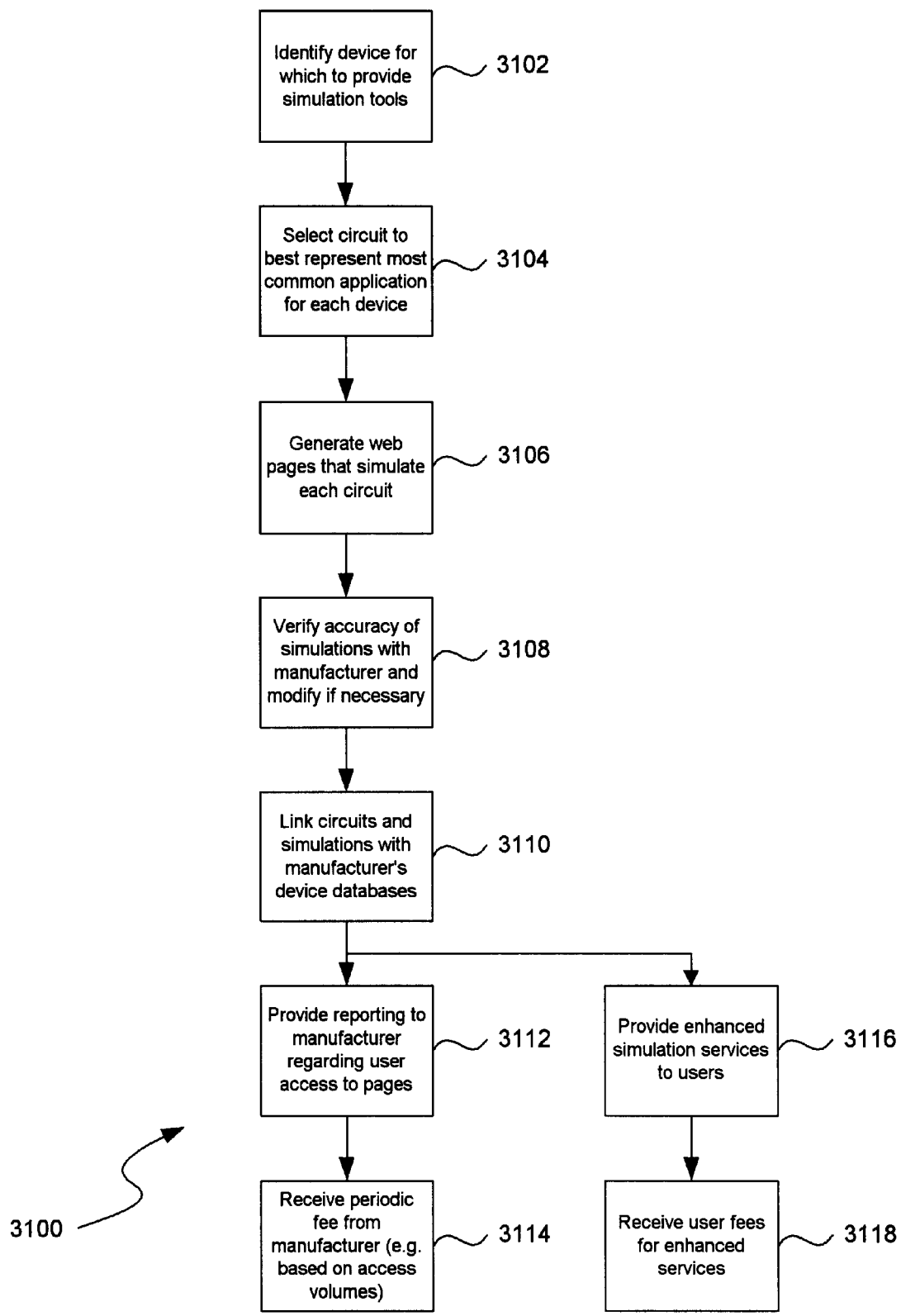
FIG. 31 is a flow diagram illustrating a method of providing simulation and device ordering services to a device manufacturer.

Schematics and reference applications circuits may be designed to show-off differentiating features between a manufacturer's device and those offered by other manufacturers. Since aspects of the invention are based on a web browser, particular software must be installed by a client computer. Furthermore, the simulation tools need not have specific operating system or platform requirements beyond those for interacting with standard browsers. Referring to FIG. 31, a routine 3100 is shown that may be employed by a third party service provider to provide device simulations for at least one manufacturer. Beginning in block 3102, the manufacturer identifies one or more devices for which to provide simulation tools. In block 3104, manufacturer and/or service provider select a circuit to best represent the most common applications for each device (reference application circuits). In block 3106, the service provider generates web pages that simulate each circuit. The service provider generates the necessary net lists, .tpl, .layout and other files described herein to simulate each circuit and its performance. In block 3108, the service provider verifies the accuracy of generated simulations and modifies such circuits or simulations where necessary.

In block 3110, the service provider links circuits and simulations with the manufacturer's database of devices. For example, the manufacturer may have a single database coupled to a web server or web enable front end that permits the service provider to link circuit simulations with data regarding each device in the manufacturer's database. Thus, users may click on device links or other web based user interface tools to access information regarding the manufacturer's database and devices.

In block 3112, the service provider reports to the manufacturer user access to the web pages types of simulations performed and devices analyzed. In block 3114, the manufacturer provides a periodic fee to the service provider. For example, the manufacturer may provide a flat monthly subscription fee to the service provider. Alternatively, the manufacturer may provide a fee based on the number of users or number of simulations performed by users with respect to the manufacturer's devices.

In block 3116, the service provider may provide optional, enhanced simulation services to users. Examples of such enhanced services may include a circuit sensitivity analysis, a worst-case analysis, as well as other circuit and device analysis tools that users may wish to employ to obtain further information regarding simulations. Such enhanced simulation services may include product creation services to help users more quickly design better products. In block 3118, the service provider receives user fees for such enhanced services. Again, such fees may be periodic or based on a per-use fee. Rather than receiving fees for only enhanced services, end users may provide fees for using basic services under the system. Furthermore, some or all aspects of the system may be sold or licensed as end-user software so that such end users may create and simulate circuit behavior, such as on a stand alone computer. Of course, various other revenue models are possible, as those skilled in the relevant art will recognize.

Conclusion

Various communication channels may be used, such as a local area network, wide area network, or a point-to-point dial-up connection instead of the Internet. The server system may comprise any combination of hardware or software that can support these concepts. In particular, a web server may actually include multiple computers. A client system may comprise any combination of hardware and software that interacts with the server system. The client systems may include television-based systems, Internet appliances and various other consumer products through which auctions may be conducted, such as wireless computers (palm-based, wearable, mobile phones, etc.).

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other simulation systems, not only for the electrical circuit simulation system described above. For example, the system may be employed to simulate any system comprising two or more interconnected components, where an end user at a client computer wishes to receive simulation data representing one or more characteristics of information that would be present in the system during its operation. Examples of other systems may include a communications network of interconnected communications devices (e.g., telecommunications devices), a traffic network of interconnected roads, a power grid of interconnected power distribution links, a computer system of interrelated software modules, a database of interrelated records, or any node-link structure where nodes represent components, and links represent interconnectivity between the components. The elements and acts of the various embodiments described above can be combined to provide further embodiments.

All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all client-server simulation systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

Appendix A

What is Simplis?

Simplis is an electrical circuit simulator that is designed from the ground up specifically for switch-mode power supply (SMPS) simulation. Simplis is a piecewise linear circuit simulator and a state-vector based simulator that uses a unique algorithm that is unrelated to the algorithm used in Spice. Since Simplis is designed just to solve SMPS circuits, it has several advantages over Spice. Simplis TX can simulate most SMPS circuits much faster than Spice in the time domain. Simplis POP can drive an SMPS circuit to steady-state, and Simplis FX can simulate the swept frequency response of an SMPS circuit without requiring state-averaging.

Review of How Spice Works

Before looking at how Simplis works, it may be helpful to make a quick review of how Spice works. Any circuit can be described by a set of nonlinear ordinary differential equations. In Spice, this system of equations is converted to a system of difference equations by a multistep integration method, typically the trapezoidal method. The resulting system of nonlinear difference equations are solved using the Newton-Raphson algorithm, which generates a sequence of linear equations that are in turn solved using sparse Gaussian elimination. A timestep control algorithm determines the timepoints where Spice solves the circuit equations (the solution timepoints). This scheme for analyzing circuits is called modified nodal analysis.

Spice constructs a matrix of nodal system equations to solve Kirchoff's Current Law where node voltages are the unknowns. These matrices can be expressed as $$\underline{I} = \underline{G} * \underline{V} \tag{Eq.1}$$

Spice tries to find the set of node voltages that will solve this equation. After solving for the node voltages Spice can then calculate the branch currents of the circuit. The matrix shown in Equation 1 assumes that all of the elements of the conductance matrix G are linear. If an element of the G matrix is nonlinear, such as a diode, Spice uses the Newton-Raphson algorithm to determine the I-V characteristic at that solution timepoint. The Newton-Raphson algorithm linearizes nonlinear circuit elements around their operating point. As the simulation progresses, Spice calculates new linearized equivalent circuits for each nonlinear (and charge storage) element in the circuit. As the circuit voltages and currents change, the linearized models change to reflect the new nonlinear behavior of the circuit at the new solution timepoint.

At each solution timepoint an integration method, typically the trapezoidal method, is also used to determine the I-V relationship for each capacitor and inductor. This is necessary because the I-V relationship of these devices is determined by a differential equation. Once all of the linearized I-V characteristics have been found for the matrix elements at a solution timepoint, Spice uses Gaussian elimination to solve the new, linear matrix.

Two different dynamic timestep control algorithms are used to determine the timepoints where Spice solves the circuit equations (the solution timepoints). Selection of the timepoints has a direct effect on the accuracy of the numerical integration routines and an indirect effect on Spice's ability to converge. The default algorithm is the Local Truncation Error timestep control algorithm. This timestep control algorithm uses the amount of error being generated in the numeric integration routines to adjust the timestep. As the error decreases the timestep increases and as the error increases the timestep decreases. The second method is the Iteration-Count timestep control algorithm. This algorithm monitors the number of iterations used to solve each timepoint during the simulation. A low number of iterations mean that a larger timestep can be used. A high number of iterations mean that a smaller timestep should be used. Regardless of the circuit behavior, the timestep is never allowed to become larger than the requested simulation time divided by the requested number of datapoints.

Spice Simulation Execution

Every Spice analysis begins with a DC operating point calculation, which establishes the initial bias point of each element in the circuit. During the DC analysis capacitors are modeled as voltage sources where the voltage is equal to the capacitor's initial condition. Similarly inductors are modeled as current sources where the current is equal to the inductor's initial condition. If the sources have a value of zero, then the capacitors become open circuits and the inductors become short circuits. Based on these source values, Spice makes a guess at all of the node voltages. Using Newton-Raphson, Spice then iterates on the initial guess to come up with a final set of node voltages. This final set of node voltages is the DC operating point.

Assuming that a time domain transient analysis has been requested, Spice selects the first solution time point (greater than t=0) and uses the numerical integration routines to determine the inductor and capacitor impedances at this new bias point. Spice then uses Newton-Raphson and iterates until it converges on a final solution to equation 1 for the current timepoint. The timestep control algorithm selects the next timepoint and the process is repeated until the end of the simulation time is reached.

Simplis

SIMPLIS (SIMulation for Piecewise-LInear Systems) is a simulation program specially designed for the simulation of electronic circuits containing devices modeled by Piecewise-Linear (PWL) characteristics and switches. Examples of such circuits are Switched-Mode Power Supplies (SMPS) and Switched-Capacitor (SC) filters and SC voltage converters. Unlike Spice, Simplis is a piece-wise linear state-vector simulation. The state-vector of the system is defined as the capacitor voltages, the inductor currents, and the source values. Instead of breaking down a circuit into a series of time steps as Spice does, Simplis breaks a circuit down into a series of topology steps. In other words, Simplis looks at an SMPS circuit as a series of linear topologies in time. It is just that the particular topology that is active can potentially change at each instant in time. Yet another way to state this is to say that Simplis views an SMPS circuit as a linear time-varying system where the variations of the system parameters with respect to time are step changes. The only restriction is that the variations of the system parameters are piece-wise linear with respect to time.

How Simplis Works

The two analyses that are most commonly applied to SMPS circuits are 1) large-signal time-domain analysis to study the transient response an 2) small-signal frequency-domain (AC) analysis to study the loop-gain, stability, and audio-susceptibility. Unfortunately, studying the transient response of an SMPS circuits with general simulators, such as SPICE, takes a very long time because the transients can involve hundreds or thousands of switching cycles. The SIMPLIS-TX transient simulator is designed for large-signal time-domain simulations of SMPS circuits, achieving a simulation speed that is from ten to fifty times faster than it is possible with SPICE.

Since SMPS circuits are periodically switched, the steady-state operation of such circuits are periodic waveforms instead of DC values. SPICE does not have any special analysis method to compute the periodic steady-state of SMPS circuits. With SPICE it could only be done by running a long, brute-force time-domain simulation until the simulation settles to a periodic steady-state. The SIMPLIS-POP algorithm was designed for fast and accurate computation of the periodic steady-state of these types of circuits. Finding the periodic steady-state is very important since all large-signal time-domain transient responses (except start-up analyses) and all small-signal frequency-domain analyses have to be launched from the steady-state condition.

Applying small-signal frequency-domain analysis directly on the SMPS is also not possible with SPICE since is not designed with the concept of a periodic steady-state.

The user has to derive an "averaged model" of a SMPS before the AC analysis can be carried out. While it is quite easy to come up with an "averaged model" for very simple switching converters, deriving an "averaged model," in general, is quite challenging for new circuit topologies, new control schemes and resonant and quasi-resonant type converters. SIMPLIS-FX is designed to compute the small-signal frequency-domain response of these periodically switched circuits, directly from the switched circuits instead of from an "averaged model", once the periodic steady-state has been derived using SIMPLIS-POP.

State-Space Analysis of a Linear Circuit

The system dynamics of a circuit are described by a set of differential equations. If the system is linear, the differential equations can be compactly represented in matrix form:

$$\dot{x}=Ax+Bu \quad (\text{Eq. 2})$$

This equation is also called the state equation. In Eq. 2, the state vector $\underline{x}$ is a collection of state variables—the capacitor voltages and the inductor currents—and the input vector $\underline{u}$ is a collection of constants derived from the source values of the DC sources. The entries in the matrices A and B are constants derived from the component values such as capacitance, inductance, resistance and gains in the various controlled sources.

Once the value to the state vector at any one time instant is determined, any voltage or current variables in the circuit can be computed from the state and input vectors through the algebraic output equation:

$$\underline{y}=C\underline{x}+D\underline{u} \quad (\text{Eq. 3})$$

Similar to the A and B matrices, the entries in the C and D matrices are constants derived from the component values in the circuit. The output vector $\underline{y}$ is composed of any voltage or current variable that the user has specified for display by the simulator. Other than conveying useful information to the user, these output variables are not critical to the simulation.

This approach of analyzing a circuit is called state-space analysis because it is the state variables that are solved first before any voltage or currents of interest are computed.

Solution to the State-Space Analysis of a Linear Circuit

Given the initial condition of the state vector $\underline{x}(t_0)$ at a certain time $t_0$, the state vector $\underline{x}(t_0+\delta t)$ at a duration $\delta t$ later can be obtained by solving the vector differential equation in Eq. 2. Since the entries in the A and B matrices and the input vector $\underline{u}$ are all constants, the solution to Eq. 2 can be expressed in a very special form:

$$\underline{x}(t_0+\delta t)=\Theta(A,\delta t)\underline{x}(t_0)+A^{-1}[\Theta(A,\delta t)-I]B\underline{u} \quad (\text{Eq. 4})$$

where $\Theta(A, \delta t)$ is the state transition matrix of the system plant matrix A of duration $\delta t$. In general, this matrix can be expressed in closed form in terms of the exponentials associated with the eigen values of the A matrix. On the other hand, the state transition matrix $\Theta(A, \delta t)$ can be approximated by a truncated power series of the A matrix:

$$\Theta(A,\delta t) \approx I + A\delta t + \frac{(A\delta t)^2}{2!} + \frac{(A\delta t)^3}{3!} + \ldots + \frac{(A\delta t)^K}{K!} \quad (\text{Eq. 5})$$

In general, either increasing the number of terms K employed or reducing the time duration $\delta t$ improves the accuracy of this approximation. Once $\underline{x}(t_0+\delta t)$ is computed, it becomes the initial condition for the next time step in the computation of the state vector at the end of the next time step. The values to the state vectors at discrete instants of time can then be obtained by repeatedly evaluating Eq. 4.

Since Eq. 4 was stated as the result of Eq. 2 when the entries in the input vector $\underline{u}$ are constants, it could easily be misconstrued that the results here could not be used for the simulation of circuits with time-varying sources. In fact, most of the common time-varying sources such as the typical pulse, square, sinusoidal, and PWL sources found in SPICE can be modeled in the form of Eq. 2 to define the dynamics and in the form of Eq. 4 as the solution to the state equation Eq. 2. The explanation provided here for SIMPLIS is meant to be informational and concise without going into a lot of technical details.

Another misconception is that resonant waveforms cannot be simulated with the PWL approach since the term PWL implies piecewise-linear. In fact, nothing could be farther from the truth. The term PWL here means that the modeling of the components are described in terms of piecewise-linear functions and ideal switches. No assumption has been made about the shapes of the waveforms. For example, even a simple series or parallel combination of a linear capacitor and a linear inductor could result in resonating waveforms. Whether the simulation accurately reflects the resonant quality of the waveforms depends on the accuracy in the approximation of the state transition matrix shown in Eq. 5.

Piecewise-Linear (PWL) Modeling

Figure 32:
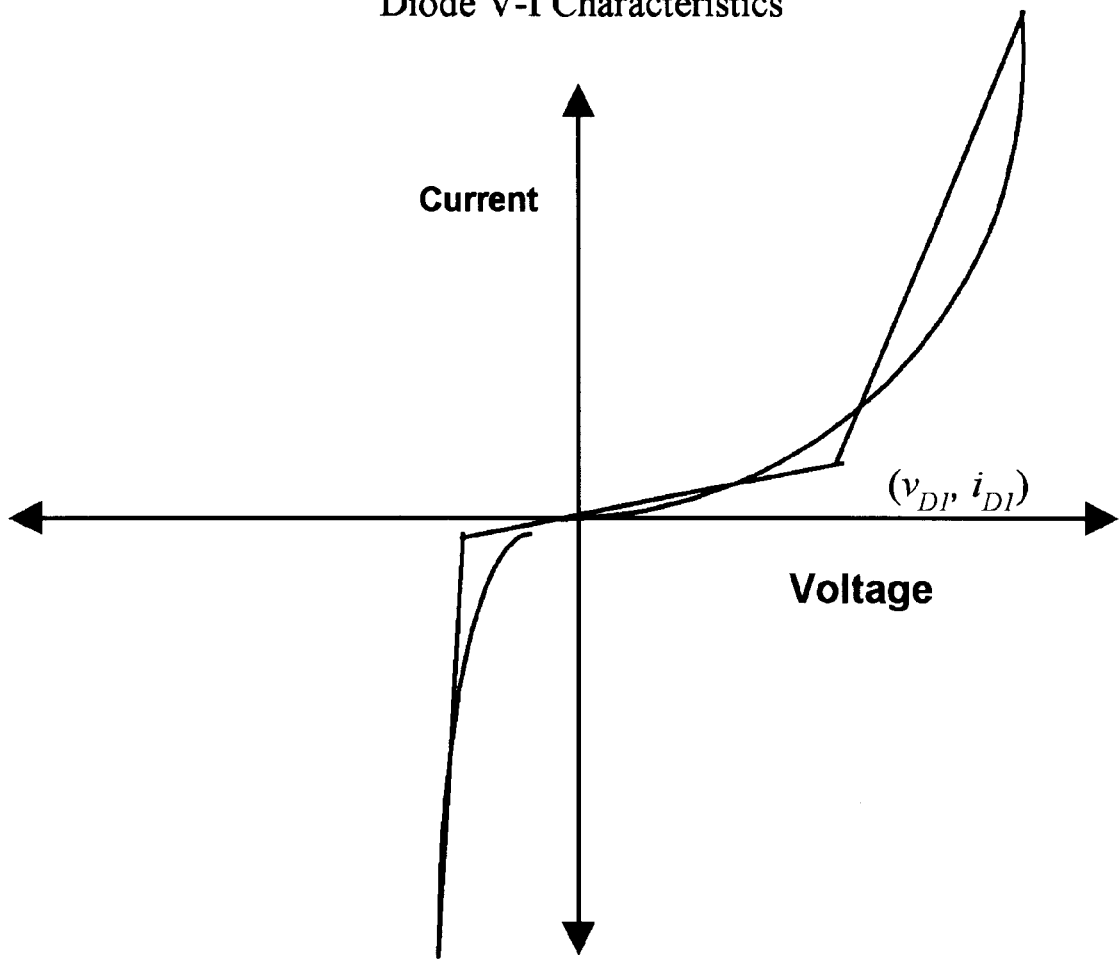
FIG. 32 shows a nonlinear voltage versus current diode waveform.

In Piecewise-Linear (PWL) modeling, the characteristics of a device are described by a set of characteristics which are linear. For example, the nonlinear v–i characteristics of a semiconductor diode (FIG. 32) can be modeled by two connected straight-line segments as shown below. The "OFF" segment models the diode when it behaves like a very high impedance and the "ON" segment models the diode when it behaves more like a low impedance.

At any time, whether the diode operate in the "OFF" segment or "ON" segment depends on whether the diode current $i_D$ is above or below $i_{D1}$. In this simple example, the valid segment of operation could also be determined by setting up an inequality involving the diode voltage $V_D$.

In a SMPS circuit, other semiconductor components that are highly nonlinear, such as BJTs and MOSFETs, are usually designed to operate as switches. As a result, they could be modeled by simple switches. For a simple switch, its v–i characteristics can be modeled by a linear and large resistive impedance when it is in the "OFF" state and modeled by a Thevenin equivalent with a small resistance and a small voltage drop. In both cases, the resulting model is linear. We shall see in the next section that once all nonlinear devices are modeled by their PWL equivalents or switches, the operation of the circuit can be broken down into a sequence of PWL topologies.

Cyclic Operation with Piecewise-Linear Topologies

Let us use a simple buck (boost) converter with one MOSFET Q and one diode D modeled with a 2-segment PWL characteristics as an example for discussion. Typically, the MOSFET of such a circuit is periodically driven so that it is driven to resemble a low impedance, conducting current, at the beginning of each switching cycle. At some time inside a switching cycle, the control signal turns off the drive to the MOSFET, and the MOSFET behaves like a high impedance in the remaining of the switching cycle until it is driven to conduct again at the beginning of the next switching cycle.

Figure 33:
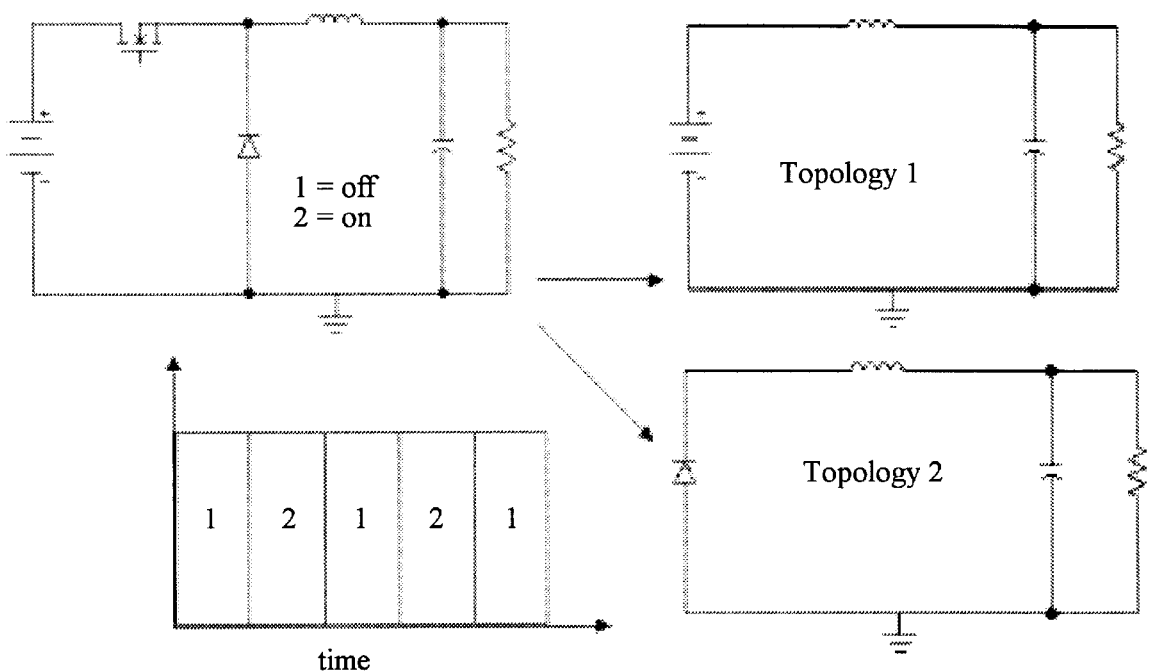
FIG. 33 shows an example of a simple buck (boost) converter with one MOSFET and one diode modeled as two topologies with the MOSFET turned on and off in topologies one and two, respectively.

In the case when the MOSFET is turned on (Topology 1 in FIG. 33), the diode would be reversed-biased so it can be modeled by "OFF" segment of its PWL characteristics.

Since the MOSFET is driven to behave almost like a short-circuit, it can be modeled as either a short circuit or a Thevenin equivalent containing a small resistor and a small voltage drop. Once the MOSFET and the diode are modeled by their respective PWL characteristics, the modeling circuit is a circuit that contains only linear components. This modeling circuit forms a "topology" that is distinct from other topologies. For simplicity and ease of discussion here, this topology where Q is on and D is reversed-biased is called the "ON-OFF" topology.

When the MOSFET is turned off (Topology 2 in FIG. 33), the diode would be forced to conduct to maintain the continuity of the magnetic flux in the inductor. In this case, the MOSFET can be modeled by a high impedance and the diode can be modeled by the "ON" segment of its PWL characteristics, which is a Thevenin equivalent containing a small resistor and a small voltage drop. Again, the modeling circuit is a circuit containing only linear components once the MOSFET and the diode are replaced with their respective PWL model. This topology where Q is off and D is forward-biased is called the "OFF-ON" topology.

If the current through the diode drops below $i_{D1}$ before the MOSFET is conducting again, the circuit enters the third PWL topology, which we can call the "OFF-OFF" topology where both the MOSFET and the diode are modeled by high impedances.

A controller is usually employed to control the duty ratio of the on time of the MOSFET so as to regulate the output voltage of the converter to a prescribed value. Thus, the operation of this simple buck (boost) converter can be described by a sequence of cyclic PWL topologies among the "ON-OFF," "OFF-ON," and the "OFF-OFF" topologies.

State-Space Analysis of an SMPS Circuit

As we have seen in the simple example last section, the operation of a SMPS can be modeled by a sequence of PWL topologies. In each topology, the actual circuit is modeled by its appropriate model circuit, which is linear. Since the model circuit is linear, the state space analysis outlined for the linear analysis can be used to solve the dynamics of the state vector in each PWL topology.

There are obviously some differences between the analysis of a linear circuit and a circuit that is modeled by a sequence of PWL topologies. In the case of a linear circuit, one single set of A, and B, C, and D matrices model the system for the entire simulation. In the case of a circuit whose operation is modeled by a sequence of PWL topologies, there is a set of A, and B, C, and D matrices for each PWL topology because we have a different linear model for each PWL topology.

In the analysis of a circuit that is modeled by a sequence of PWL topologies, we also need to continuously monitor certain voltages or currents to determine whether the current PWL topology is still applicable. For example, the diode current $i_D$ in our simple example converter needs to be monitored so that the correct segment of operation for the diode can be computed. If the diode D is modeled by the "OFF" segment in the current PWL topology, then the current PWL topology is not valid if $i_D > i_{D1}$. As a result, the diode current $i_D$ needs to be included as one of the variables computed at each time step. These kinds of variables are critical to the accurate simulation of the circuit since they must be computed by the simulator at each time step in order to determine the valid operational PWL topology. Since these critical variables are, in general, not necessary state variables, they are placed inside the output vector $\underline{y}$ and necessary entries are filled in the C and D matrices for the computation of these critical variables.

Simplis-TX Time-Domain Simulation

SIMPLIS-TX is a time-domain simulator specially designed for the efficient large-signal time-domain simulation of SMPS circuits. Its algorithm can be simply stated as follows:

a) The operation of the circuit is modeled by a sequence of PWL topologies according to the PWL models defined for the nonlinear devices.

b) At the start of the analysis, find the correct PWL topology of operation.

c) Simulate the system in the current PWL topology until it exits the current PWL topology or until the end time of the specified transient simulation, whichever comes first.

d) Find the next correct PWL topology of operation based on the state vector at the end of the previous PWL topology. Since state variables do not jump instantaneously, the value of the state vector at the exit of the previous PWL topology becomes the initial condition for the state vector in the next valid PWL topology. Go back to step c).

The simulation outlined in step c) above can be further elaborated as:

e) The state vector at the entry of the current PWL topology is known since it is either given as the initial condition to the simulation, or it is computed from the moment the system exits the last valid PWL topology, f) Compute the state vector at the end of a time step from the state vector at the beginning of the time step by employing Eq. 4.

g) After the state vector at the end of the current time step is obtained, compute the output vector at the end of the current time step using Eq. 3.

h) If any critical output variable exceeds its constraining boundary inequality, reduces the step size by half. Otherwise, advance the time variable forward by the step size.

i) Repeat steps g) through h) until the time instant at which the system exits the current topology is solved.

The simulation algorithm outlined so far, by itself, does not offer much speed advantage nor much improvement in accuracy compared to the algorithm of general simulators such as SPICE. SIMPLIS-TX is able to give an accurate simulation of the SMPS circuits, while being more than an order of magnitude faster than SPICE because of the following:

In the approximation of the state transition matrix in Eq. 5, eight terms are used in the truncated power series. This allows a basic step size Δt that is much larger than possible with the typical step size employed in a SPICE simulation.

As each new PWL topology is encountered, compute and store its associated A, and B, C, D, and Θ matrices. The next time the simulation encounters this PWL topology, these matrices would not need to be computed again Since a SMPS usually operates in cyclical PWL topologies, there is a very high probability that the current PWL topology would be encountered again during the rest of the simulation. Compared to general simulators, such as SPICE, which regard every time step as if it is a new simulation condition, this storage of information for those encountered PWL topologies saves a significant amount of CPU time.

When the state variables are no longer fast moving for several consecutive time steps in a row, double the step size.

As indicated earlier, the step size would be reduced by half if the simulation, employing the current step size, would lead the system to exit the current PWL topology. When the step-size is smaller than the basic step size Δt, modified secant method followed by quadratic interpolation are us to accurately solve for the "switching instant" at which the system would exit the current PWL topology. These two follow-up procedure allows SIMPLIS to accurately solve for the "switching instant" without incurring excessive CPU time. It turns out that the simulation of SMPS are very sensitive to the errors in solving the "switching instants." A tiny error in solving the "switching instants" can show a system that is supposed to be in periodic steady-state to look like it is chaotic or vice versa.

Simplis-Pop Periodic Operating Point Simulator

For a system that is not switching, the study of its large-signal time-domain transient is carried out after the DC operating point of the system is solved. The DC operating point represents the steady state of the system before a large disturbance is applied to it. If the large-signal time-domain transient analysis is carried out by first applying the DC analysis, the simulated result would not be accurate as it contains two types of transient solutions super-imposed together: the transient of the system trying to converge to its steady-state before the large-signal disturbance, and the transient caused by the large-signal disturbance.

Similarly, for a periodically operating system like an SMPS, we cannot perform a large-signal time-domain transient analysis without first finding the steady-state of the system before the large-signal disturbance is applied. But in a periodically operating system, the steady-state is composed of time varying waveforms that repeat at every switching cycle. Recognizing this kind of periodic nature of the steady-state, SIMPLIS-POP was developed to quickly and accurately compute the periodic steady-state of a SMPS. The algorithm of SIMPLIS-POP can be briefly summarized as follows:

a) Carry out a time-domain simulation of the SMPS for one switching cycle. At the end of the switching cycle, define an error vector as the difference between the state vectors at the start and at the end of the same switching cycle. If each component in this error vector is negligibly small when compared to the corresponding entry in the starting and ending state vectors, the periodic steady-state is considered solved since the state vector, for all practical purpose, repeats itself after one switching cycle.

b) If the relative error between the starting and ending state vectors of the same switching cycle is still large, simulate another switching cycle. During this simulation, use special algorithms to compute the sensitivity of the ending state vector with respect to small changes in the starting state vector of the same switching cycle.

c) Using the sensitivity information collected in the previous step, apply Newton-Raphson algorithm to predict the value of the starting state vector that would lead to an error vector that is equal to the null vector.

d) Use the updated starting vector from the Newton-Raphson procedure as the initial condition and go back to step a). Repeat steps a) to c) until the error vector is negligibly small.

General simulators such as SPICE, lacking the notion of periodic steady state, would require a brute-force simulation of thousands of switching cycles to wait till the natural transient has decayed to negligible values. As powerful as SIMPLIS-TX is, it would be somewhat handicapped if the SIMPLIS-POP algorithm is not available. For instance, if we want to study the response to a step-change in the line voltage from 48 V to 36 V, the steady state of the SMPS when the line voltage is at 48 V has to be solved first. Without SIMPLIS-POP, SIMPLIS-TX would have to be employed in a brute-force simulation of thousands of switching cycles, in a manner similar to SPICE, to compute the steady state corresponding to a line voltage of 48 V before the line voltage is dropped to 36 V.

Simplis-FX Small-Signal Frequency-Domain Analyzer

The small-signal frequency-domain (AC) analysis is a method that is familiar to engineers and it is typically applied to study the stability behavior of a SMPS circuit. In small-signal frequency-domain analysis, small-signal sinusoidal perturbation is applied to the system under study around its steady-state and the small-signal sinusoidal response of the system is studied.

Since the steady state of a SMPS is periodic, general simulators such as SPICE cannot be directly applied for finding the steady state of such a circuit. To overcome this obstacle, the SMPS is quite often modeled by an "averaged small-signal model" that is non-switching. With the circuit under study modeled by a non-switching averaged model, general simulators such as SPICE can be used to find the DC operating point and then the small-signal AC response.

This approach of using an "averaged model" for analyzing an SMPS in the small-signal frequency-domain has two problems. While "averaged models" for very simple switching converters can be found in the literature, deriving an "averaged model" is quite challenging for multiple-output SMPS, new circuit topology, new control scheme, and resonant and quasi-resonant type converters. Even if an "averaged model" has been successfully derived, it is, theoretically, only valid for small-signal frequencies up to half the switching frequency. In practice, the accuracy of the "averaged model" could degrade at as low as one-tenth of the switching frequency.

The SIMPLIS-FX is designed for the accurate small-signal frequency-domain analysis of SMPS circuits without having to resort to "averaged models." This can be outlined in the following two steps:

a) Use SIMPLIS-POP to arrive at the large-signal periodic steady state of the SMPS. No "averaged model" needs to be employed. The SMPS is analyzed according to its operation in cyclic PWL topologies.

b) At each small-signal excitation frequency, a special algorithm is used to find the "small-signal steady-state" at that excitation frequency by applying small-signal sinusoidal excitation. Once the "small-signal steady-state" has been solved, the small-signal frequency response of the SMPS is extracted.

The algorithm employed to compute the "small-signal steady-state" can be concisely summarized here:

c) Compute the sensitivity of the small-signal state variables at the end of a switching cycle with respect to the small-signal AC sources and with respect to the small-signal state variables at the start of the same switching cycle. It turns out that the SIMPLIS-POP algorithm for finding the sensitivities of the state variables at the end of a switching cycle, with some minor modification, can also be employed here to compute the small-signal sensitivities.

d) Using the small-signal sensitivity information, the "small-signal steady-state" is computed by finding the magnitude and phase of the small-signal state variables with respect to the small-signal AC sources.

The SIMPLIS-FX algorithm, in principle, is similar to measuring the small-signal frequency response of a SMPS in the laboratory the small-signal response is "extracted" while small-signal sinusoidal excitation is applied to an SMPS operating with all switching actions. So instead of removing the switching actions, like in the case of deriving an "averaged model," SIMPLIS-FX fully embraces the switching action in computing the small-signal frequency response of the SMPS. As a result, the small-signal frequency response computed by SIMPLIS-FX is quite accurate, and it is valid at excitation frequencies beyond the switching frequency. In addition, this is accomplished without having the need to derive an "averaged model." Another advantage is that essentially the same schematic can be used for time-domain simulation as well as frequency-domain analysis since there is no need to replace the actual switching circuit and controller by their "averaged" small-signal equivalents.

Intra-cycle vs. Inter-Cycle Behavior & Simulation Speed vs. Accuracy

In the discussion earlier, we have simplified the analysis of the operation of the transistors and diodes in a SMPS circuit. For example, when the transistor is turned off, the actual device takes a finite duration, called the "turning-off" time, before it is completely turned off. During this time, the transistor does not act like a simple switch. Its terminal voltage and current can be both substantial at the same moment, making its behavior deviate from that of a switch because a switch can support large amounts of voltage or current, but not both, at the same moment. Thus, during a certain portion of the switching cycle, the operation of the converter cannot be simply modeled by having the transistor modeled as a switch.

To address this issue, the transistor can be replaced by a more elaborate PWL model whereby its output current is controlled by its controlling voltage/current and the accuracy for the diode model can be extended by increasing the number of segments in its PWL characteristics. While the more elaborate models no doubt could lead to a more accurate and realistic simulation, such increase in modeling complexity would lead to a slower simulation and may not even be necessary depending on the objective of the simulation.

Typically, the MOSFETs in an SMPS are driven to switch very rapidly so that the "turning-ON" and "turning-OFF" times are very small compared to the switching period. Collectively, we would use the term "switching times" to refer to the "turning-ON" and "turning-OFF" times of the switching MOSFETs. If the focus of the simulation is to study the behavior of the circuits during these switching times, then certainly more complex models are required. This type of study, however, usually can be carried out by simulating the circuit for one or two switching cycles. Hence, these type of behavior are termed "Intra-Cycle Behavior" or "Few Cycle Analysis" because the focus of the study is to study a certain behavior or phenomenon within one switching cycle. While SIMPLIS can certainly be employed to study this kind of behavior by employing more complex PWL models, this type of behavior is more suitable for simulation by general simulators such as SPICE since they already offer very complex models for the semiconductor components and the simulation needs to be carried out for no more than a few switching cycles.

In an SMPS, there usually are some large capacitors and/or inductors present in the circuit that lead to time constants that are hundreds to thousand times the switching times of the transistors. The large-signal time-domain long-term response of the SMPS is dominated by these long time constants of the larger energy-storage elements and its dependence on the switching times of the transistors is negligible. As a result, it is not uncommon to see that the large-signal time-domain response of these types of circuits would involve hundreds to thousands of switching cycles. Hence, this type of response or behavior is termed the "Inter-Cycle Behavior" or "Many Cycle Analysis" since we are looking at the general trend of the circuits over many switching cycles instead of inspecting the details within one switching cycle. With properly designed drive circuits, the switching times are very small within one switching cycle and their impact on the "Inter-Cycle Behavior" is negligible. In this situation, accounting for the switching times of the transistors and using more elaborate PWL models would not increase the accuracy of the simulated transients over hundreds of switching cycles. Instead, a time simulation that is time consuming because hundreds or thousands of switching cycles need to be simulated becomes an even slower simulation. Thus, for practical reasons, the analysis of the large-signal time-domain response of SMPS circuits can be carried out by modeling the MOSFETs as switches and any other nonlinear components by PWL models with moderately small number of PWL segments.

We claim:

1. A method for simulating a circuit in a client-server environment, wherein a network couples at least one client computer to a server computer, the method comprising:

at the client computer, presenting a visual display, wherein the visual display includes a visual depiction of a particular circuit having two or more components, and wherein at least one of the depicted components is linked to one or more user interface controls for receiving user input to change component characteristic data for the depicted component;

providing executable code to the client computer from the server computer;

at the server computer, generating simulation data that represents one or more characteristics of a signal that would be generated in the particular circuit during operation of the particular circuit;

sending the simulation data over the network from the server computer to the client computer;

at the client computer, generating a first simulation display based on the simulation data for operation of the particular circuit;

receiving user input at the client computer; and at the client computer and without requesting additional simulation data from the server computer, generating a second simulation display based on the simulation data, wherein the second simulation display displays the simulation data differently than the first simulation display, and wherein the second simulation display is generated in response to the user input and in response to executing by the client computer the executable code.

2. The method of claim 1 wherein the network is the Internet, wherein the circuit and components are an electrical circuit and electrical components, respectively, wherein presenting the visual display comprises providing to the client computer from the server computer at least a first web page to the client computer including a visual depiction of the particular electrical circuit having two or more electrical components, wherein providing executable code comprises downloading a Java encoded applet, wherein the second display is generated by performing a zoom operation on at least a portion of the first display, and wherein the method further comprises:

receiving additional user input at one of two or more highlighted nodes in the visual depiction of the particular electrical circuit, and in response thereto, generating a third simulation display for showing one or more characteristics of another signal that would be generated and would be present at the one node during operation of the particular electrical circuit.

3. The method of claim 1 wherein generating the simulation data comprises:

generating raw waveform data that represents one or more characteristics of two or more signals that would be generated in the particular circuit during operation of the particular circuit;

comparing angles of groups of adjacent points in the raw waveform data to identify substantially similar angles;

creating reduced waveform data by deleting one or more points in at least one group of adjacent points when substantially similar angles are identified; and compressing the reduced waveform data to generate the simulation data;

wherein the client computer receives and decompresses at least a portion of the simulation data, and wherein the client computer does not communicate with the server computer between receiving the user input and generating the second simulation display.

4. A computer-implemented method for simulating a system comprising two or more interconnected components, wherein a network couples at least one client computer to a server computer, the method comprising:

receiving simulation data over the network from the server computer, wherein the simulation data represents one or more characteristics of information that would be present in a particular system comprising two or more interconnected components during operation of the particular system;

at the client computer, generating a first simulation display based on the simulation data for operation of the particular system;

receiving user input at the client computer; and generating locally at the client computer a second simulation display based on the simulation data, wherein the second simulation display depicts the simulation data differently than the first simulation display, and wherein the second simulation display is generated in response to the user input to the client computer.

5. The method of claim 4 wherein the network is the Internet, wherein the system is a circuit and wherein the method further comprises:

at the client computer, receiving at least a first web page presenting a visual display, wherein the visual display includes a visual depiction of a particular circuit having two or more components, and wherein at least one of the depicted components is linked to one or more user interface controls for receiving user input to change component characteristic data for the depicted component;

receiving at the client computer executable code from the server computer before receiving the user input, wherein the second display is performed by the client computer in response to executing the code and without requesting additional simulation data from the server computer.

6. The method of claim 5 wherein the first display is a waveform, and wherein the second simulation display is generated by performing a zoom operation on at least a portion of the first waveform display.

7. The method of claim 5 wherein receiving simulation data includes receiving filtered and compressed waveform simulation data and decompressing the simulation data.

8. The method of claim 5, further comprising:

receiving a visual depiction of a particular system having two or more interconnected components, and wherein at least one of the depicted components is linked to one or more user interface controls for receiving user input to change component characteristic data for the depicted component.

9. The method of claim 5, further comprising receiving a visual depiction of the particular system; receiving additional user input at one of two or more highlighted areas in the visual depiction of the particular system; and in response thereto, generating a third simulation display for showing one or more characteristics of information that would be present in the particular system at the one area during operation.

10. In a client-server environment where a network couples at least one client computer to a server computer, the method comprising:

presenting a visual display on the client computer, wherein the visual display includes a visual depiction of a circuit having two or more components;

in response to receiving user input from an area of the visual depiction that corresponds to a particular component, presenting one or more user interface controls for receiving component characteristic data for the particular component;

in response to receiving user input through the one or more user interface controls, receiving the component characteristic data at the server computer for the particular component;

generating simulation data at the server computer that reflects how the circuit would operate based on the particular component having characteristics indicated by the component characteristic data; and providing the simulation data to the client computer.

11. The method of claim 10 wherein the circuit is an electrical circuit, wherein the components are electrical components, and wherein the user interface controls include a listing of manufacturers of the particular electrical component.

12. The method of claim 10 wherein the network is the Internet, and wherein presenting a visual display includes receiving at the client computer a display description defining the visual depiction, and wherein the method further comprises:

at the server computer, storing data regarding user input requesting the visual display and the received component characteristic data associated with the user input; and providing user reporting data based on the stored data.

13. A system for generating system simulation data for delivery to at least one client computer over a network, comprising:

means for generating raw waveform data that represents one or more characteristics of two or more signals that would be generated in a particular circuit during operation of the particular circuit;

means for comparing angles of groups of adjacent points in the raw waveform data to identify substantially similar angles;

means for creating reduced waveform data by deleting one or more points in at least one group of adjacent points when substantially similar angles are identified;

means for compressing the reduced waveform data to generate simulation data;

means for providing the generated simulation data for the client computer.

14. The system of claim 13 wherein the means for generating raw waveform data includes means for generating an ASCII file, and wherein the system further includes means for converting the ASCII file into binary format.

15. The system of claim 13 wherein the means for generating raw waveform data includes means for generating float number format waveform data.

16. The system of claim 13 wherein the means for generating raw waveform data includes means for simulating electrical circuit operation.

17. An apparatus coupled to a client computer via a network, the apparatus comprising:

a database;

a server computer coupled to the database and to the network, wherein the server computer is configured to:
generate simulation data, wherein the simulation data represents one or more characteristics of information that would be present in a particular system comprising two or more interconnected components during operation of the particular system;
provide the simulation data over the network to the client computer; and
provide executable code to the client computer, wherein the client computer may generate a first simulation display based on the simulation data for operation of the particular system, and may generate locally at the client computer a second simulation display based on the simulation data and execution of the executable code, wherein the second simulation display depicts the simulation data differently than the first simulation display, and wherein the second simulation display is generated in response to user input to the client computer.

18. The apparatus of claim 17 wherein the server computer is further configured to:

receive, from the client computer, component characteristic data for a particular component;

generate revised simulation data at the server computer that reflects how the system would operate based on the particular component having characteristics indicated by the component characteristic data; and provide the revised simulation data to the client computer.

19. The apparatus of claim 17 wherein the server computer is further configured to generate simulation data includes receiving waveform data and filtering the received waveform data.

20. The apparatus of claim 17 wherein the system of interconnected components is an electrical circuit of interconnected electrical components, a communications network of interconnected communications devices, a traffic network of interconnected roads, a power grid of interconnected power distribution links, a computer system of interrelated software modules or a database of interrelated data records.

21. A computer-readable medium containing a data structure having information for displaying information regarding a circuit under a client-server system, wherein the client-server system includes a network coupling at least one client computer with a server computer, the information comprising:

a display description defining at least first and second display screen areas, wherein the first screen area includes a visual depiction of a circuit having two or more components and wherein at least a particular one of the components may receive user input to cause the client computer to display the second area;

wherein the second area includes one or more user interface controls for receiving user altered component characteristic data for the particular component; and another display description providing user input fields for receiving user input regarding a circuit to be designed by the user for the automatic selection by the server computer of at least one component for use in the circuit based on received user input.

22. The computer-readable medium of claim 21 wherein the visual depiction includes two or more highlighted nodes for receiving user input, and in response thereto, for displaying a waveform associated with operation of the circuit.

23. The computer-readable medium of claim 21 wherein the data structure includes instructions for the display of the information.

24. The computer-readable medium of claim 21 wherein the data structure represents a Web page.

25. The computer-readable medium of claim 21 wherein the data structure represents a document for display.

26. The computer-readable medium of claim 21 wherein the data structure is a data transmission medium transmitting a generated data signal containing the data structure.

27. A method for simulating a system comprising two or more interconnected components, comprising:

identifying at least one component of the system for which to provide user simulation controls;

identifying a particular system incorporating the identified component to represent operation of the identified component;

generating a display description of the particular system and user simulation controls, wherein the display description is configured to provide simulation information regarding the identified component and system to two or more client computers over a network;

receiving data regarding access to the display description of the particular system and user simulation controls by the client computers, and generating a report based on the received data; and providing the data to a third party associated with the identified component.

28. The method of claim 27, further comprising:

verifying with the third party accuracy of the simulation information;

providing a link in the display description to information regarding the identified component in a database controlled by the third party; and receiving periodic payment from the third party.

29. The method of claim 27, further comprising:

providing enhanced user simulation controls to at least one requesting user; and receiving payment from the requesting user.

30. The method of claim 27, further comprising:

licensing at least one requesting user to software controls for the generating of a display description of the particular system and user simulation controls, wherein the display description is configured to provide simulation information regarding the identified component and system to a stand alone computer not needing connection to a network.

* * * * *

UNITED STATES PATENT AND TRADEMARK OFFICE
CERTIFICATE OF CORRECTION

PATENT NO. : 6,530,065 B1  Page 1 of 1
DATED : March 4, 2003
INVENTOR(S) : McDonald et al.

It is certified that error appears in the above-identified patent and that said Letters Patent is hereby corrected as shown below:

Column 9,
Line 61, "simulatator" should be -- simulator --
Line 61, delete period between "simulatator" and "may";

Column 10,
Line 12, "Process sin.cgi" should be -- Process_sin.cgi --;
Line 12, insert -- 154 and 156. The waveform database 122 and waveform processing block 108 in FIG. 1A map to the Result files 162 and CGI-makewaveform block 164 in FIG. -- between "blocks" and "1B";

Column 11,
Line 50, insert period between "g" and comma;

Column 12,
Line 54, "display" should be -- displayed --;
Line 54, insert -- such as that shown in a -- between "displayed" and "frame";

Column 18,
Line 61, insert -- = -- between "Delta" and "a";

Column 19,
Line 49, delete period between "including" and "Internet";

Signed and Sealed this

Twenty-sixth Day of August, 2003

JAMES E. ROGAN
*Director of the United States Patent and Trademark Office*